US008651548B2

(12) United States Patent
Shirase

(10) Patent No.: US 8,651,548 B2
(45) Date of Patent: Feb. 18, 2014

(54) MOVABLE BODY MOVING APPARATUS

(75) Inventor: Yuichi Shirase, Yokohama (JP)

(73) Assignee: Nifco Inc., Yokohama-shi (JP)

( * ) Notice: Subject to any disclaimer, the term of this patent is extended or adjusted under 35 U.S.C. 154(b) by 892 days.

(21) Appl. No.: 12/285,384

(22) Filed: Oct. 3, 2008

(65) Prior Publication Data

US 2009/0079215 A1 Mar. 26, 2009

Related U.S. Application Data

(63) Continuation of application No. PCT/JP2007/069919, filed on Oct. 12, 2007.

(30) Foreign Application Priority Data

Oct. 12, 2006 (JP) ................................. 2006-278291
Nov. 30, 2006 (JP) ................................. 2006-324721

(51) Int. Cl.
*B60R 7/06* (2006.01)

(52) U.S. Cl.
USPC .................................... 296/37.12; 312/319.2

(58) Field of Classification Search
USPC ............... 296/37.12, 76; 312/333, 319.2, 248
See application file for complete search history.

(56) References Cited

U.S. PATENT DOCUMENTS 7,281,773 B2 * 10/2007 Sato et al. ..................... 312/333
7,431,410 B2 * 10/2008 Sato et al. ..................... 312/333

FOREIGN PATENT DOCUMENTS

| | | |
|---|---|---|
| JP | H09-142221 | 6/1997 |
| JP | 2002-213138 | 7/2002 |
| JP | 2003-161073 | 6/2003 |
| JP | 2006-082615 | 3/2006 |
| JP | 2006-123952 | 5/2006 |
| JP | 2006-125478 | 5/2006 |
| JP | 2007-145298 | 6/2007 |
| JP | 2007-145300 | 6/2007 |

* cited by examiner

*Primary Examiner* — Gregory J. Strimbu
(74) *Attorney, Agent, or Firm* — Manabu Kanesaka

(57) ABSTRACT

A moving apparatus forcefully closes a movable body after moving the movable body to a prescribed position and includes first and second sliders and an impelling device. After the movable body has been opened, the first slider is locked in position and the second slider is attached to the movable body. As the movable body is being closed and moved to the prescribed position, the second slider moves relative to the first slider tensioning the impelling device. Once the movable body has reached the prescribed position, the second slider releases the movable body and is locked in position, and the first slider is attached to the movable body. The impelling device then urges the first and second sliders towards one another causing the movable body to close.

10 Claims, 52 Drawing Sheets

Fig. 1

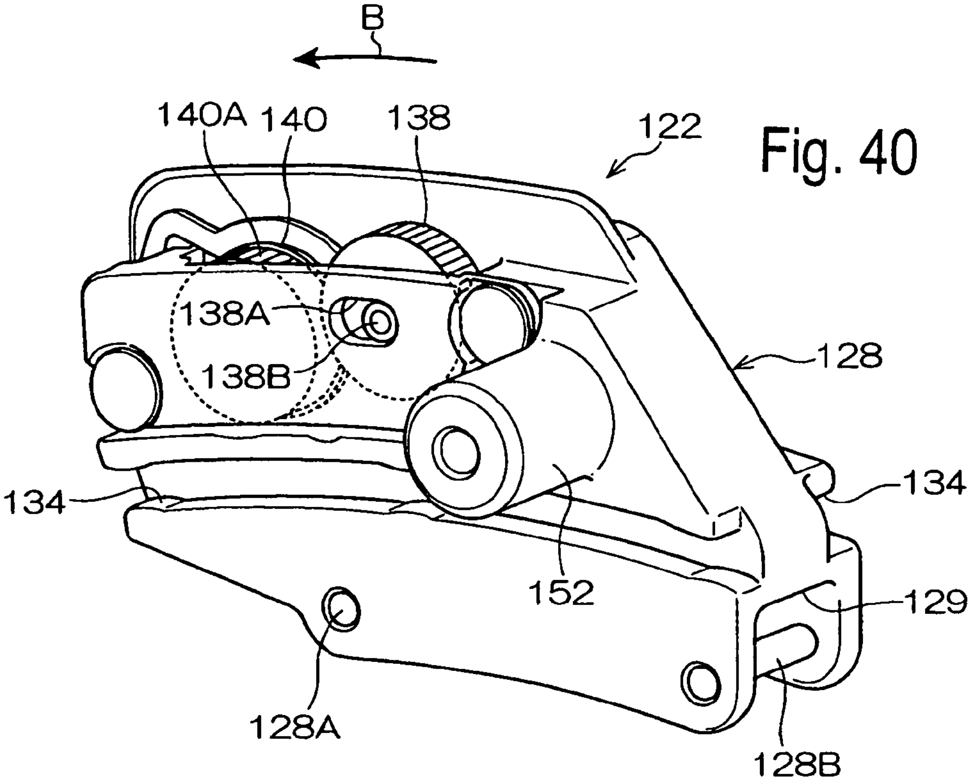
Fig. 40
Fig. 41
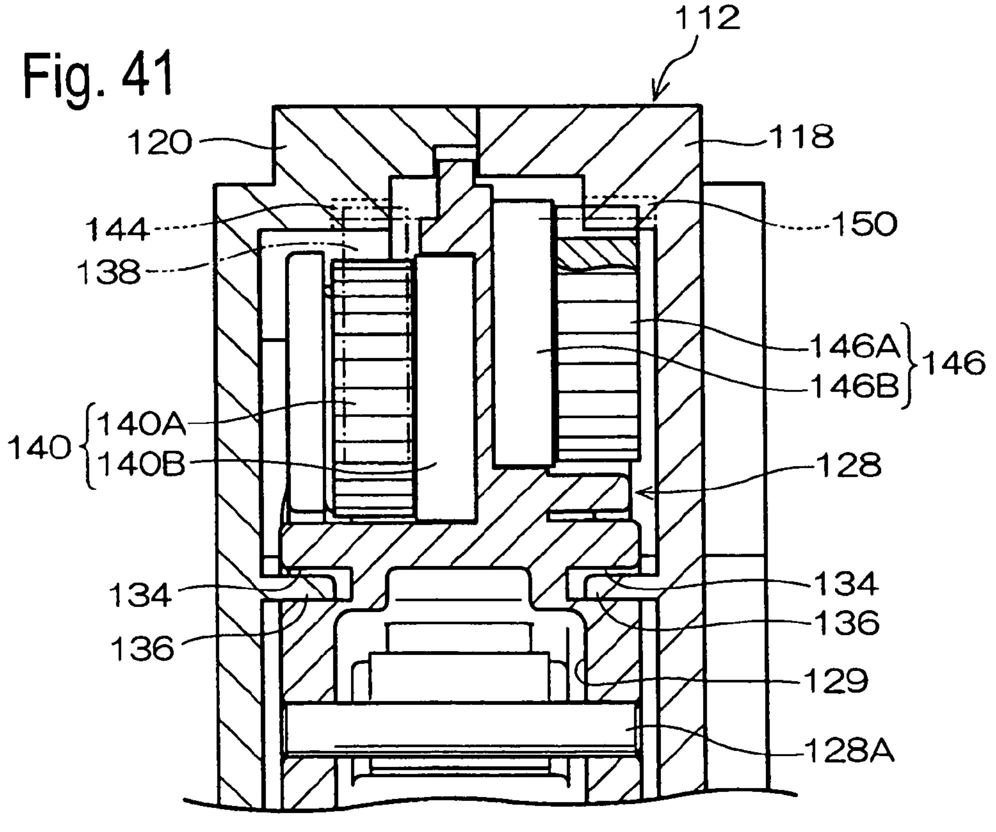

MOVABLE BODY MOVING APPARATUS

CROSS-REFERENCE TO RELATED APPLICATIONS

The present application is a continuation application of PCT/JP2007/069919 filed on Oct. 12, 2007, which claims priority of Japanese Patent Application No. 2006-278291 filed on Oct. 12, 2006 and Japanese Application No. 2006-324721 filed on Nov. 30, 2006, and the contents of the disclosures of these applications are incorporated herein.

FIELD OF TECHNOLOGY

This invention relates to a moving apparatus, as well as a lid apparatus using this, which combines a fixed body and a movable body in a state enabling this movable body to move forward and backward, and in a manner such that after being operated to move up to a prescribed position this movable body is moved backward forcefully (automatically) up to the position at the end of backward movement (that is, again the position before forward movement).

There is a storage compartment which is constituted such that, using a turn-over spring, in the closed state of the storage compartment, an arm having one end axially supported to be capable of rotation on an attachment body (fixed body) and the other end hooked on the storage compartment (movable body) is impelled toward the closed direction to maintain this closed state, and when the storage compartment is rotated for a prescribed angle toward the open direction, thereafter this is rotated toward the open direction to maintain the open state in the fully open position (Japanese Examined Utility Model Publication No. H7-17591).

However, in such storage compartment, in order to open up (move forward) the storage compartment in the closed position, it was necessary to rotate this up to said prescribed angle in opposition to the impulsion of said spring.

The matter this invention attempts to solve is to combine a fixed body and a movable body in a state enabling this movable body to move forward and backward, and in a manner such that during forward movement it is moved forward from the position before forward movement up to the position at the end of forward movement without any resistance whatsoever, and during backward movement after the movable body is moved backward up to a prescribed position it is moved backward forcefully up to the position at the end of backward movement.

In order to achieve said task, in the first embodiment of the present invention, the movable body moving mechanism is made to have the constitution of (1) to (8) below.

(1) It comprises: a pair of sliders which is provided to be capable of sliding movement on either one side of the movable body and a fixed body, combining a first slider and a second slider and an impelling means which normally impels in linkage the two sliders toward the direction of moving them closer;

(2) a first engaging part which is provided on the other side of the movable body and the fixed body and a second engaging part which is provided with a space in between in the direction of sliding movement of the pair of sliders between it and this first engaging part;

(3) a first slide lock part which is provided on one side of the movable body and the fixed body and a second slide lock part which is provided with a space in between in the direction of sliding movement of the pair of sliders between it and this first slide lock part; and (4) a means for releasing of the slide lock of the second slider by this second slide lock; and (5) it is made such that: in the position before forward movement of the movable body, the second slider is locked against sliding in the state having released the second engaging part, and the first slider is made free to slide in the state having caught the first engaging part;

(6) in the position at the end of forward movement of the movable body, the first slider is locked against sliding by the first slide lock part in the state having released the first engaging part, and the second slider is made free to slide in the state having caught the second engaging part;

(7) in the course of operating the movable body in the position at the end of forward movement to move backward up to a prescribed position the second slider is moved away from the first slider and force is accumulated in the impelling means; and (8) after this when the movable body reaches the prescribed position, the second slider releases the second engaging part and is locked against sliding, and the first slider catches the first engaging part and is made free to slide.

Moving of the first slider, having caught the first engaging part, away from the second slider, being locked against sliding by the second slide lock part, is blocked by the impelling means, therefore the state of the movable body being in the position before forward movement is maintained. From this state, when the slide lock of the second slider is released by the releasing means, forward movement of the movable body is allowed. When the movable body reaches the position at the end of forward movement, the first slider is locked against sliding in the state having released the first engaging part, while the second slider is made free to slide in the state having caught the second engaging part, therefore when the movable body in the position at the end of forward movement is caused to move backward, only the second slider is moved backward up to the prescribed position and force is accumulated in the impelling means. When the movable body is moved backward up to the prescribed position, the second slider releases the second engaging part and is locked against sliding, while the first slider catches the first engaging part and is made free to slide, therefore the first slider is forcefully moved backward by the impulsion of the impelling means, and by this the movable body also is forcefully moved backward up to the position before forward movement.

In such moving apparatus, in the third embodiment of the present invention, it may adopt the concrete constitution according to (1) to (6) below.

(1) The first slider and the second slider each have a slider main body and a rotating body which is assembled to be capable of rotation on this slider main body;

(2) the rotating body of the first slider has a sliding contact part on the side ahead of forward movement of the movable body from its rotating shaft, and it has a receiving recessed part for the first engaging part between this rotating shaft and the sliding contact part;

(3) the rotating body of the second slider has a sliding contact part on the side ahead of backward movement of the movable body from its rotating shaft, and it has a receiving recessed part for the second engaging part between this rotating shaft and the sliding contact part;

(4) a sliding contact rail part for these sliding contact parts is formed on one side of the movable body and the fixed body;

(5) a first slide lock part is formed on the side of the rail end of this sliding contact rail part positioned ahead of forward movement of the movable body, and a second slide lock part is formed on the side of the rail end of this sliding contact rail part positioned ahead of backward movement of the movable body; and (6) it is made such that the rotating body is tilted by entry of the sliding contact part into the slide lock part and it becomes possible for the engaging part to come out from the receiving recessed part.

In the second embodiment of the present invention, it is made such that forward movement of the movable body is accomplished, when the slide lock of the second slider was released in the position before forward movement of the movable body, by the force normally applied on said movable body in the direction of causing this movable body to move forward to the position at the end of forward movement. If such is done, then it is possible to move the movable body forward up to the position at the end of forward movement without applying external force, by releasing the slide lock of the second slider from the state of the movable body being in the position before forward movement.

In the fourth embodiment of the present invention, it may be made such that the rotating body of the second slider has: a claw body which is axially supported on the side ahead of backward movement of the movable body, has a top part on the side ahead of forward movement of the movable body from the position of this axial support, and has a wall part on the side ahead of forward movement of the movable body sandwiching this top part in between as one wall part of the receiving recessed part; and an impelling means which normally impels this claw body to the protruding position.

In the fifth embodiment of the present invention, in the course of moving the movable body forward completely, in the position where the first slider is locked against sliding by the first slide lock part, the first engaging part comes out forward from this first slider and the movable body is moved further forward, and the second engaging part is struck against the wall part on the side ahead of backward movement of the movable body sandwiching the top part of the claw body. Because the position of axial support of the claw body is on this side ahead of backward movement, the claw body is for a time rotated to draw in downward by this striking in opposition to the impulsion, and after this it is again rotated to protrude outward by the impulsion at the position where the second engaging part passes the top part of this claw body and it allows the second engaging part to enter the receiving recessed part. When the movable body in the position at the end of forward movement is operated to move backward, although the second engaging part comes to be pushed against this claw body, it can be made such that the claw body is not rotated to draw in by this pushing against. By this, when operating the movable body to move backward the second slider is moved in linkage accompanying this whereby it is possible to cause the second slider to move away from the first slider being locked against sliding while causing force to be accumulated in the impelling means constituting the pair of sliders.

If it is made such that a space is formed between the first slider and the second slider in the position before forward movement of the movable body, then it can be made such that the second slider is drawn closer to the first slider by the impelling means constituting the pair of sliders at the same time as the slide lock of the second slider is released by said releasing means, and the sliding contact part of the second slider is does not unexpectedly enter the second slide lock part regardless of having made said release.

In the sixth embodiment of the present invention, it is made to have a damping means which applies damping to the movement of the movable body at least on either one side or both sides of the end of forward movement and the end of backward movement of the movable body. If such is done, then it is possible to decelerate the speed of the movable body and suppress the generation of impact noise, and the like, at least on either one side or both sides of the end of forward movement and the end of backward movement of the movable body, as well as to give a sense of high quality, and the like, to its movement.

In the seventh embodiment of the present invention, it may be made such that: the damping means is constituted by a damper body comprising a piston and a cylinder and an impelling means which normally impels this piston toward the direction of pushing out from inside the cylinder, and being constituted so as to apply damping to the advancement of the piston into the cylinder.

It is made such that the piston is advanced into the cylinder at least at the end of forward movement and the end of backward movement of the movable body.

When it is made as such, when forward movement of the movable body is allowed by operation of the releasing means from the state when this movable body is in the position before forward movement, it is possible to utilize the impelling force of the impelling means of the damper body acting on the piston as a part of the force for forward movement of this movable body, and when backward movement of the movable body is performed from the state when this movable body is in the position at the end of forward movement, it is possible likewise to utilize the impelling force of the impelling means of the damper body acting on the piston as a part of the force for backward movement of this movable body.

In the eighth embodiment of the present invention, either one side of the piston and cylinder constituting the damper body is supported on the side of the pair of sliders, and a pusher body which pushes against the other side of said piston and cylinder in the course of forward movement of this movable body is provided on the side of the movable body. If such is done, then it is possible to make the piston advance inward at the end of forward movement to attenuate the speed of the movable body.

In the ninth embodiment of the present invention, either one side of the piston and the cylinder constituting the damper body is supported on the side of the pair of sliders, and a wall body which is pushed against the other side of said piston and cylinder in the course of backward movement of this movable body is provided on the side of the fixed body. If such is done, then it is possible to make the piston advance inward at the end of backward movement to attenuate the speed of the movable body.

In the tenth embodiment of the present invention, an engaging part which engages with a part engaged with formed on the movable body in the position before forward movement of this movable body is provided on the fixed body, and there is provided a means for disengagement of this engagement. If such is done, then it is possible to support stably the state of the movable body being in the position before forward movement.

In the eleventh embodiment of the present invention, the part engaged with is provided in at least two places with a space in between in the direction intersecting with the direction of movement of said movable body, and the engaging part corresponding to this is provided on the fixed body. If such is done, then it is possible to hold the movable body in the position before forward movement on the fixed body in two places making different the positions in the direction intersecting with the direction of its movement so that looseness and gaps, and the like, do not arise.

In the twelfth embodiment of the present invention, it may be made such that said means for disengagement and means for releasing of the slide lock of the second slider are linked, and the slide lock of the second slider is released at the same time as the engagement of the engaging part of the fixed body with the part engaged with of the movable body is released.

In the thirteenth embodiment of the present invention, a lid apparatus is constituted using the movable body constituting said moving as a lid which closes an opening of a main body serving as the fixed body. If such is done, then it is possible to move the lid forward from the state when the lid is in the position before forward movement up to the position at the end of forward movement without applying external force, by releasing the slide lock of the second slider. Also, by operating the lid to move backward from the position at the end of forward movement to the prescribed position, from there onward it is possible to move the lid backward forcefully up to the position before forward movement by the movement of the pair of sliders. Furthermore, by said damping means, it is possible to decelerate the speed at least at the end of forward movement and the end of backward movement of this lid and suppress the generation of impact noise, and the like, as well as to give a sense of high quality, and the like, to the movement of the lid apparatus.

The fourteenth embodiment of the present invention is characterized in that, in a movable body moving apparatus, it has: a first member and a second member which are provided on a movable body or a fixed body and move relative to each other by movement of said movable body; an impelling means of which one end part is connected to said first member and the other end part is connected to said second member and impelling force is accumulated by the relative movement of said first member and second member; and a power transmission means which, after said first member is moved and impelling force is accumulated in said impelling means by movement of said movable body, locks the first member, unlocks said second member, moves the second member by the returning force of said impelling means, and moves the movable body via said second member.

In the fourteenth embodiment of the present invention, the first member and the second member which move relatively (move closer or move away) by movement of said movable body are provided on the movable body (or the fixed body), the first member is moved (the first member is moved relative to the second member) by movement of the movable body by the power transmission means, and impelling force is accumulated in the impelling means. After the impelling force was accumulated in the impelling means, the first member is locked and the second member is unlocked and becomes capable of movement. Because of this, the returning force of the impelling means comes to act on the second member, but it is made such that the movable body is moved via this second member.

By this, when moving the movable body, from the position at the start of movement of the movable body to mid-course of movement, the first member is moved and force in the direction opposing the impelling force of the impelling means becomes separately necessary (in the case when the movable body moves downward, the dead weight of the movable body also is added), but when near the position at the end of movement, the second member is made capable of movement, and it is made such that the movable body is moved by the returning force of the impelling means, whereby the load of manual operation of the movable body is decreased (low-load interval), or the load of manual operation is made unnecessary (zero-load interval) by the returning force of the impelling means exceeding the load of operation of the movable body, and it becomes possible to draw in the movable body automatically.

The fifteenth embodiment of the present invention is characterized in that, in a movable body moving apparatus, it has: a first member and a second member which are provided on a movable body or a fixed body and move relative to each other by movement of said movable body; a slider which is provided on said movable body or fixed body and moves by movement of said movable body; an impelling means of which one end part is connected to said first member and the other end part is connected to said second member and impelling force is accumulated by the relative movement of said first member and second member; a first lock part which is provided on the track of movement of said first member and restricts movement of the first member; a first connecting part which is provided on said first member and is connected with said slider, and the state of connection with said slider is released when said first member having moved relative to said second member is restricted against movement by said first lock part; and a second connecting part which is provided on said second member, and it is connected with said slider when the state of connection of said first connecting part and said slider is released, and it moves said movable body via the slider by the returning force of the impelling means.

In the fifteenth embodiment of the present invention, the slider which moves by the movement of the movable body is provided in the movable body (or the fixed body). To this slider, it is made possible to connect the first member and the second member which move relative to each other (move closer or move away) by the movement of the movable body, and impelling force is accumulated in the impelling means by the relative movement of this first member and second member.

The first lock part which restricts the movement of the first member is provided on the track of movement of the first member. Also, the first connecting part which is capable of connection with the slider is provided on the first member, and it is made such that the state of connection with the slider is released when the first member is restricted against movement by the first lock part.

Meanwhile, the second lock part which restricts the movement of the second member is provided on the track of movement of the second member. Also, the second connecting part which is capable of connection with the slider is provided on the second member, and it connects with said slider when the state of connection of the first connecting part and the slider is released, and the movable body is moved via the slider by the returning force of the impelling means.

That is, it becomes that the power transmission path is switched between the slider and the first member and the second member, and in the state when the first connecting part is connected to the slider, it is made capable of moving the first member via the first connecting part, and the first member is moved relative to the second member. By this, impelling force is accumulated in the impelling means.

Also, when the first member reaches the first lock part, the first member is restricted against movement, and the state of connection of the first connecting part and the slider is released. Next, the second connecting part is connected with the slider, and the second member becomes capable of movement, but the returning force of the impelling means acts on the second member, and by this the second member comes to move. By the movement of this second member, the movable body moves via the slider.

The sixteenth embodiment of the present invention is characterized in that, in the movable body moving apparatus in the fourteenth or fifteenth embodiment of the present invention, said impelling means is a constant load spring which accumulates impelling force by winding out a spring member, and said constant load spring is attached to a link member provided on said first member, and said spring member of the constant load spring is connected to said second member.

In the sixteenth embodiment of the present invention, the link part is provided on the first member, and the constant load spring is attached on said link member. By the fact that the spring member of this constant load spring is connected to the second member, impelling force is accumulated in the impelling means when the first member is moved relatively with to the second member.

The seventeenth embodiment of the present invention is characterized in that, in the movable body moving apparatus in any of the fourteenth to sixteenth embodiments of the present invention, said first member and said second member move relatively with movement of said movable body toward one direction, and the first member and the second member do not move relatively with movement of the movable body toward the other direction.

In the seventeenth embodiment of the present invention, as concerns the movement of the movable body toward the other direction, because impelling force is not accumulated in the impelling means, during movement of the movable body toward the other direction, force toward the direction opposing the impelling force of the impelling means becomes unnecessary.

The eighteenth embodiment of the present invention is characterized in that, in the movable body moving apparatus in any of the fifteenth to seventeenth embodiments of the present invention, a prescribed distance is provided in the period from when the state of connection of said first connecting part and said slider is released to when said second connecting part and said slider are connected.

In the eighteenth embodiment of the present invention, in the state when the first connecting part and the slider are connected, the first member moves relative to the second member, and impelling force is accumulated in the impelling means. Because the second connecting part is connected with the slider after the state of connection of the first connecting part and the slider is released, it comes to be switched from the interval of manual operation of the movable body to the low-load interval or the zero-load interval, but because a prescribed time is provided during this switching, the feeling of the operating stress on the movable body suddenly being decreased and the movable body suddenly moving is decreased.

The nineteenth embodiment of the present invention is characterized in that, in the movable body moving apparatus in any of the fifteenth to eighteenth embodiments of the present invention, there are provided: a rack which is provided on the side of said movable body or fixed body; and a damper unit which is provided on said slider and has a gear which engages with said rack.

In the nineteenth embodiment of the present invention, by the fact that the rack is provided on the side of the movable body or the fixed body, and the damper unit which has a gear which engages with said rack is provided on the slider, it is possible to apply an attenuating effect on the movable body via the rack and the gear during movement of the movable body. It is possible to move the movable body gently.

The twentieth embodiment of the present invention is characterized in that, in the movable body moving apparatus in the nineteenth embodiment of the present invention, said damper unit comprises a one-way damper which applies damping force in one direction and a two-way damper which applies damping force in both directions.

In the twentieth embodiment of the present invention, by the fact that it has a one-way damper which applies damping force in one direction and a two-way damper which applies damping force in both directions, in movement of the movable body toward one direction it is possible to obtain the attenuating effect from the one-way damper and the two-way damper, and in movement of the movable body toward the other direction it is possible to obtain the attenuating effect of only the two-way damper.

The twenty-first embodiment of the present invention is characterized in that in the movable body moving apparatus in any of the fourteenth to twentieth embodiments of the present invention, said first member and second member, said impelling means, and said power transmission means are housed as a unit inside a housing case.

In the twenty-first embodiment of the present invention, by the fact that the first member and second member, the impelling means, and the power transmission means are made as a unit, attachment to the movable body or the fixed body becomes easy.

The twenty-second embodiment of the present invention is characterized in that, in a lid device, the movable body of the movable body moving apparatus in any of the fourteenth to twenty-first embodiments of the present invention is a lid which closes an opening provided on the fixed body.

In the twenty-second embodiment of the present invention, by the fact that the movable body is made as a lid which closes an opening provided on the fixed body, when closing (moving backward) the lid having been opened (moved forward), the first member moves from the position at the start of movement of the lid to mid-course of movement, and impelling force is accumulated in the impelling means by the movement of said first member relative to the second member. Also, when it becomes possible to move the second member instead of the first member, this second member moves by the returning force of the impelling means, and the lid is drawn in toward the closing direction via said second member.

That is, it is possible to close the lid with a constant drawing-in force, and the load of manual operation of the lid is decreased (low-load interval), or the load of manual operation is made unnecessary (zero-load interval) by the returning force of the impelling means exceeding the load of operation of the lid, and it becomes possible to draw in the lid automatically. That is, particularly in the case when the lid is opened downward, the dead weight of the lid comes to act, but it is possible to cancel that amount of load by the impelling force of the impelling means. Also, it is possible to decelerate the speed of movement of the lid and suppress the generation of impact noise, and the like, as well as to give a sense of high quality, and the like, to the operation of the lid apparatus.

According to the movable body moving apparatus pertaining to this invention, it is possible to combine the fixed body and the movable body in a state enabling this movable body to move forward and backward, and in a manner such that during forward movement it is moved forward from the position before forward movement up to the position at the end of forward movement without any resistance whatsoever, and during backward movement after the movable body is moved backward up to a prescribed position it is moved backward forcefully up to the position at the end of backward movement. Also, according to the lid apparatus of the present invention, it is possible to make the lid and the main body such that during forward movement of the lid the lid is moved forward from the position before forward movement up to the position at the end of forward movement without any resistance whatsoever, and during backward movement after the lid is moved backward up to a prescribed position the lid is moved backward forcefully up to the position at the end of backward movement.

BRIEF DESCRIPTION OF THE DRAWINGS

FIG. 23 is a partially cut structural view of essential parts of the moving apparatus of the first embodiment in an example of replacing the damping means, and the like.

FIG. 40 is a perspective view showing the power transmission slider of the moving apparatus of the second embodiment.

FIG. 41 is a sectional view taken along line 41-41 in FIG. 39.

DETAILED DESCRIPTION OF THE PREFERRED EMBODIMENTS

Preferred embodiments of this invention are explained below.

First Embodiment

The first embodiment of the present invention is explained based on FIG. 1 to FIG. 27.

Figure 1:
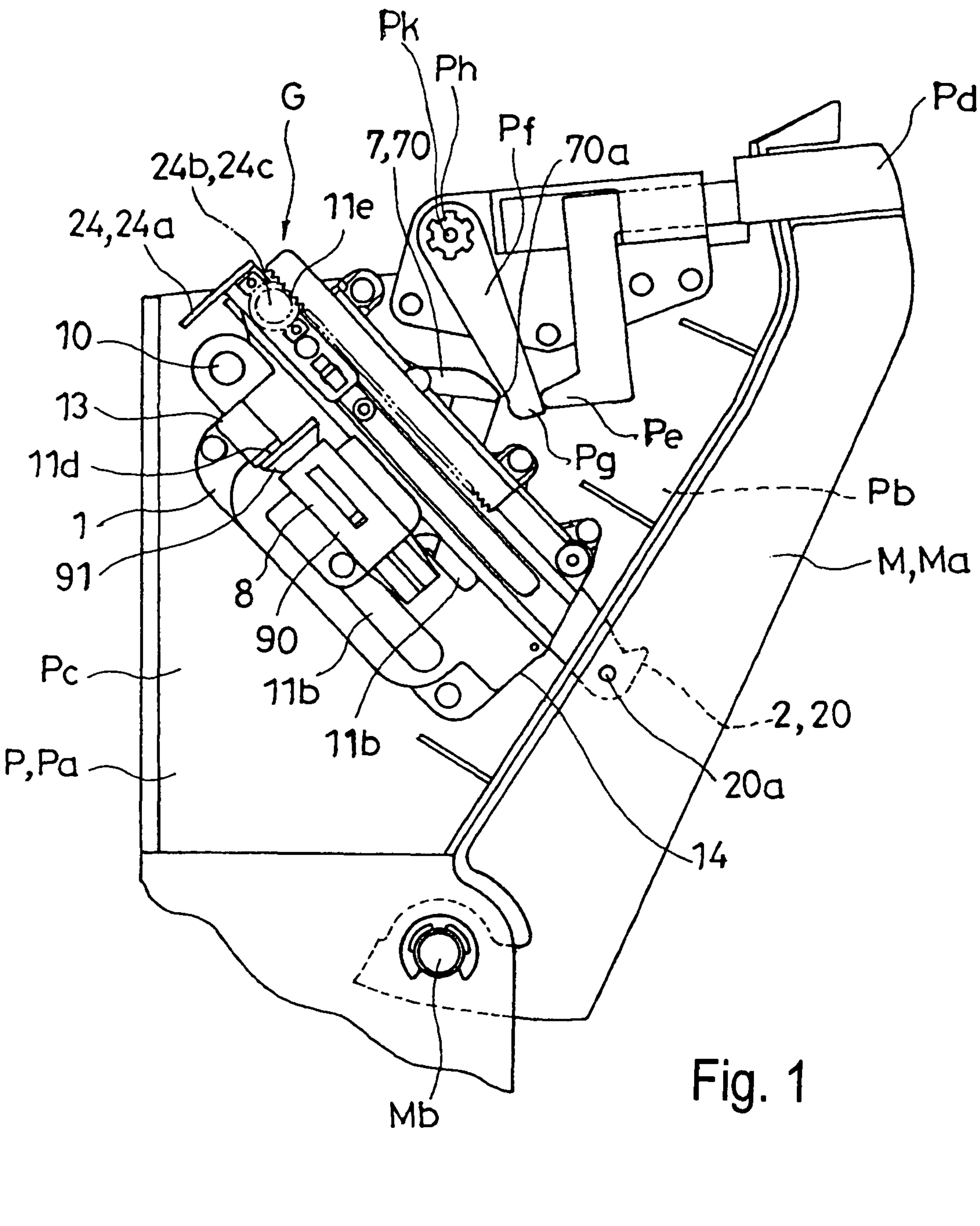
FIG. 1 is a structural side view of the lid apparatus of the first embodiment (position before forward movement).
Figure 2:
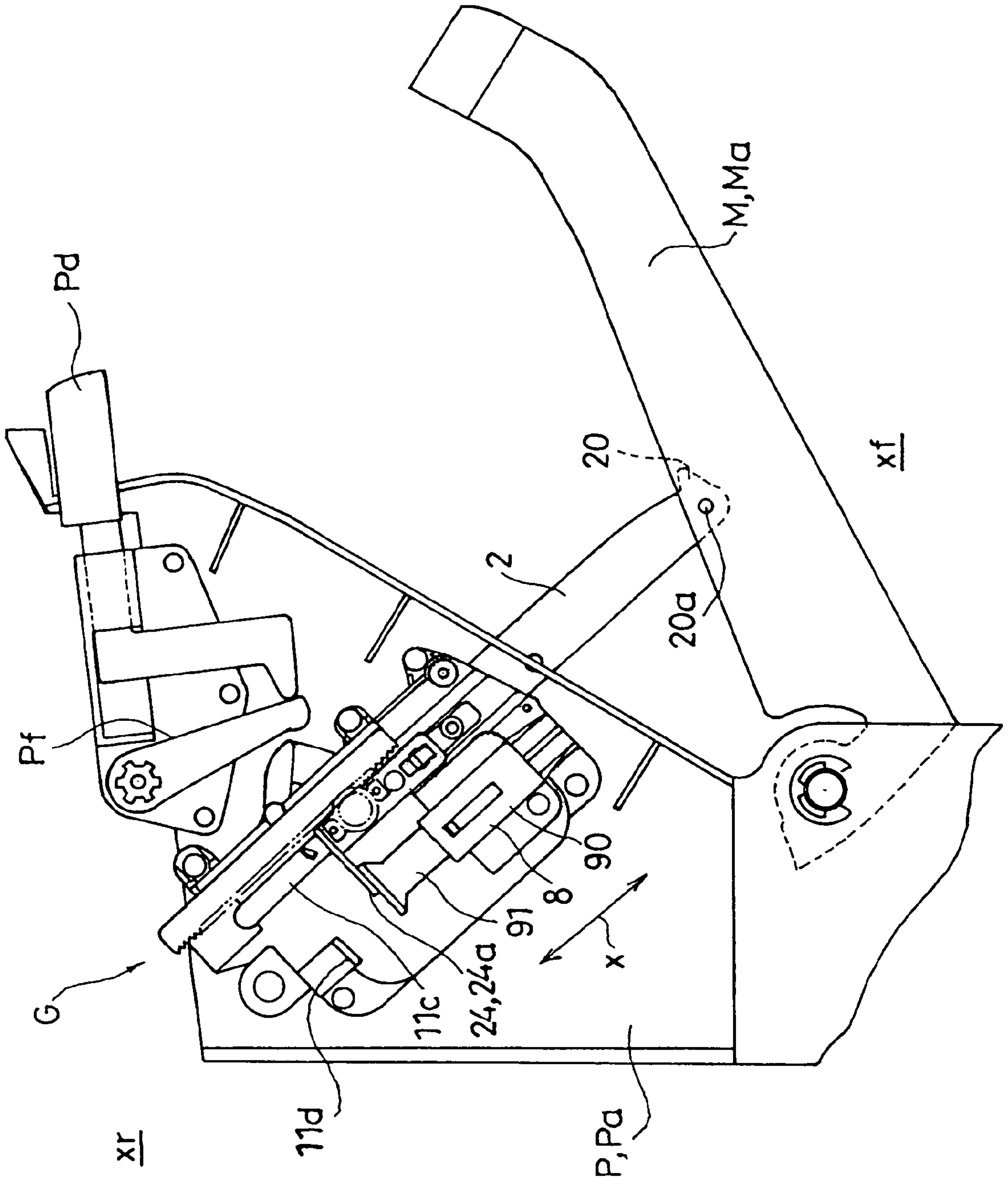
FIG. 2 is a structural side view of the lid apparatus of the first embodiment.
Figure 3:
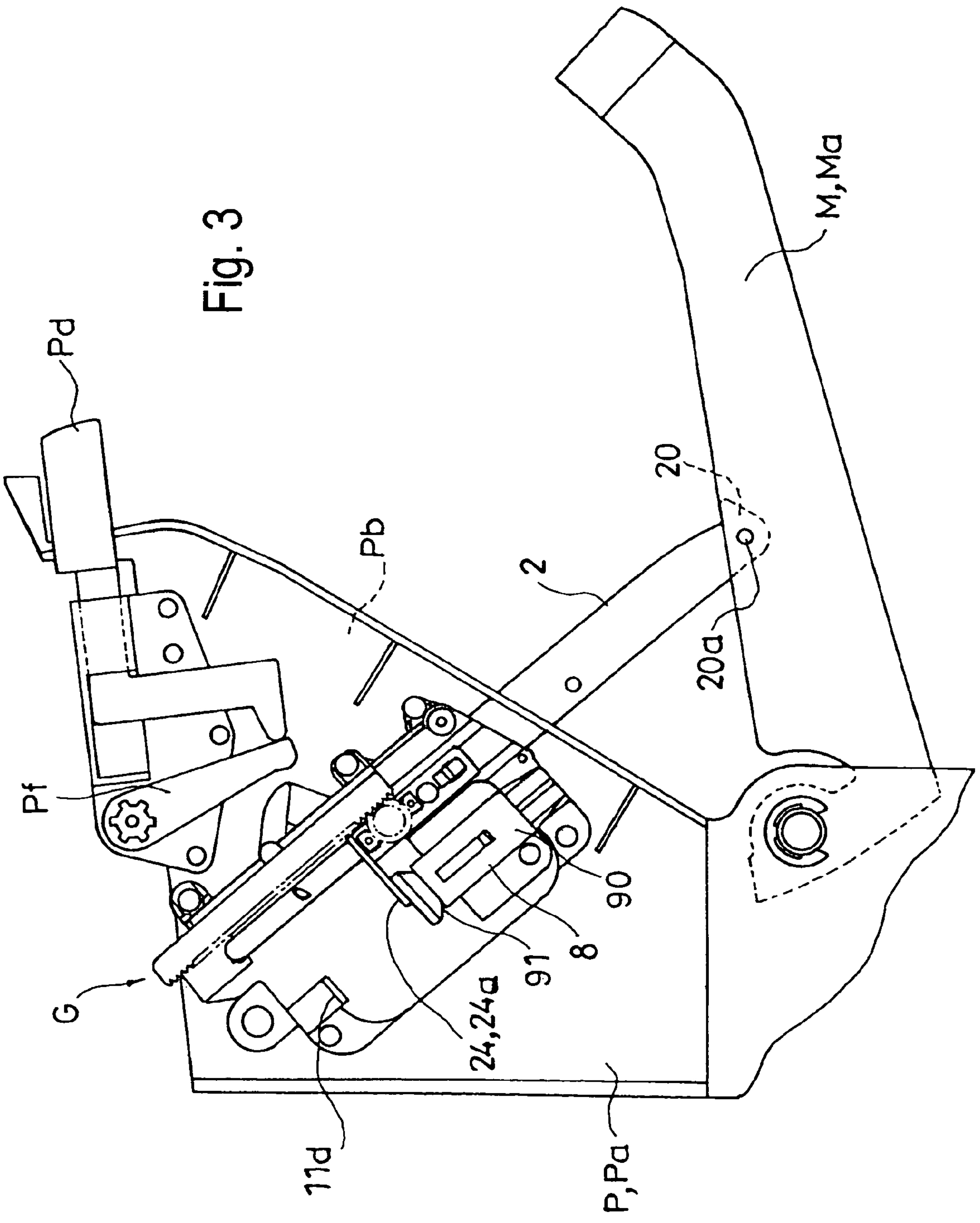
FIG. 3 is a structural side view of the lid apparatus of the first embodiment (position at the end of forward movement).

Here, FIG. 1 to FIG. 3 show states of the lid apparatus which is constituted having the moving apparatus G pertaining to this invention viewed from one side of the side plate Pc of the main body Pa constituting this lid apparatus; FIG. 1 shows the state when the lid Ma constituting the movable body M is in the position before forward movement, FIG. 3 shows the state when the lid Ma is in the position at the end of forward movement, and FIG. 2 shows the state when in mid-course of forward movement or backward movement.

Figure 4:
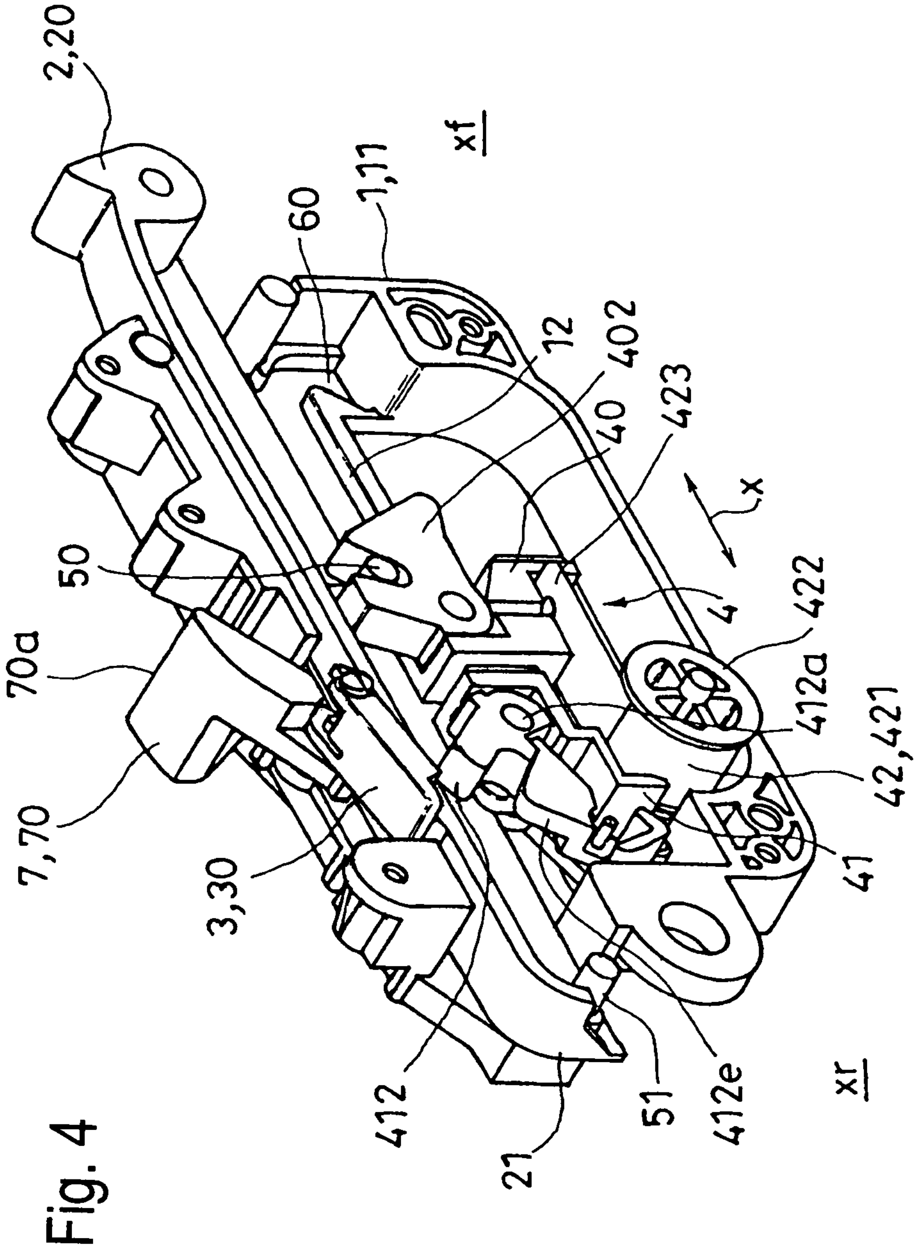
FIG. 4 is a structural perspective view of the moving apparatus in the state of removing one side of the case component body of the first embodiment (position before forward movement).
Figure 5:
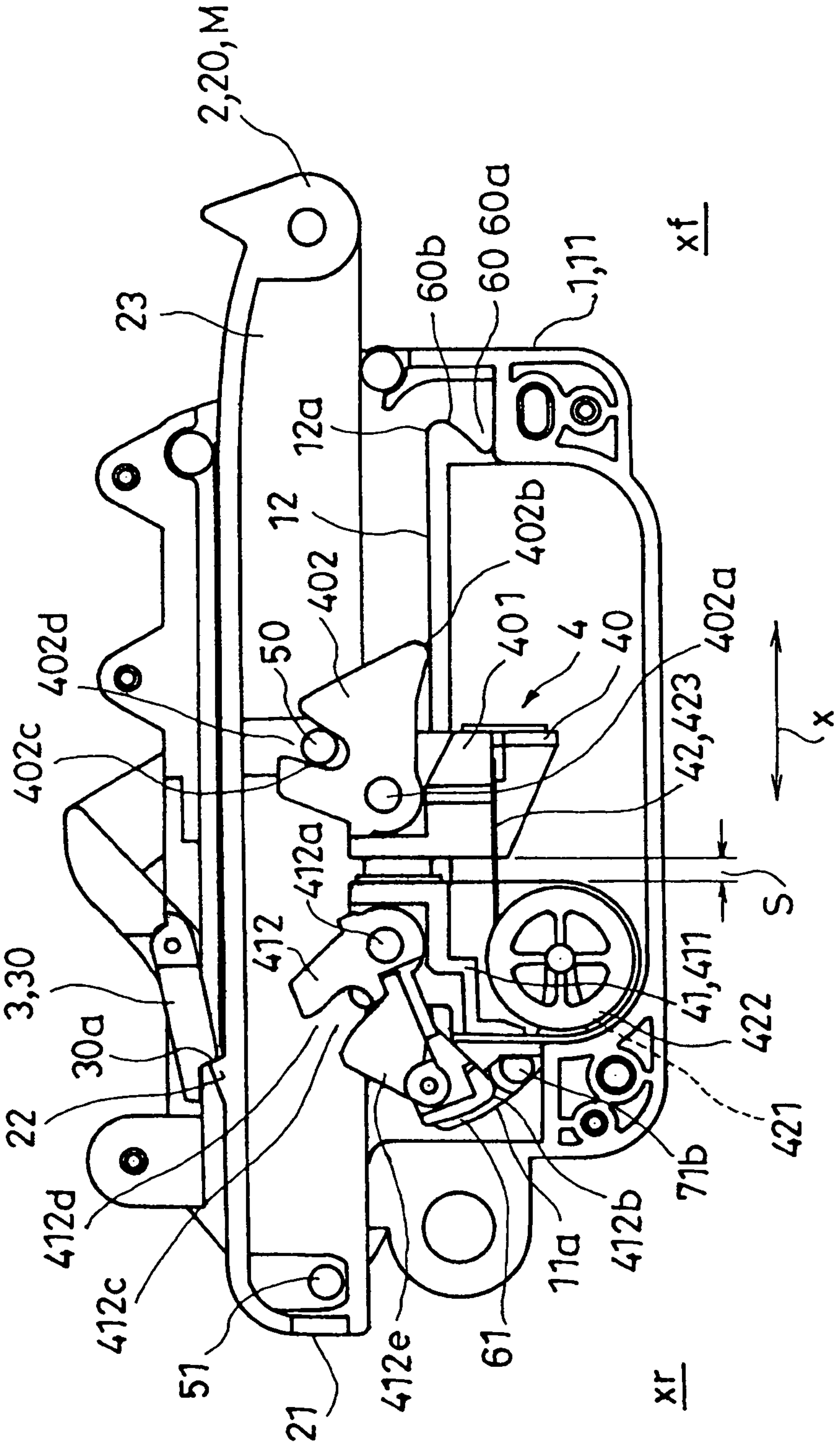
FIG. 5 is a partially cut structural view of essential parts of the moving apparatus of the first embodiment (position before forward movement).
Figure 10:
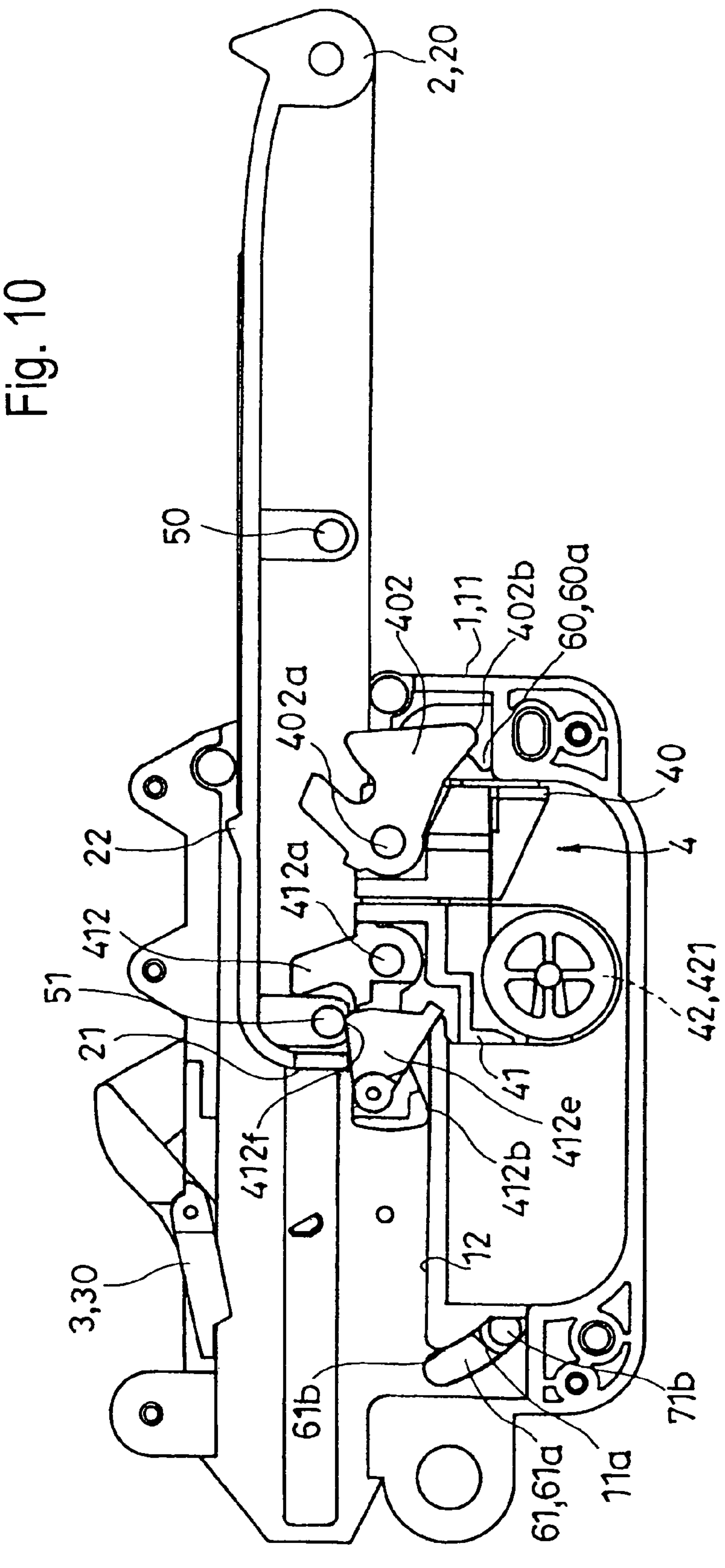
FIG. 10 is a structural perspective view of the moving apparatus in the state of removing one side of the case component body of the first embodiment (immediately before reaching an end position of the forward movement).
Figure 11:
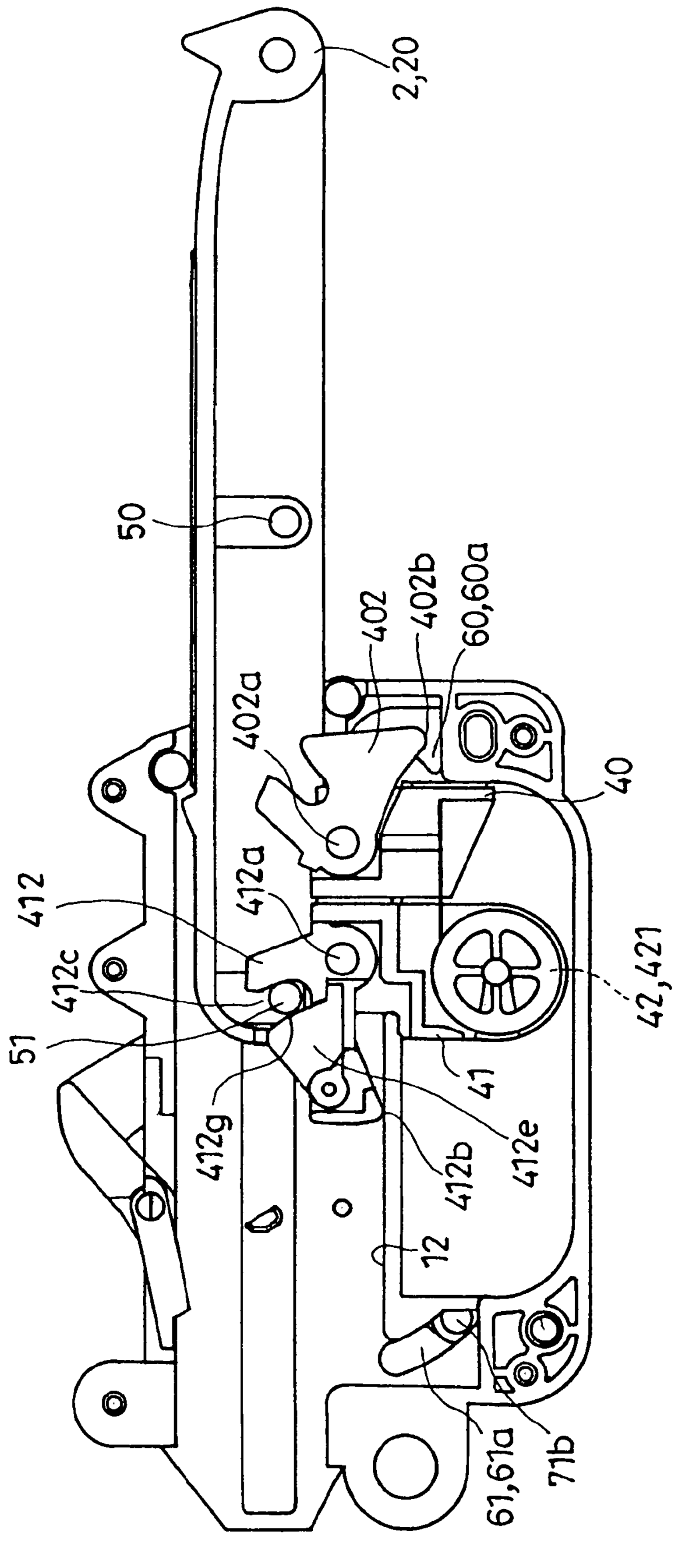
FIG. 11 is a partially cut structural view of essential parts of the moving apparatus of the first embodiment (end position of the forward movement).

FIG. 4 to FIG. 13 show the main parts of such moving apparatus which is made as a unit; FIG. 4 and FIG. 5 show the state when the lid Ma is in the position before forward movement, and FIG. 11 shows the state when the lid Ma is in the position at the end of forward movement. During forward movement of the lid Ma, the moving apparatus G moves in the order of FIG. 4 and FIG. 5->FIG. 6->FIG. 7->FIG. 8->FIG. 9 and FIG. 10->FIG. 11. During backward movement of the lid Ma, the moving apparatus G moves in the order of FIG. 11->FIG. 12->FIG. 13->FIG. 4 and FIG. 5.

Figure 14:
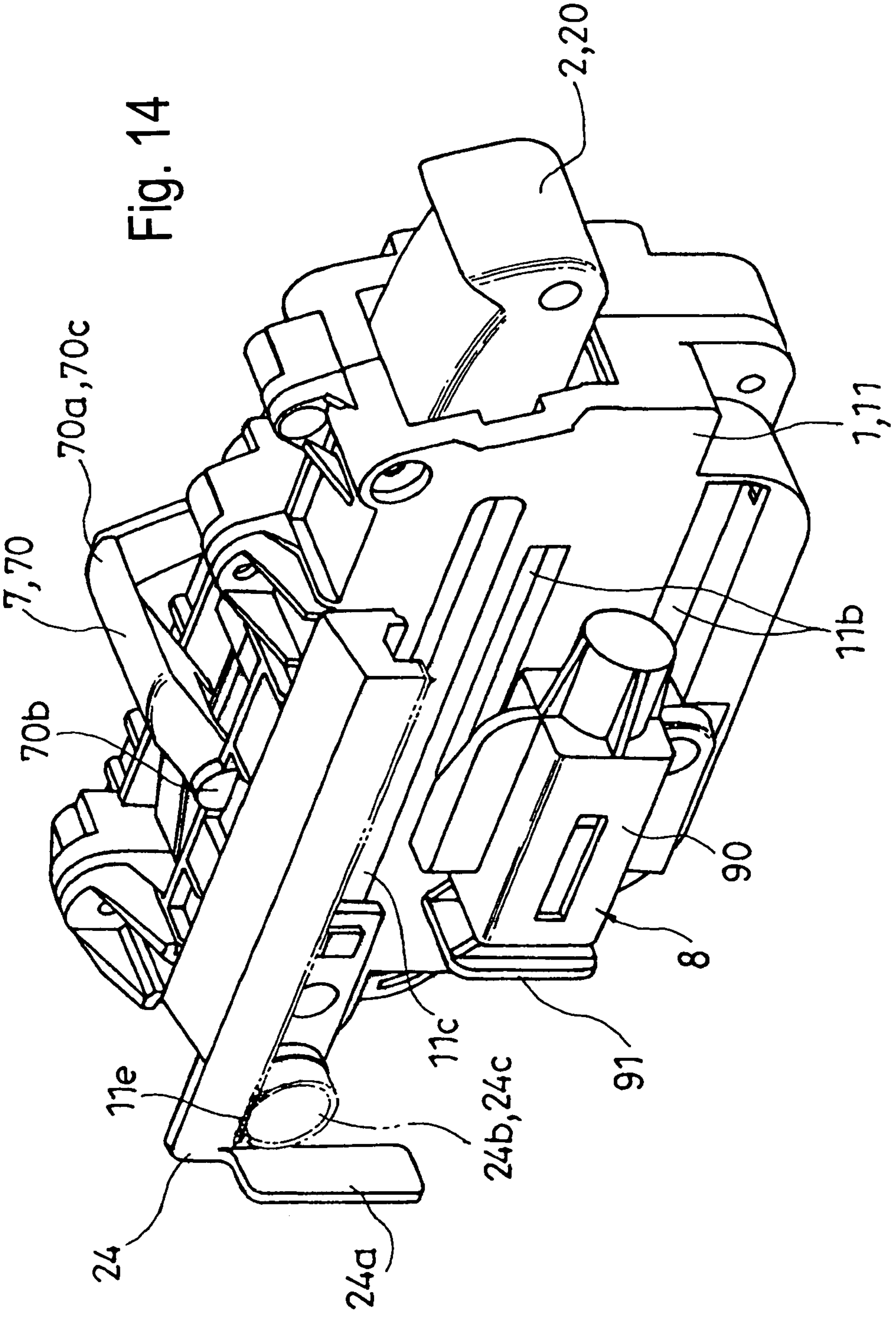
FIG. 14 is a structural perspective view of the moving apparatus of the first embodiment.
Figure 15:
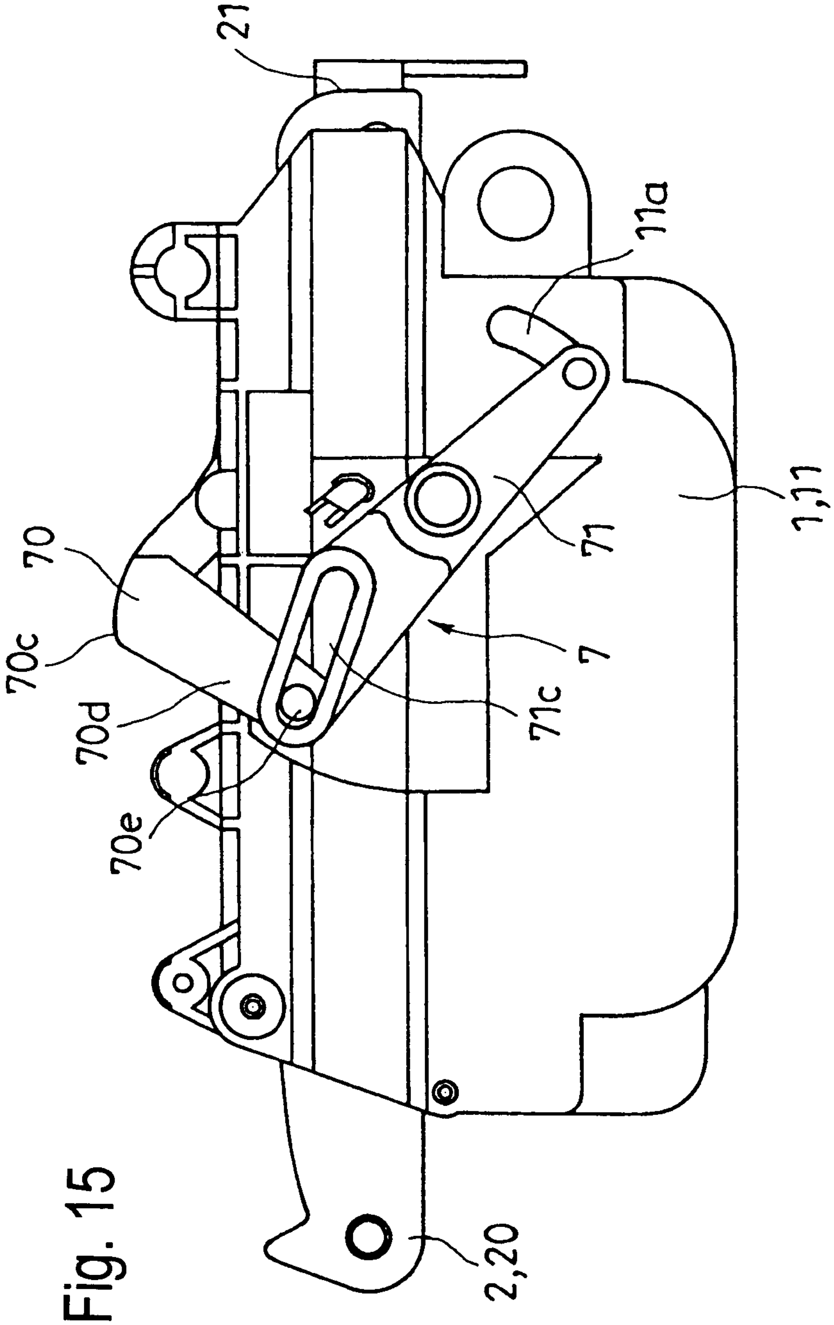
FIG. 15 is a structural side view of the moving apparatus of the first embodiment.
Figure 16:
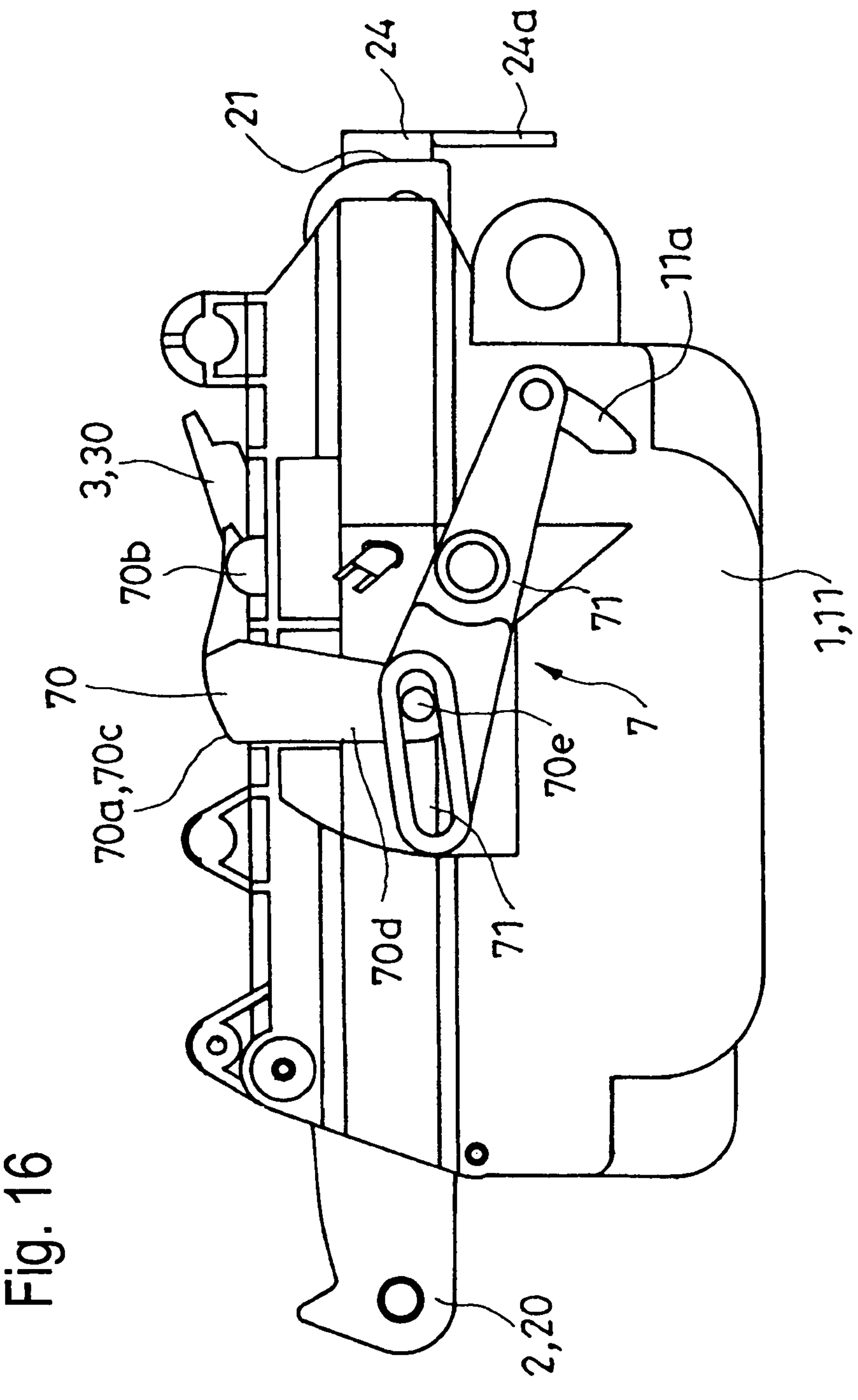
FIG. 16 is a structural side view of the moving apparatus of the first embodiment.

FIG. 14 shows such moving apparatus G which is made as a unit viewed from the side having the damping device 8, and FIG. 15 and FIG. 16 show this moving apparatus G viewed from the opposite side of the side in FIG. 14. FIG. 15 shows the manner in which the slide lock of the second slider 41 has not been released by the releasing means 7, and FIG. 16 shows the manner in which it was released.

Figure 17:
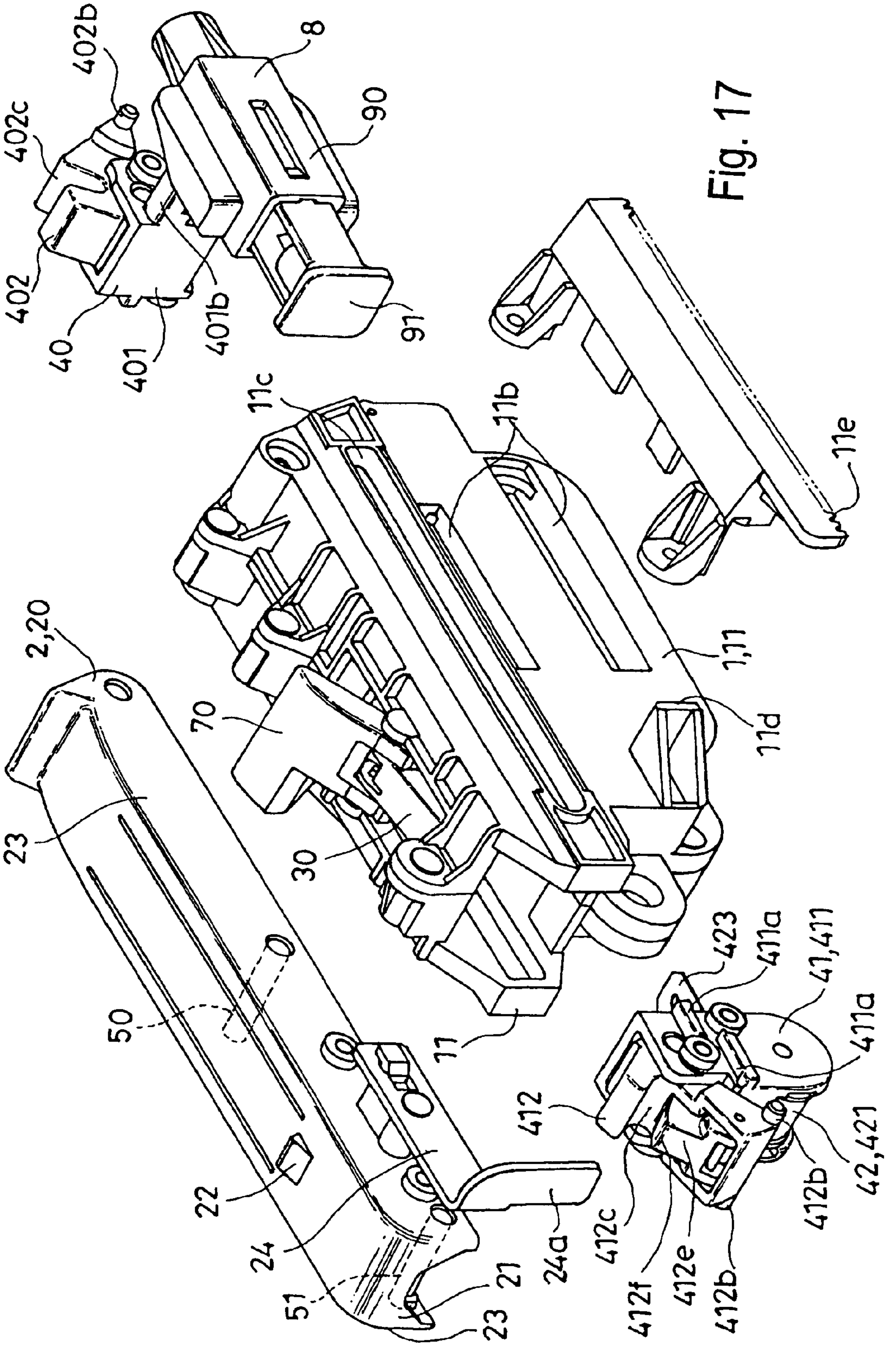
FIG. 17 is an exploded structural perspective view of the moving apparatus of the first embodiment.
Figure 18:
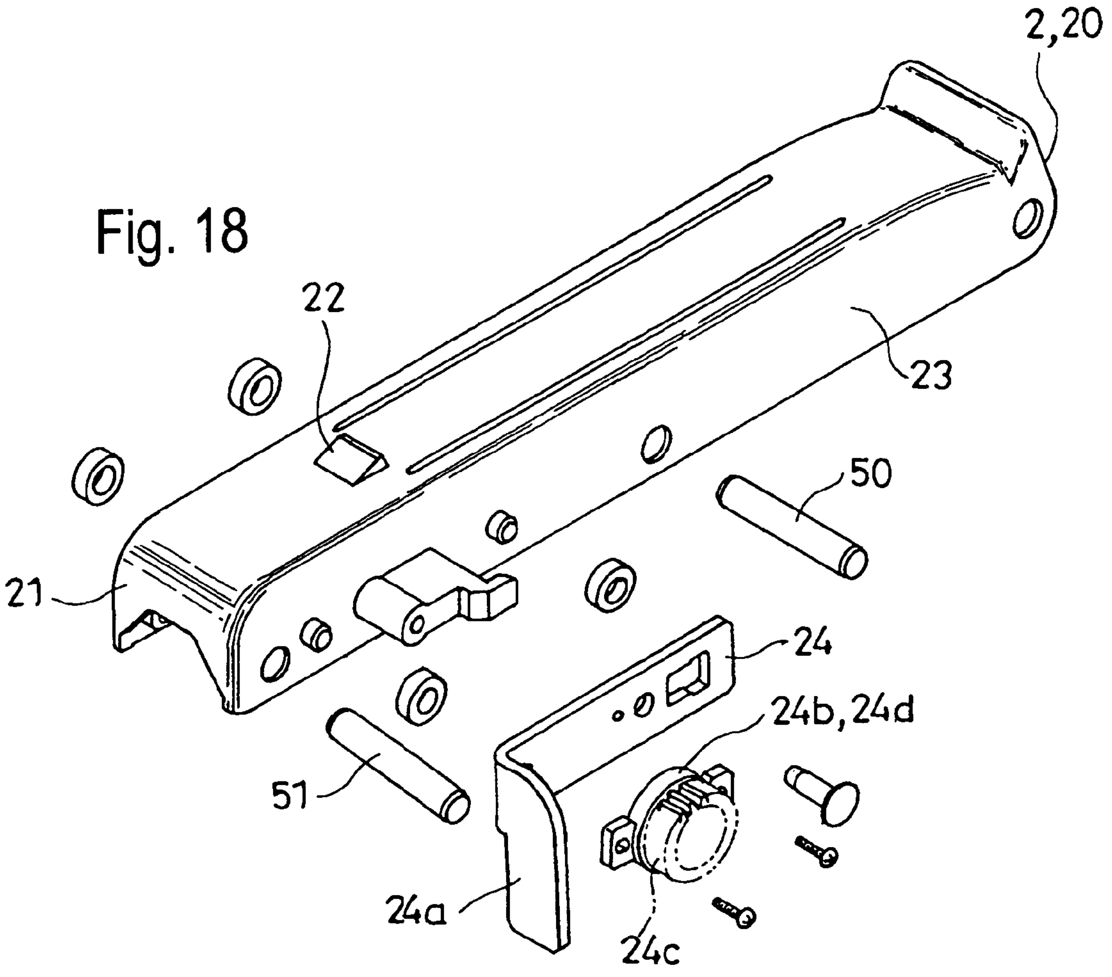
FIG. 18 is an exploded structural perspective view of the arm of the moving apparatus of the first embodiment.
Figure 19:
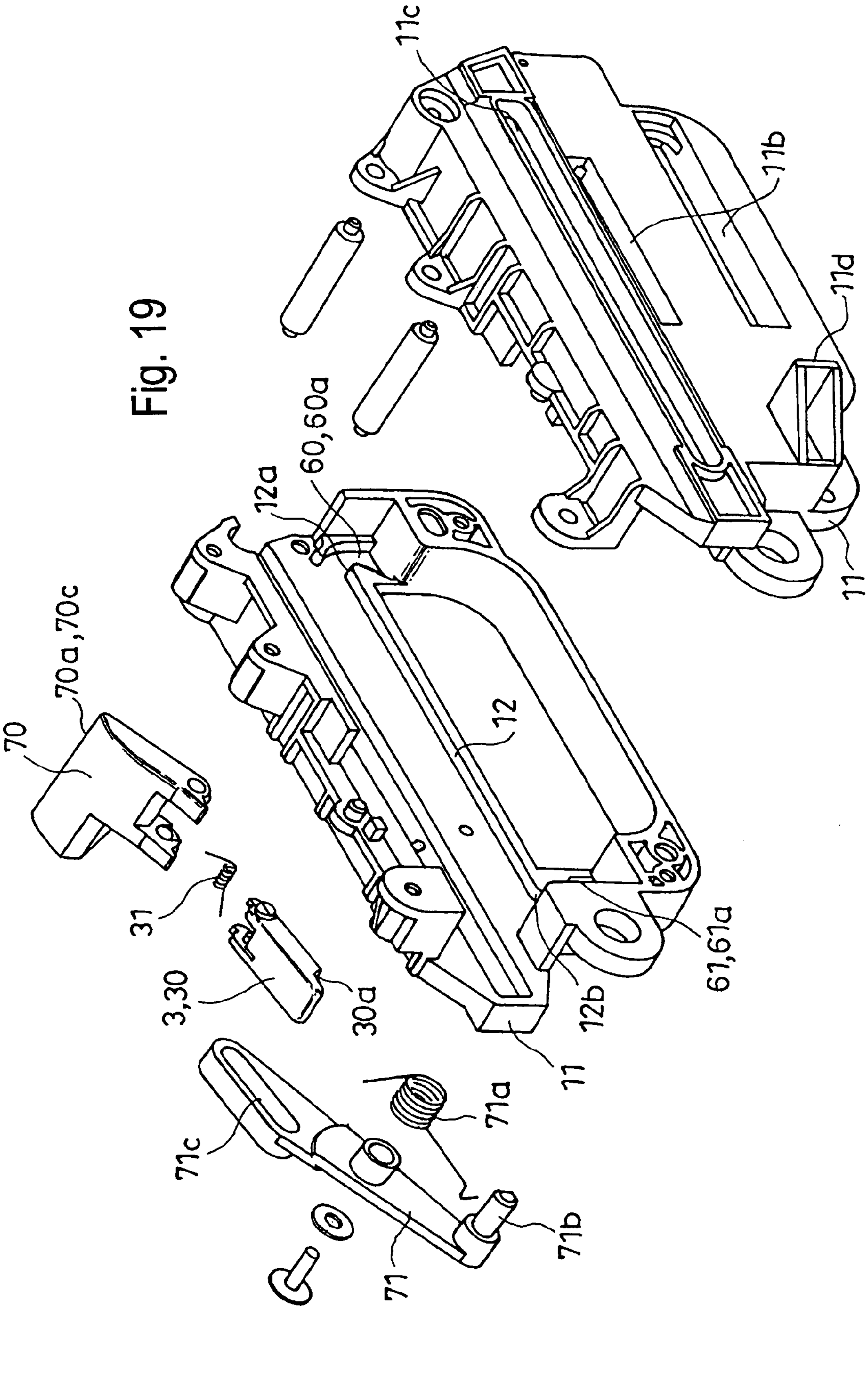
FIG. 19 is an exploded structural perspective view of the case of the moving apparatus of the first embodiment.
Figure 20:
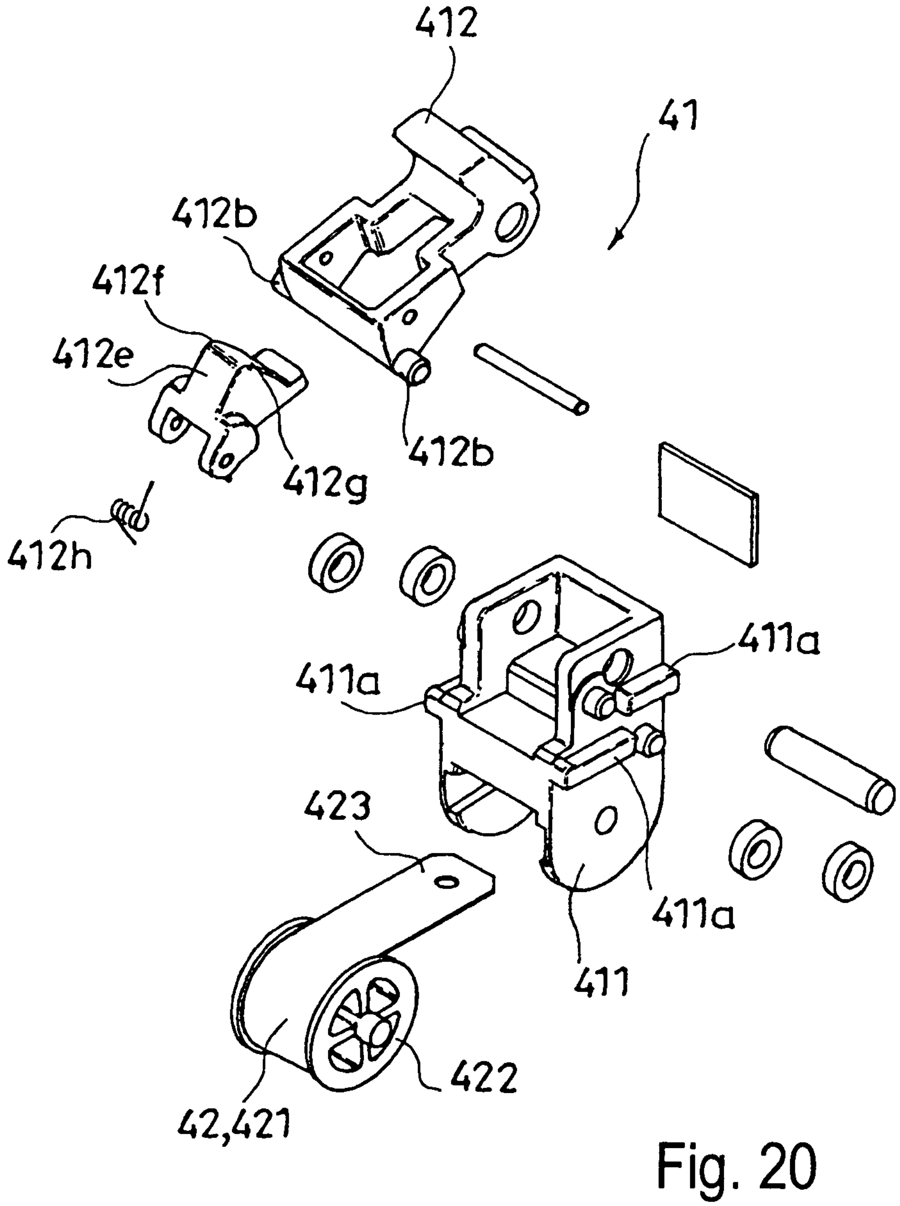
FIG. 20 is an exploded structural perspective view of the second slider of the moving apparatus of the first embodiment.
Figure 21:
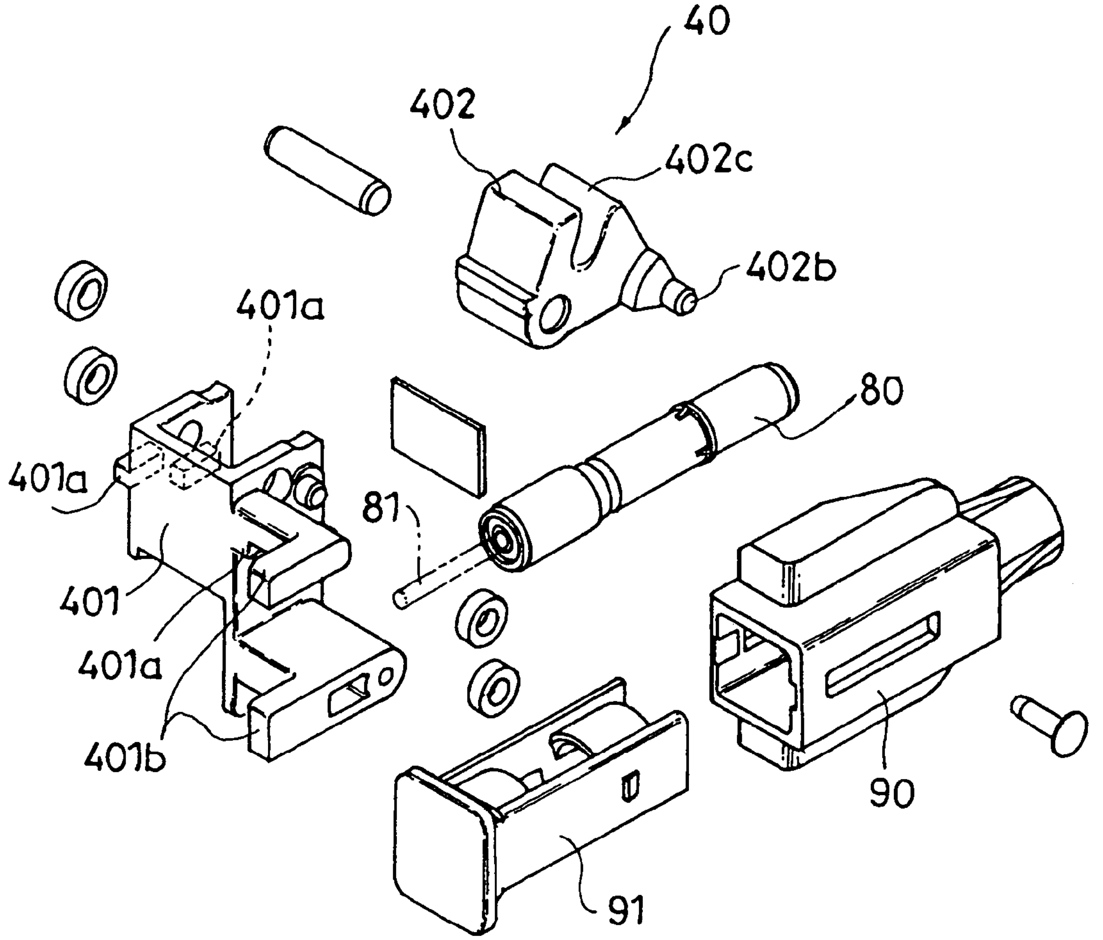
FIG. 21 is an exploded structural perspective view of the first slider of the moving apparatus of the first embodiment.

FIG. 17 shows the main constituent parts of such moving apparatus G in the disassembled state, FIG. 18 shows the arm 2 among these parts, FIG. 19 shows the case 1 and holding means 3 and releasing means 7 among these parts, FIG. 20 shows the second slider 41 among these parts, and FIG. 21 shows the first slider 40 and damping means 8 among these parts, respectively in the disassembled state.

Figure 22:
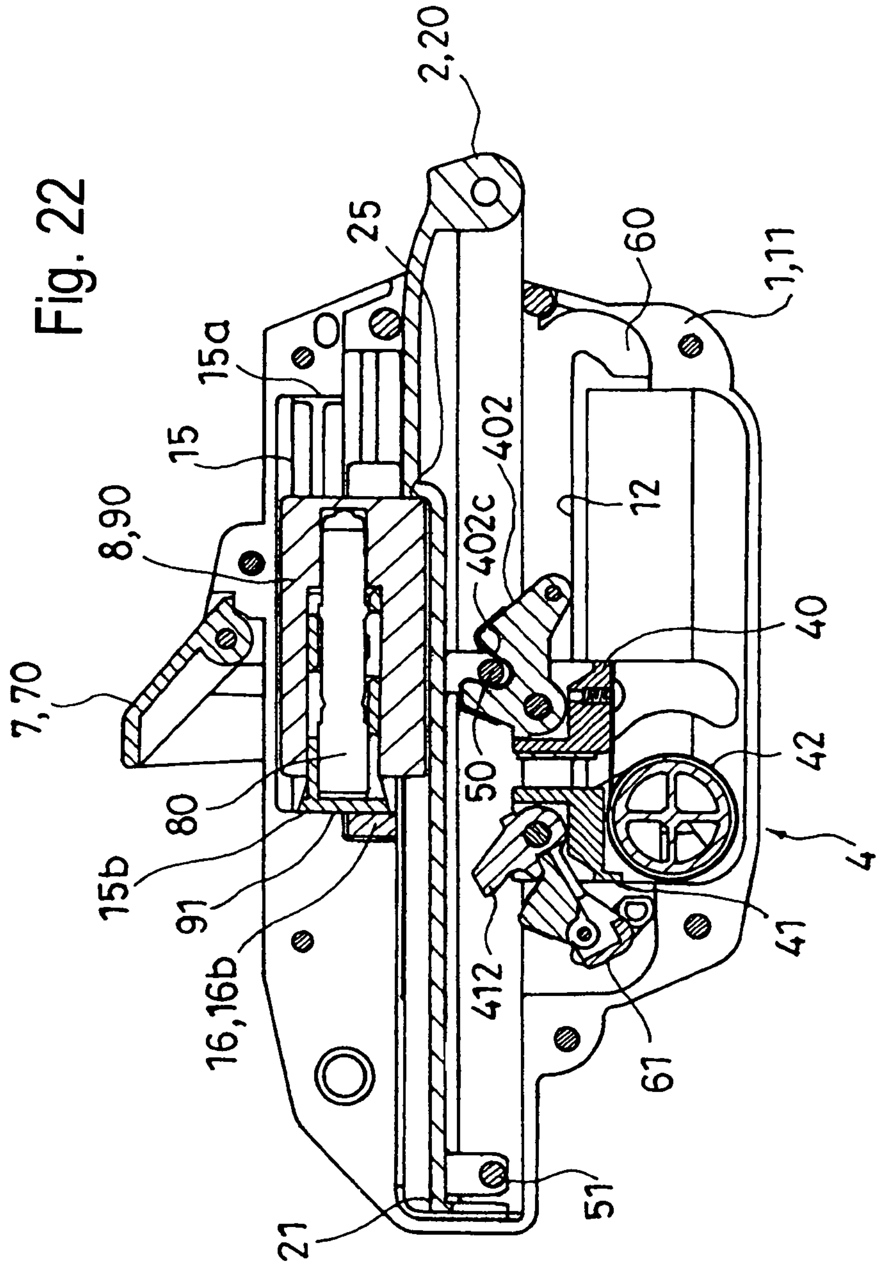
FIG. 22 is a partially cut structural view of essential parts of the moving apparatus of the first embodiment in an example of replacing damping means, and the like (position before the forward movement).
Figure 23:
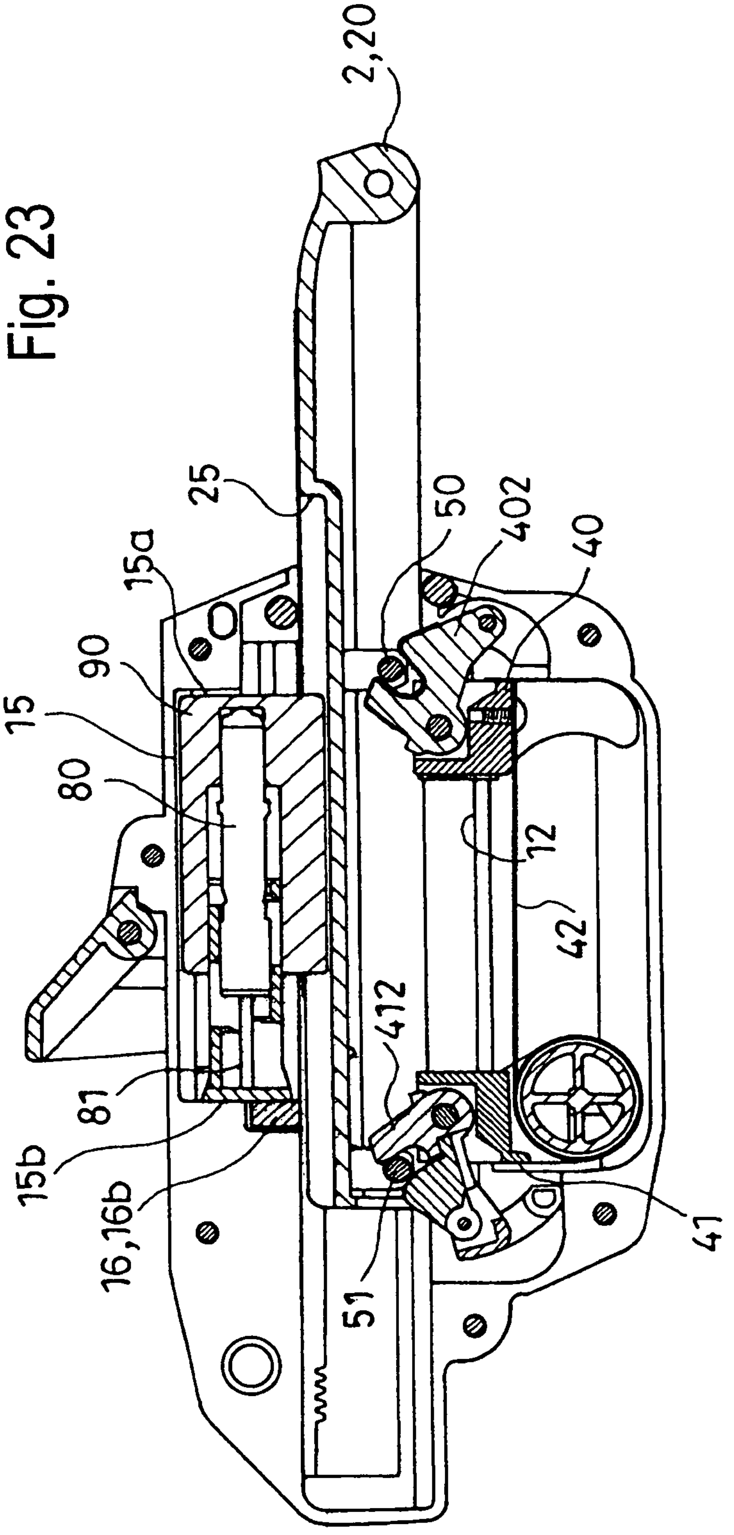
Figure 24:
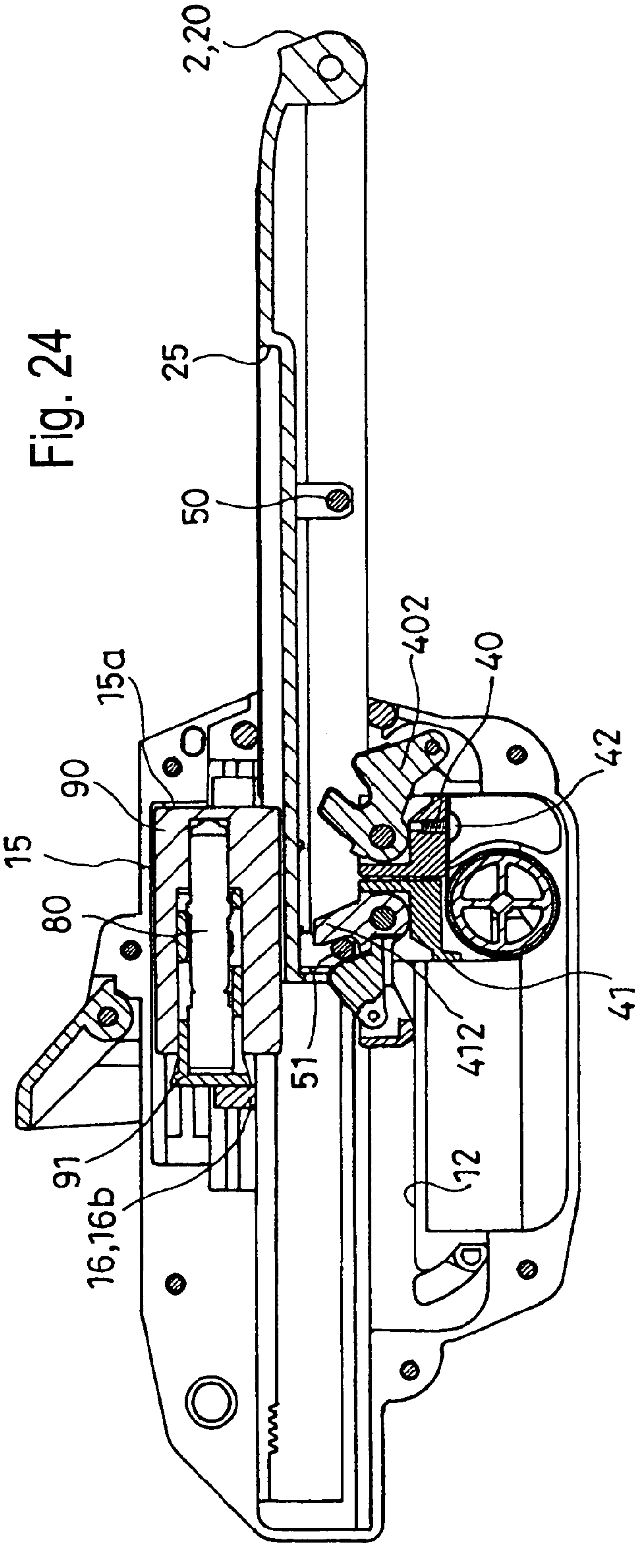
FIG. 24 is a partially cut structural view of essential parts of the moving apparatus of the first embodiment in an example of replacing the damping means, and the like (end position of the forward movement).
Figure 25:
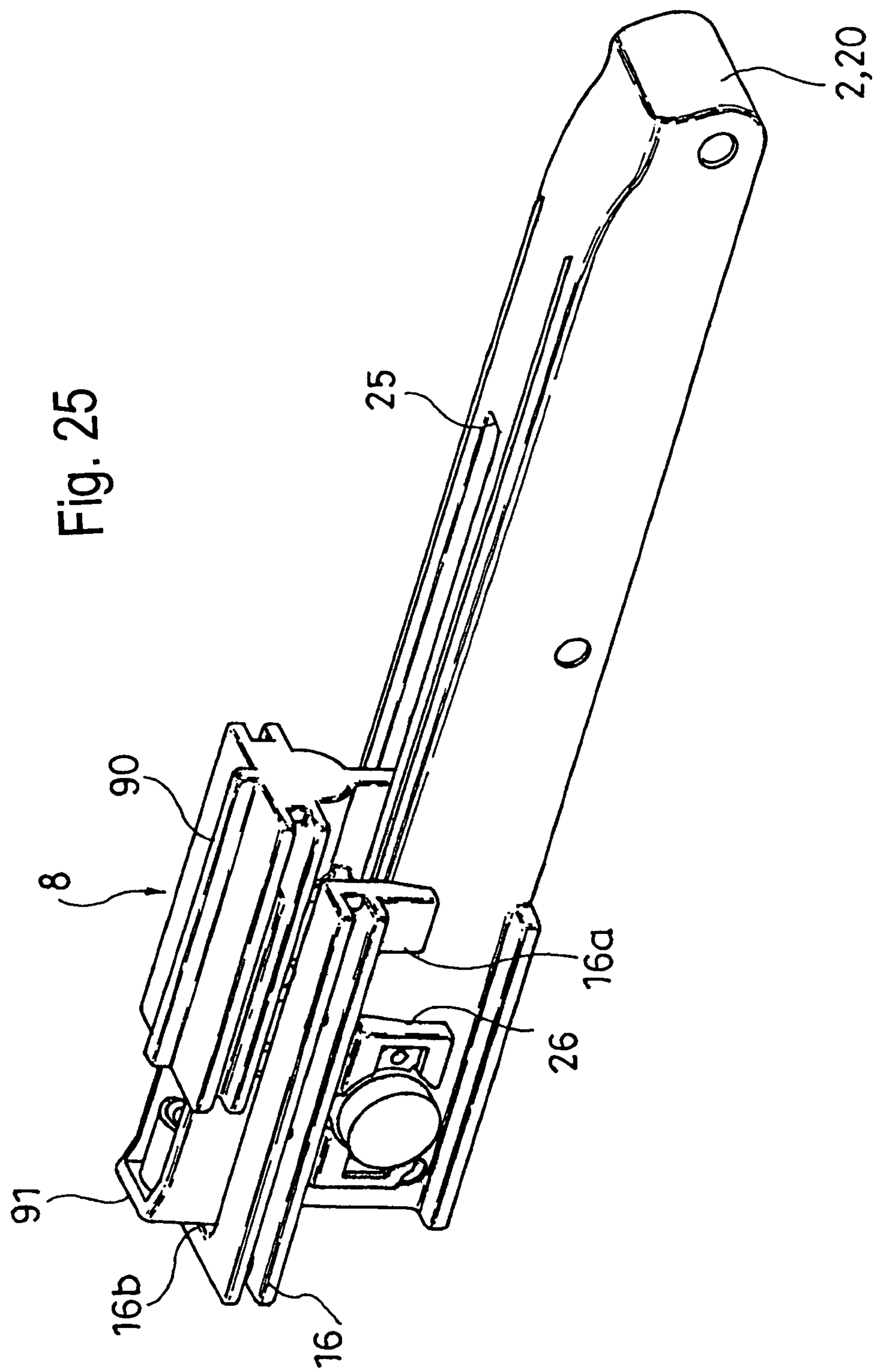
FIG. 25 is a structural perspective view of the arm and the damping means of the moving apparatus of the first embodiment.
Figure 26:
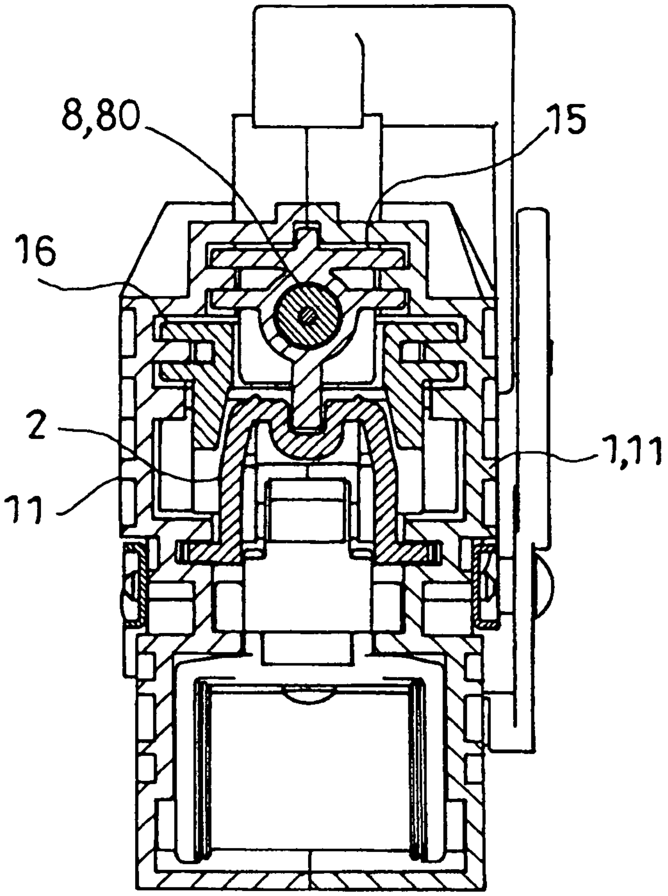
FIG. 26 is a structural sectional view of essential parts of the moving apparatus of the first embodiment.

Also, FIG. 22 to FIG. 26 show examples having changed mainly the position of placement of the damping means 8 in the example shown in FIG. 1 to FIG. 21; FIG. 22 shows the manner of the moving apparatus G when the lid Ma is in the position before forward movement, FIG. 24 shows the manner of the moving apparatus G when the lid Ma is in the position at the end of forward movement, and FIG. 23 shows the manner of the moving apparatus G when the lid Ma is in mid-course of forward movement or backward movement. Also, FIG. 25 shows the arm 2 constituting this example, and FIG. 26 shows the main parts of this example in sectional view in the direction intersecting with the direction of movement of the arm 2.

Figure 28:
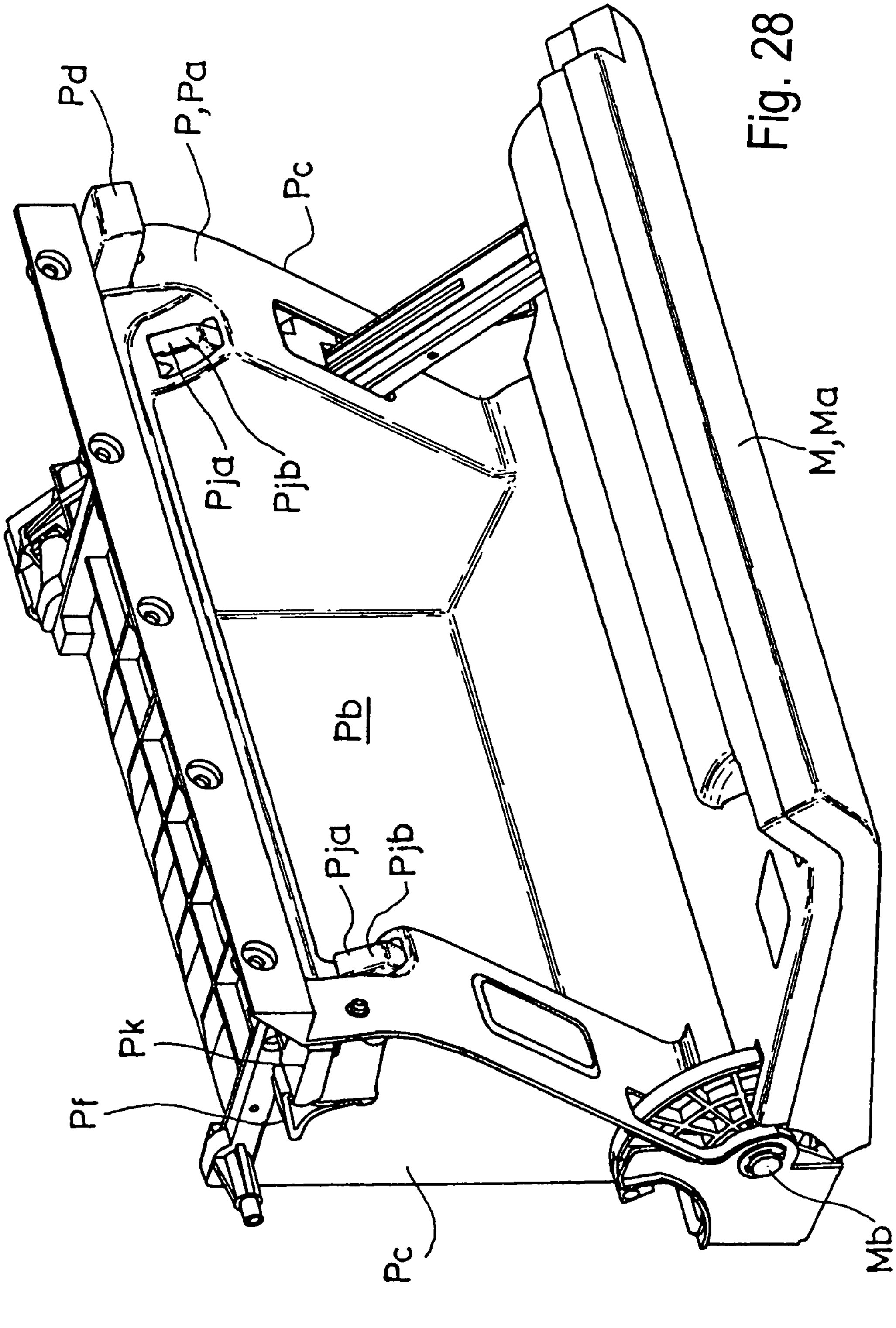
FIG. 28 is a structural perspective view showing another modified example of the lid apparatus of the first embodiment.
Figure 29:
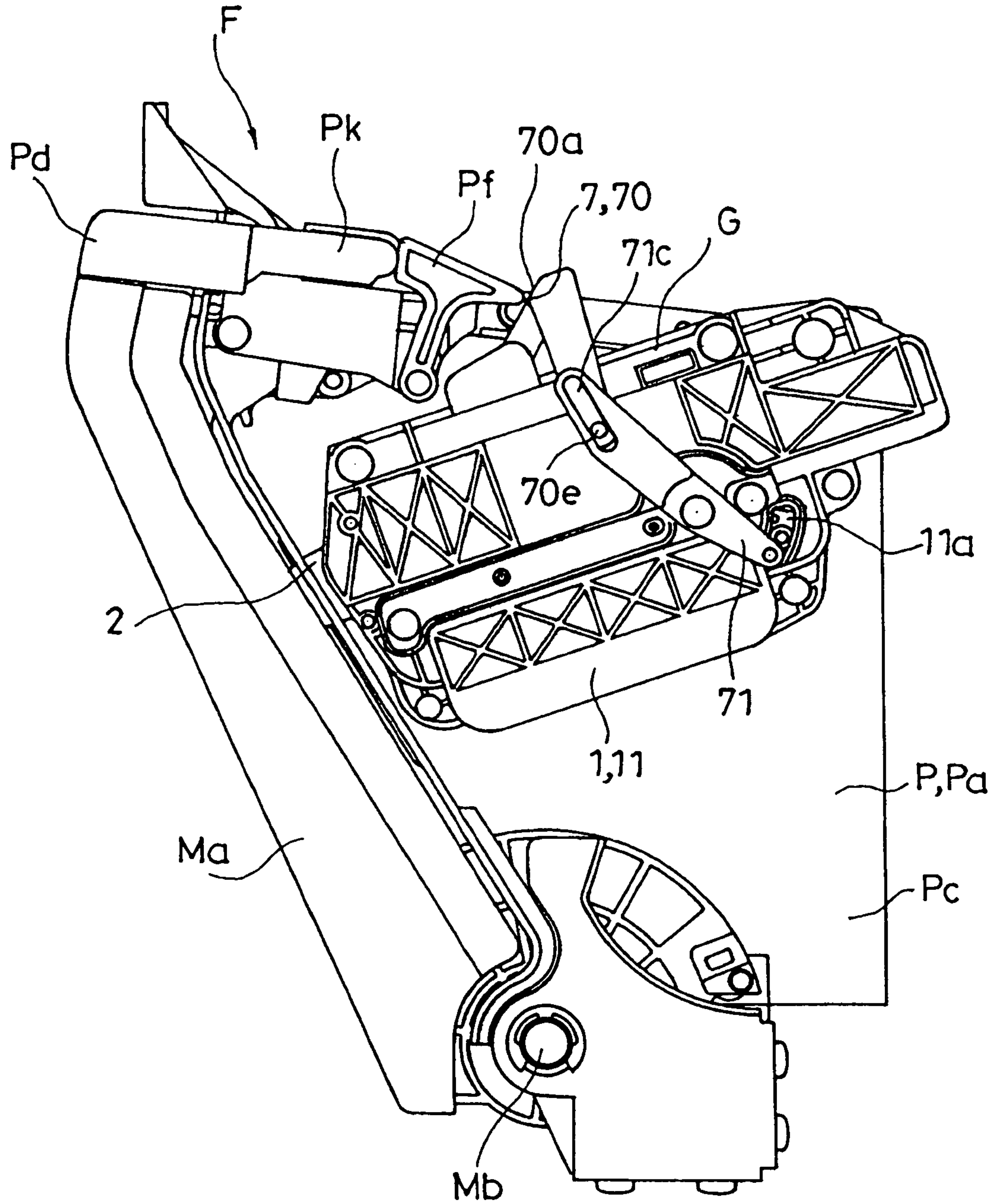
FIG. 29 is a structural side view showing another modified example of the lid apparatus of the first embodiment.
Figure 30:
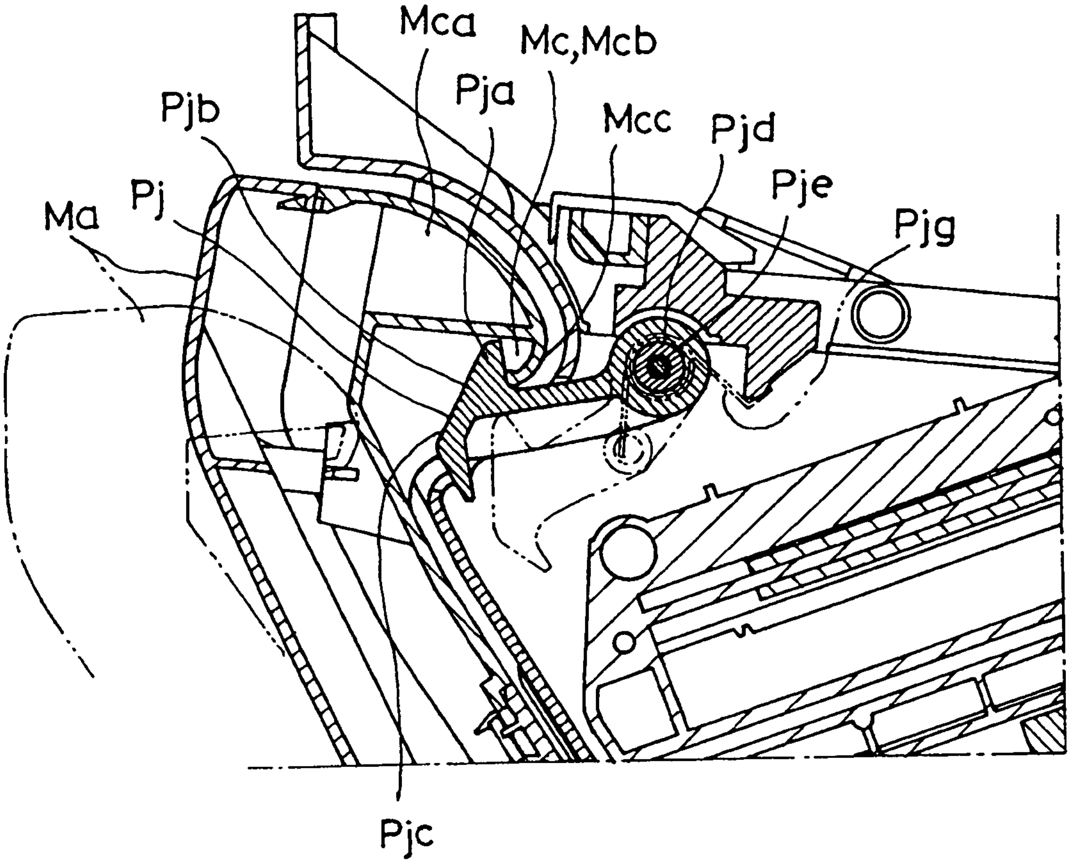
FIG. 30 is a structural sectional view of essential parts showing another modified example of the lid apparatus of the first embodiment.
Figure 31:
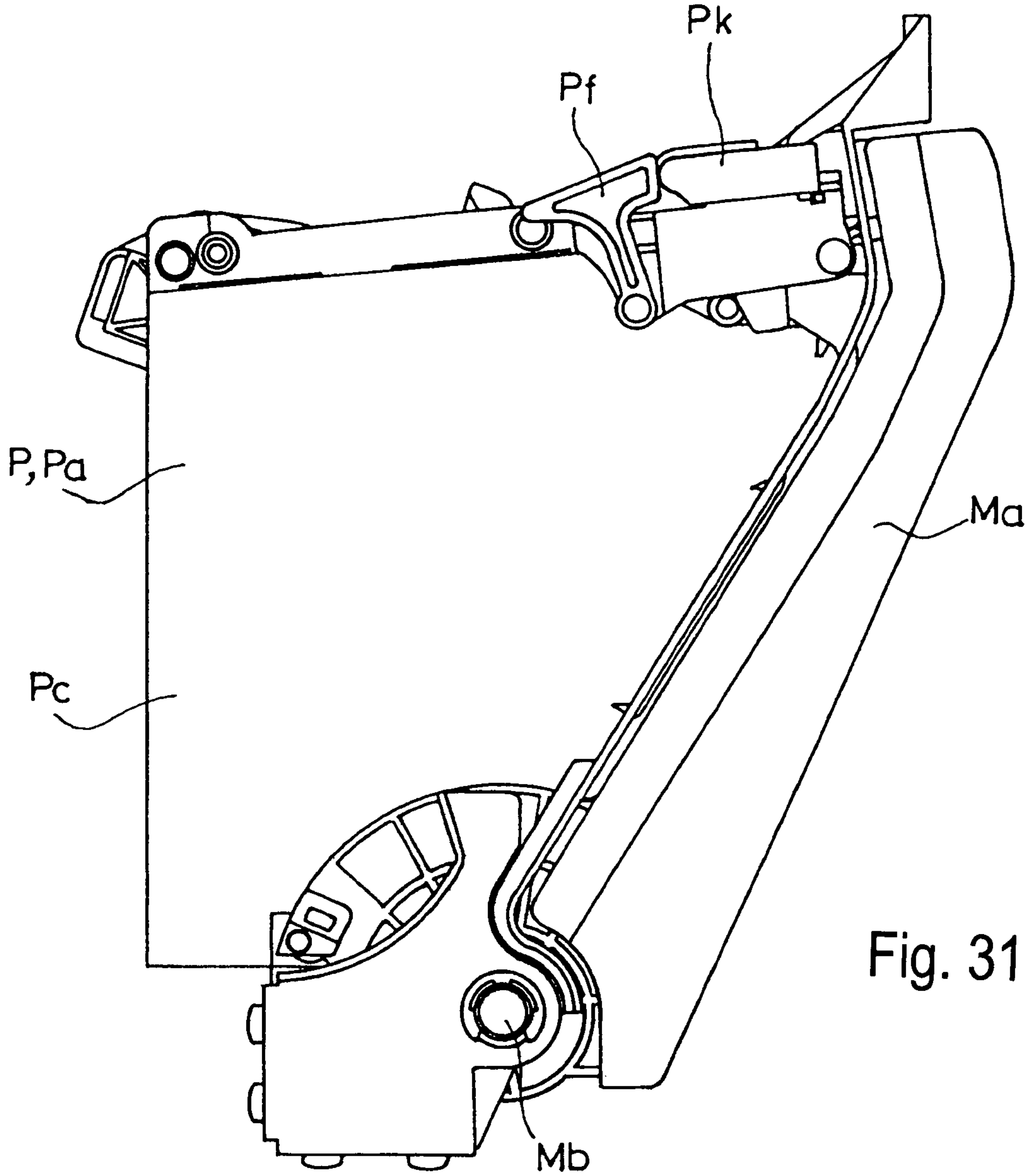
FIG. 31 is a structural side view showing another modified example of the lid apparatus of the first embodiment.
Figure 32:
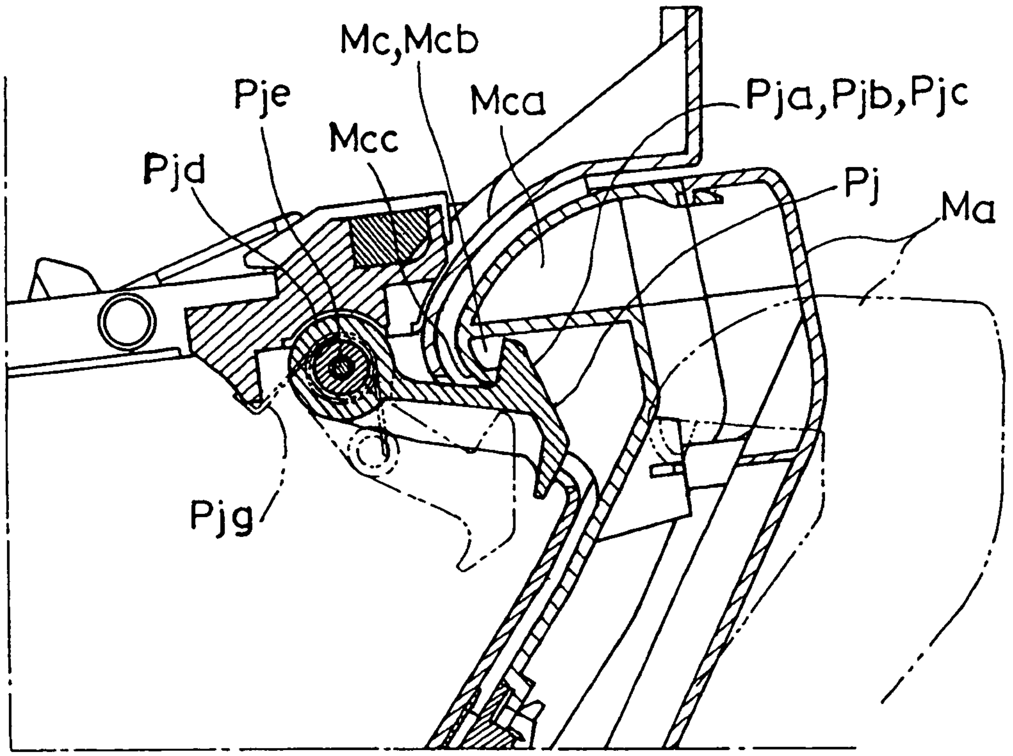
FIG. 32 is a structural sectional view of essential parts showing another modified example of the lid apparatus of the first embodiment.
Figure 33:
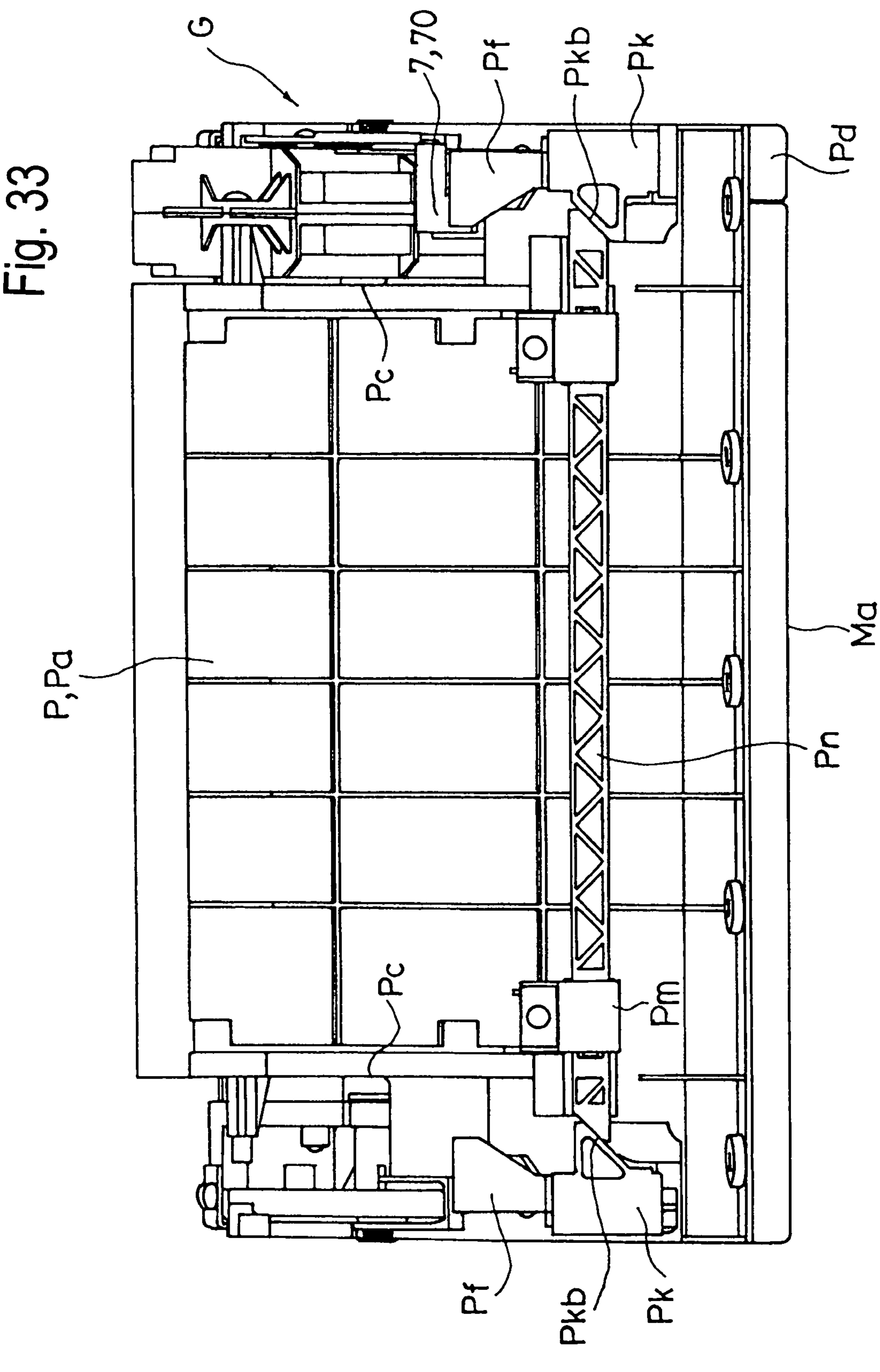
FIG. 33 is a structural plan view showing another modified example of the lid apparatus of the first embodiment.
Figure 34:
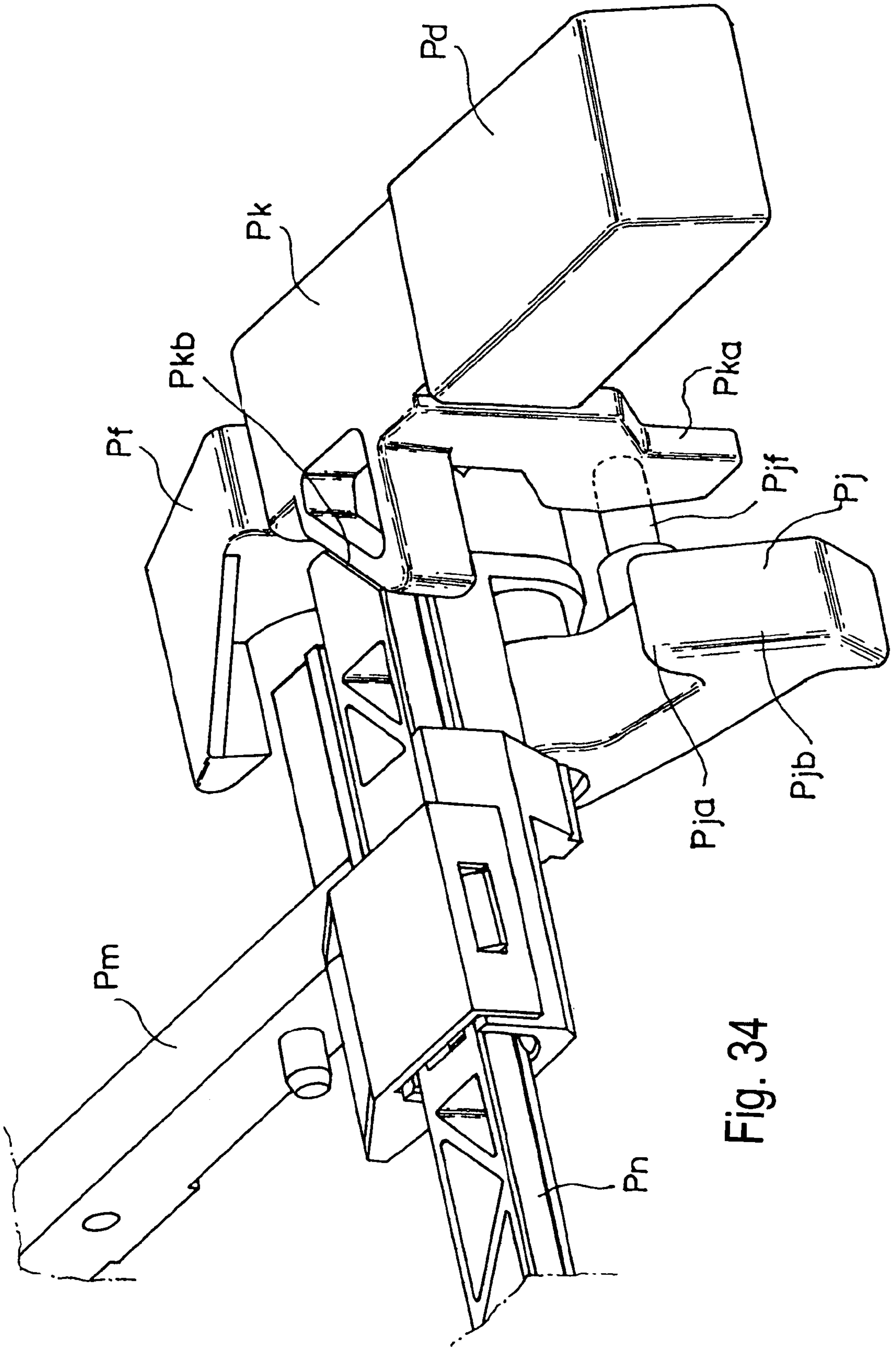
FIG. 34 is a structural perspective view of essential parts showing another modified example of the lid apparatus of the first embodiment.
Figure 35:
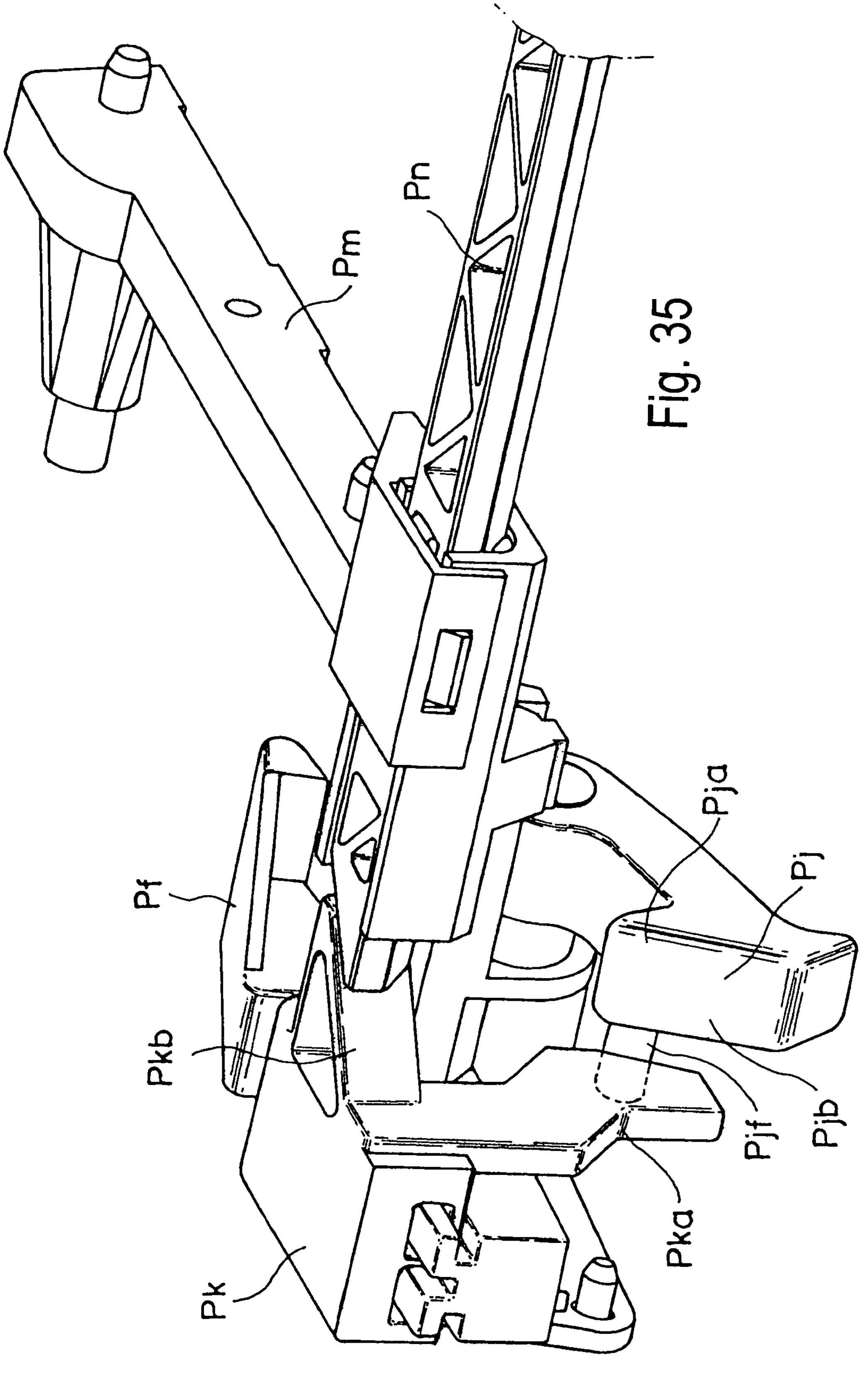
FIG. 35 is a structural perspective view of essential parts showing another modified example of the lid apparatus of the first embodiment.
Figure 36:
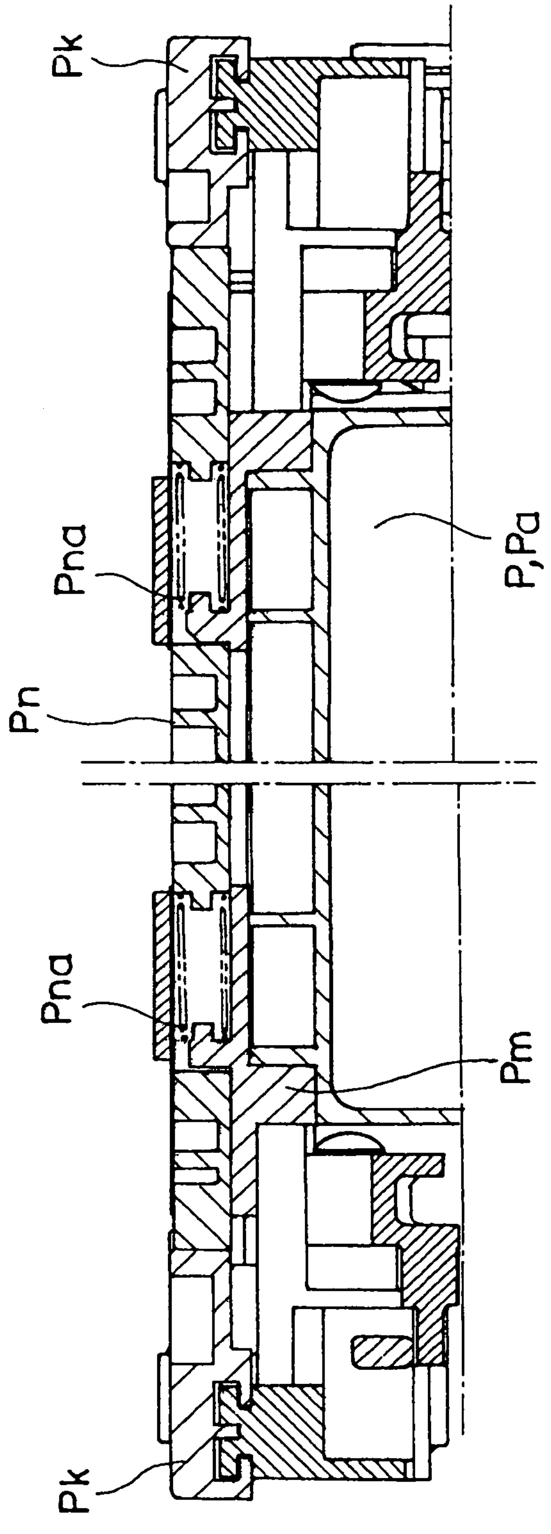
FIG. 36 is a structural sectional view of essential parts showing another modified example of the lid apparatus of the first embodiment.

Also, FIG. 28 to FIG. 36 show examples having constituted a lid apparatus using the moving apparatus shown in FIG. 22 to FIG. 26; FIG. 28 shows the manner when the lid Ma is in the position at the end of forward movement, FIG. 29 shows when the lid Ma is in the position before forward movement viewed from the side of one side plate Pc of the main body Pa, FIG. 31 shows when the lid Ma is in the position at the start of forward movement viewed from the side of the other side plate Pc of the main body Pa, FIG. 30 shows the main parts of FIG. 29 in sectional view, and FIG. 32 shows the main parts of FIG. 31 in sectional view. Also, FIG. 33 shows such lid apparatus viewed from above, and FIG. 36 shows the main parts of FIG. 33 in sectional view, furthermore, FIG. 34 shows the manner of the disengaging means F, and the like, provided on one end side of the linkage rod Pn, and FIG. 35 shows the manner on the opposite side of FIG. 34.

Figure 27:
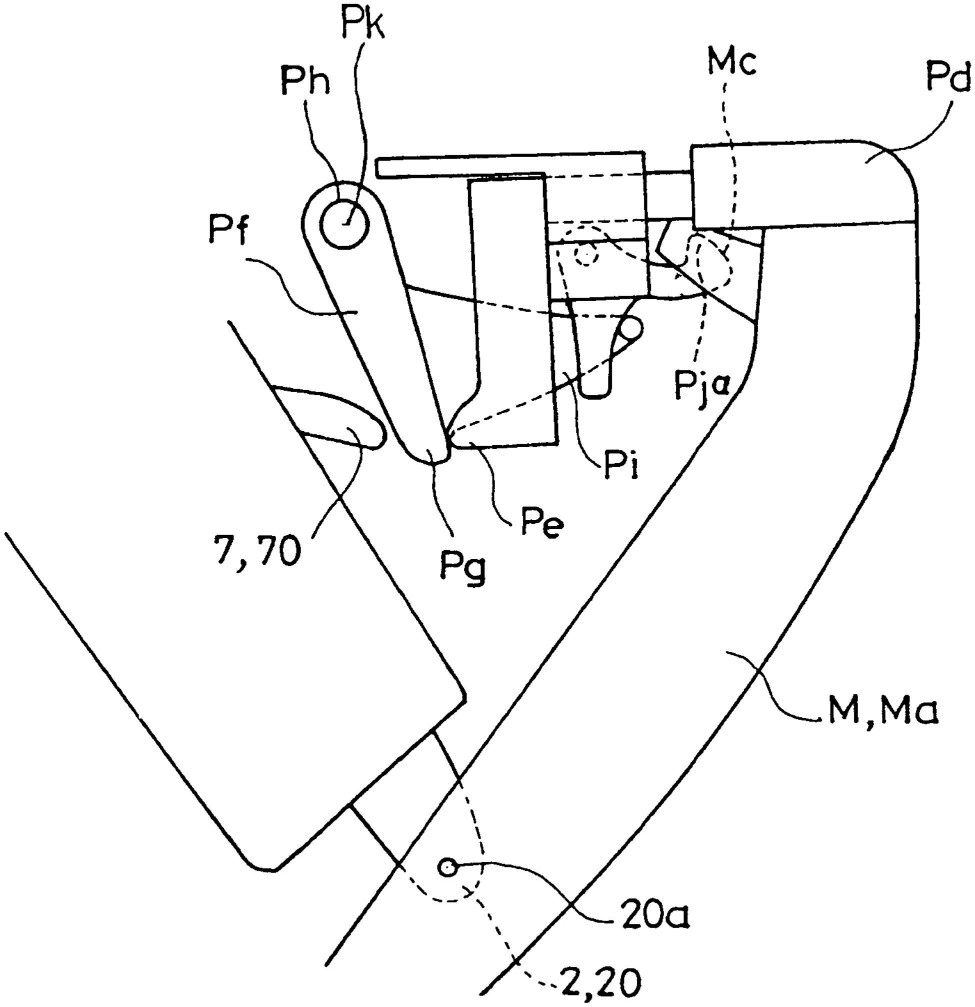
FIG. 27 is a structural view showing essential parts of a modified example of the lid apparatus of the first embodiment.

Also, FIG. 27 shows the main parts of a modified example which is made such that the state of the lid Ma being in the position before forward movement can be maintained assuredly even without providing the holding means 3 in the example shown in FIG. 1 to FIG. 21.

The moving apparatus G of the movable body M pertaining to this embodiment is used in order to combine the fixed body P and the movable body M in a state enabling this movable body M to move forward and backward, and in a manner such that after being moved backward up to a prescribed position the movable body M is moved backward forcefully (automatically) up to the position at the end of backward movement (that is, the position before forward movement).

In the illustrated example, it shows a lid apparatus which is made by combining a lid Ma as the movable body M, which closes an opening Pb of a main body Pa serving as the fixed body P in the position before forward movement by this moving apparatus G, and this main body Pa, as one example of typical use of such moving apparatus G (FIG. 1 to FIG. 3).

In this example, the moving apparatus G is attached to the side of the outer face of the side plate Pc of the main body Pa which forms said opening Pb. The lid Ma is assembled to be capable of rotation on the main body Pa on its lower end so as to close the opening Pb of this main body Pa in the upright position and to open it by turning down from this position. In this example, the upright position of the lid Ma becomes the position before forward movement of the movable body M (FIG. 1/that is, also the position at the end of backward movement), and the position where the lid Ma is completely turned down becomes the position at the end of forward movement of the movable body M (FIG. 3/that is, also the position before backward movement). The moving apparatus G has a case 1, which has a flat box shape and has two wide faces constituted respectively in an about rectangular shape, and a rod-shaped arm 2, which is combined on this case 1 to be capable of sliding movement following the length direction of this case 1. In this example, one end (henceforth called front end 20) of the arm 2 is assembled between the lower end and the upper end of the lid Ma to be capable of rotation by a rotating shaft 20*a* going parallel to the rotating shaft Mb of this lid Ma such that this arm 2 moved forward sliding diagonally downward, and the side of the upper part 13 of the case 1 is assembled on the side plate Pc of the main body Pa to be capable of rotation by a rotating shaft 10 going parallel to the rotating shaft Mb of the lid Ma.

When the lid Ma is in the position before forward movement, the protruding dimension of the side of the front end 20 of the arm 2 from the lower part 14 of the case 1 is made smallest, and it is made such that the position before forward movement of this lid Ma can be maintained by a slide lock of a second slider 41 of a pair of sliders 4 to be described later.

In the example shown in FIG. 1 to FIG. 21, it is made such that by a holding means 3 to be described later, the forward movement of the arm 2 when the lid Ma is in the position before forward movement is blocked also by this holding means 3. In the example shown in FIG. 1 to FIG. 21, on the upper part of the main body Pa, there are provided a button body Pd, which is capable of push operation inward to the main body Pa, and a lever body Pf, of which the upper end Ph is assembled to be capable of rotation on the main body Pa such that the lower end Pg is normally pushed against the inner end part Pe of this button body Pd, and it is made such that the button body Pd is impelled to be positioned in the forward position by this lever body Pf. In this example, it is made such that when the lid Ma is in the position before forward movement, and when the button body Pd is pushed in against this impulsion, the lever body Pf is rotated backward, and the lever body Pf thus rotated pushes in the upper end 70*a* of a first joint part 70 of a releasing means 7 to be described later, which is linked to a holding means 3, downward against the impulsion, and the blocking of forward movement of the arm 2 by this holding means 3 is released, and also the slide lock of the second slider 41 is released. That is, in this example, there is provided a holding means 3, which is engaged on the side of the movable body M so as to block the forward movement of the movable body M when the arm 2 constituting the movable body M is in the position before forward movement, and releases the engagement with the movable body M when the slide lock is released in linkage with the releasing means 7 of the slide lock of the second slider 41.

This holding means 3 is constituted as a tongue piece part 30 engaging the rear end 30*a* from the front at a position before the first joint part 70 is pushed in to a bump part 22 formed on the upper part of the side of the rear end 21 of the arm 2 as previously noted. This tongue piece part 30 is assembled on the rear end of the upper part 70*a* of the first joint part 70 to be capable of rotation toward the direction of narrowing the angle formed between it and the upper face of this upper part 70*a*. This tongue piece part 30 is normally subject to impelling force in the direction of widening said angle by a torsion coil spring 31, and it is made such that it is positioned in the position to cause the rear end 30*a* to engage with the bump part 22 of the arm 2 as long as the first joint part 70 is not pushed in against the force as previously noted. By this, it is made such that when the lid Ma is moved backward, and when the bump part 22 of the arm 2 pushes against the tongue piece part 30 from the front, the tongue piece part 30 is rotated upward against said force, and it is again impelled to rotate downward further back from the rear end 30*a* at the position where this bump part 22 comes out and in the position at the end of backward movement of the lid Ma, that is, the position before forward movement, the tongue piece part 30 is again engaged as previously noted on the bump part 22 of the arm 2 (FIG. 4 and FIG. 5).

As shown in FIG. 27 and FIG. 30, a claw body Pj is provided on the upper part of the main body Pa, and it is made such that this claw body Pj is impelled by an impelling means (not illustrated) to be positioned to engage with Mc formed on the upper end of the lid Ma when this lid Ma is in the position before forward movement. Also, an arm part Pi, which catches a part of this claw body Pj and moves this claw body Pj toward the direction against said force when the button body Pd is pushed in, is provided on said lever body Pf. If such is done, then the state of the lid Ma being in the position before forward movement can be maintained by the engagement of this claw body Pj on the side of the lid Ma. In the case when it is done thus, there is no need to provide the holding means 3 as previously noted, which is engaged with said arm 2 itself so as to block forward movement in the position before forward movement of the lid Ma.

In the case when a moving apparatus G is provided respectively on the left and right side plates Pc and Pc of the main body Pa, and it is made such that the lid Ma is supported in two places, left and right, by the arm 2 of the respective moving apparatus G, by linking said lever bodies Pf on the left and right with a linking rod (its end part is indicated by the symbol Pk in FIG. 1 and FIG. 27) which extends long in the left-right direction of the main body Pa, it can be made sufficient if the button body Pd is provided only on either the left or right.

In the lid apparatus thus constituted, a force in the direction of moving it forward to the position at the end of forward movement is normally applied to the lid Ma constituting the movable body M by its own weight. Force in the direction of moving the movable body M forward can be applied to the movable body M also by a spring, and the like. By this, in such lid apparatus, it is possible to move the lid Ma forward up to the position at the end of forward movement without applying external force, by releasing the slide lock of the second slider 41 to be described later from the state of the lid Ma being in the position before forward movement. Also, by operating the lid Ma to move backward from the position at the end of forward movement to a prescribed position, from there onward it is possible to move the lid Ma backward forcefully up to the position before forward movement by the movement of the pair of sliders 4 to be described later. Furthermore, by a damping means 8 to be described later, it is possible to decelerate the speed at least at the end of forward movement and the end of backward movement of this lid Ma and suppress the generation of impact noise, and the like, as well as to give a sense of high quality, and the like, to the movement of the lid apparatus.

In the illustrated example, the lid Ma is rotated centered on a rotating shaft Mb on its lower end, and the rotating shaft 20*a* which assembles together the front end 20 of the arm 2 and the lid Ma is moved following the arc of an imaginary circle centered on the center of rotation of this lid Ma, therefore in order to allow this movement, the case 1 and the main body Pa are combined to be capable of rotation by the rotating shaft 10 as previously noted. Aside from the illustrated example, if it is made such that the arm 2 is moved to slide following the arc of such imaginary circle, then it is possible to assemble the case 1 such that movement does not occur relative to the main body Pa.

The moving apparatus G is made as a unit, and typically, it can be made such that this lid Ma, and the like, performs the movement as previously noted, by only attaching that case 1 to said main body Pa, and the like, and the arm 2 to said lid Ma, and the like.

Such moving apparatus G is constituted including the following elements in (1) to (7):

(1) a pair of sliders 4 (including a first slider 40, second slider 41, and impelling means 42);

(2) a first engaging part 50 (caught by the first slider 40);

(3) a second engaging part 51 (caught by the second slider 41);

(4) a first slide lock part 60 (locks the first slider 40 against sliding, that is, makes it such that it doesn't move to slide);
(5) a second slide lock part 61 (locks the second slider 41 against sliding);
(6) a releasing means 7 (releases the slide lock of the second slider 41 by the second slide lock part 61); and
(7) a damping means 8.

In the illustrated example, said first and second engaging parts 50 and 51 are provided on the arm 2 which constitutes the movable body M together with the lid Ma having the front end combined on the lid Ma as previously noted. Also, the pair of sliders 4 is housed inside the case 1 which is combined on the main body Pa as previously noted, and the first and second slide lock parts 60 and 61 are formed inside this case 1. In the illustrated example, it is made such that such case 1 is constituted by combining left and right case component bodies 11 and 11. A linear rib-shaped sliding contact rail part 12, which extends following the length direction of the case 1 in a position in about the middle of its width, is provided respectively on the left and right case component bodies 11 and 11. The upper space containing this sliding contact rail part 12 is opened outward respectively on the upper part 13 and the lower part 14 of the case 1, and the arm 2 is supported to be capable of sliding movement in the length direction of the case 1 in the upper space of the case 1 in a manner such that the front end 20 and the rear end 21 respectively are projected somewhat from this open place in the position before forward movement of the lid Ma.

The pair of sliders 4 is provided to be capable of sliding movement on either side of the movable body M and the fixed body P. In the illustrated example, the first and second engaging parts 50 and 51 are provided on the arm 2 which constitutes a part of the movable body M, therefore the pair of sliders 4 is housed in the case 1 which is assembled on the side of the fixed body P, to be capable of sliding movement in the length direction of this case 1.

Such pair of sliders 4 is constituted by combining a first slider 40, a second slider 41, and an impelling means 42 which normally impels in linkage these first and second sliders 40 and 41 in the direction of moving them closer.

Both the first slider 40 and the second slider 41 have a slider main body 401 or 411, and a rotating body 402 or 412 which is assembled to be capable of rotation on this slider main body 401 or 411. The slider main body 401 or 411 has a pair of rib-shaped protruding parts **401*a* and 401*a* or 411*a* and 411*a*, which are formed respectively on both side parts following the direction of sliding movement x having a gap of a size equivalent to the thickness of said sliding contact rail part 12 opened in the up-down direction, and it is combined on the case 1 in a manner so as to insert the sliding contact rail part 12 between this pair of rib-shaped protruding parts 401*a* and 401*a* or 411*a* and 411*a* to be capable of sliding movement following this sliding contact rail part 12. Also, the rotating body 402 or 412 is combined in a place positioned upward from the sliding contact rail part 12 on the slider 40 or 41 which is combined on the case 1** in this manner.

The first slider 40 is positioned on the side ahead of forward movement xf of the arm 2, and the second slider 41 is positioned on the side ahead of backward movement xr of the arm 2. Also, the rotating shaft **402*a* of the rotating body 402 of the first slider 40 is positioned at the rear end of this rotating body 402, that is, on the side of the second slider 41, and the rotating shaft 412*a* of the rotating body 412 of the second slider 41 is positioned at the front end of this rotating body 412, that is, on the side of the first slider 40**.

Also, both sliders 40 and 41 have a sliding contact part **402*b* or 412*b*, which continues sliding contact in the course of sliding movement of the slider 40 or 41 on upper face of the sliding contact rail part 12**.

The rotating body 402 of the first slider 40 has the sliding contact part **402*b* on the side ahead of forward movement xf of the arm 2 from its rotating shaft 402*a*. In addition to that, it has a receiving recessed part 402*c* for the first engaging part 50 between this rotating shaft 402*a* and the sliding contact part 402*b*. In the illustrated example, this sliding contact part 402*b* is constituted as a round columnar projection on the front end of the rotating body 402 of the first slider 40, which projects out respectively from both the left and right side parts of this rotating body 402. Also, the receiving recessed part 402*c* for the first engaging part 50 is constituted so as to form a trough shape, which continues in the left-right direction of this rotating body 402 positioning the trough opening on the side of the upper part of this rotating body 402, and has the trough ends opened outward on both the left and right sides of the rotating body 402. The entrance 402*d* (trough opening) of this receiving recessed part 402*c* for the first engaging part 50 is positioned in a position further away from the sliding contact rail part 12 than the rotating shaft 402*a* and the sliding contact part 402*b* of the rotating body 402 of this first slider 40**.

Also, the rotating body 412 of the second slider 41 also has the sliding contact part **412*b* on the side ahead of backward movement xr of the movable body M from its rotating shaft 412*a*. In addition to that, it has a receiving recessed part 412*c* for the second engaging part 51 between this rotating shaft 412*a* and the sliding contact part 412*b*. In the illustrated example, this sliding contact part 412*b* is constituted as a round columnar projection on the rear end of the rotating body 412 of the second slider 41, which projects out respectively from both the left and right side parts of this rotating body 412. Also, the receiving recessed part 412*c* for the second engaging part 51 is constituted so as to form a trough shape, which continues in the left-right direction of this rotating body 412 positioning the trough opening on the side of the upper part of this rotating body 412, and has the trough ends opened outward on both the left and right sides of the rotating body 412. The entrance 412*d* (trough opening) of this receiving recessed part 412*c* for the second engaging part 51 is positioned in a position further away from the sliding contact rail part 12 than the rotating shaft 412*a* and the sliding contact part 412*b* of the rotating body 412 of this second slider 41**.

Also, the rotating body 412 of this second slider 41 has: a claw body **412*e* which is axially supported on the side ahead of backward movement xr of the arm 2, has a top part 412*f* on the side ahead of forward movement xf of the arm 2 from the position of this axial support, and has a wall part 412*g* on the side ahead of forward movement xf of the arm 2 sandwiching this top part 412*f* in between as one wall part of the receiving recessed part 412*c*; and a torsion coil spring 412*h* as an impelling means which normally impels this claw body 412*e*** to the protruding position.

Figure 8:
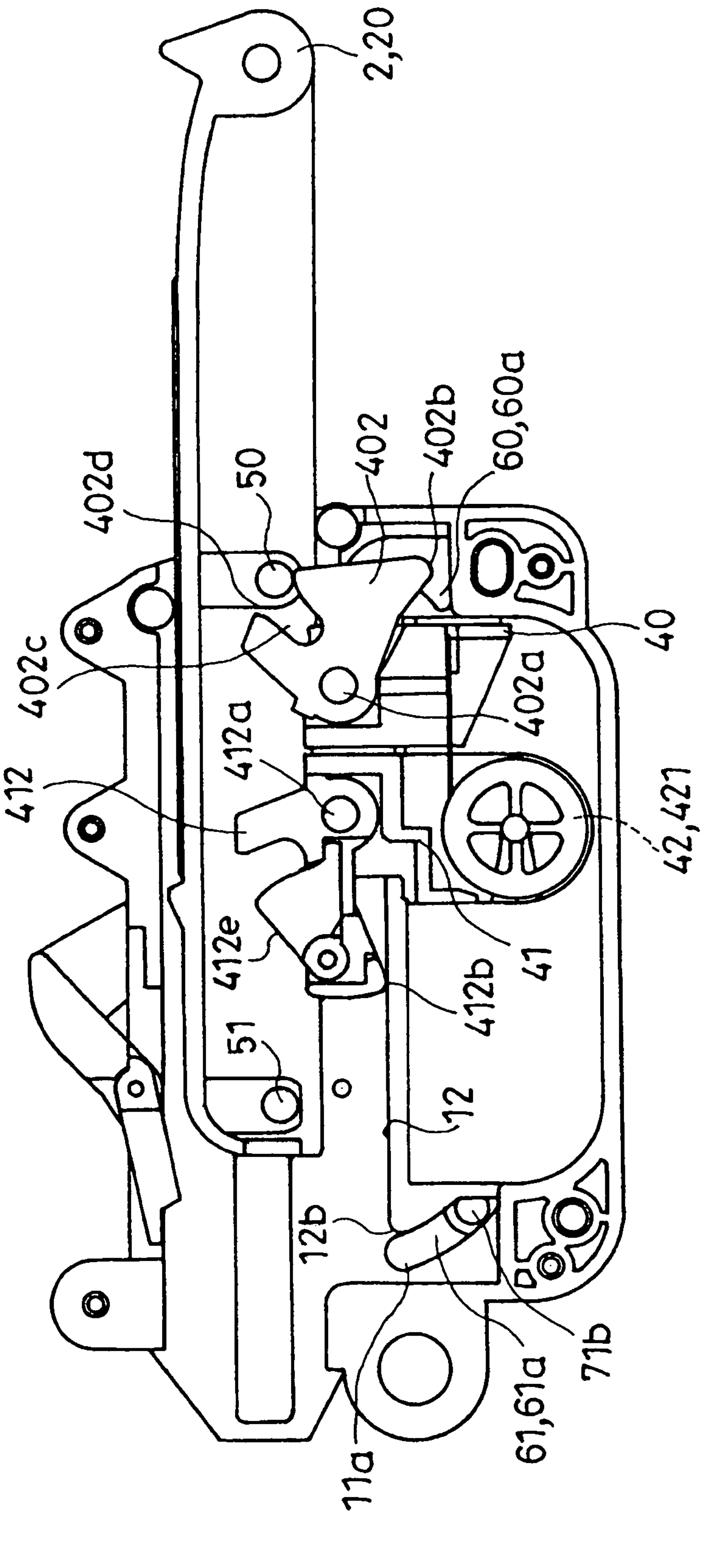
FIG. 8 is a partially cut structural view of essential parts of the moving apparatus of the first embodiment (immediately after slide lock of the first slider).
Figure 9:
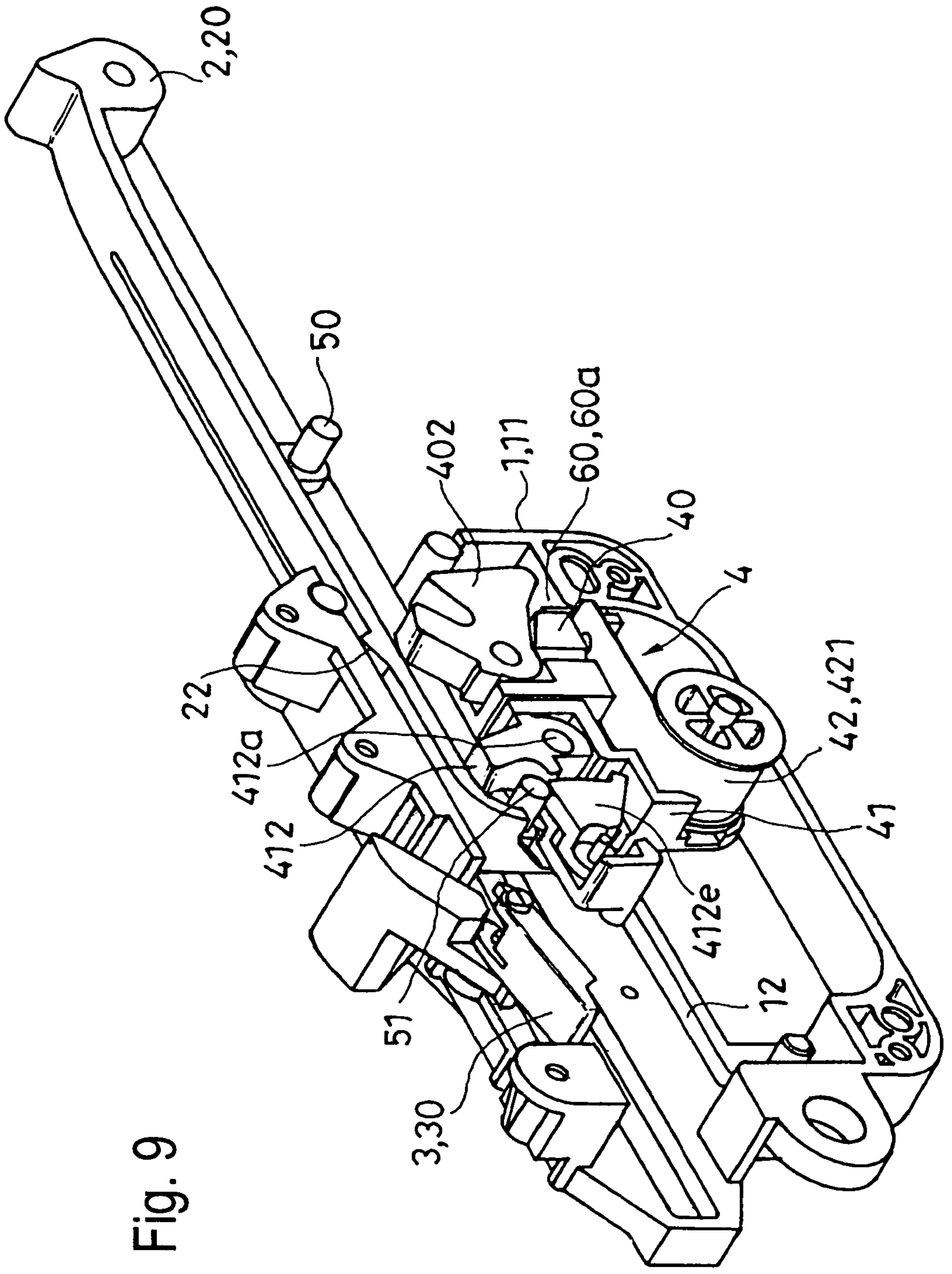
FIG. 9 is a structural perspective view of the moving apparatus in the state of removing one side of the case component body of the first embodiment (immediately before reaching an end position of forward movement).
Figure 12:
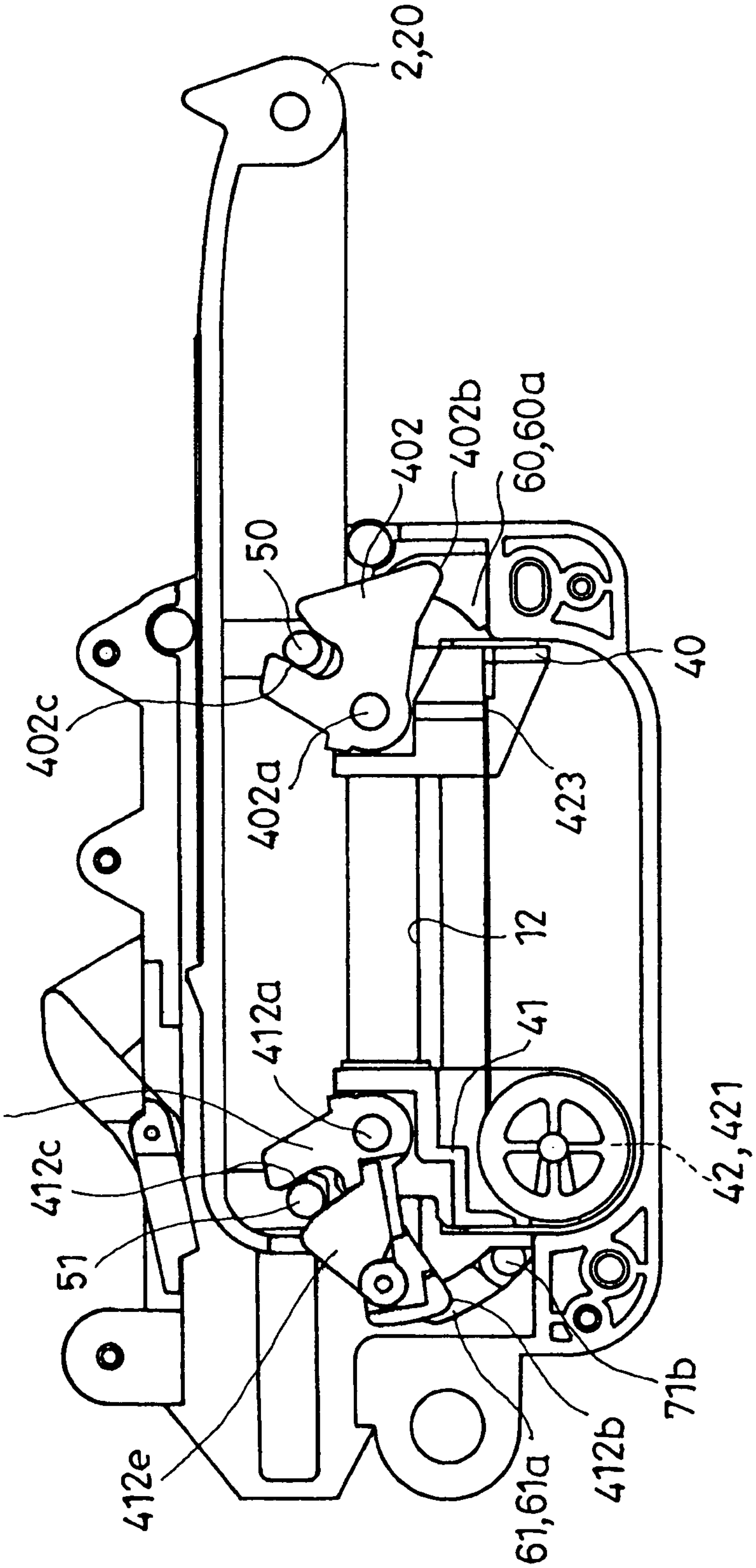
FIG. 12 is a partially cut structural view of essential parts of the moving apparatus of the first embodiment (immediately before release of the slide lock of the first slider and immediately before the slide lock of the second slider).

When the lid Ma which was in the position before forward movement is moved forward completely, as is described later, in the position where the first slider 40 is locked against sliding by the first slide lock part 60, the first engaging part 50 comes out forward from this first slider 40 and the arm 2 is moved further forward, and the second engaging part 51 is struck against the first slider 41 from the rear. This second engaging part 51 is struck against the wall part on the side ahead of backward movement xr of the arm 2 which sandwiches the top part **412*f* of the claw body 412*e* in between (FIG. 8->FIG. 10). Because the position of axial support of the claw body 412***e* is on this side ahead of backward movement xr, the claw body 412*e* is for a time rotated to draw in downward by this striking in opposition to the impulsion of said torsion coil spring 412*h*, and after this it is again rotated to protrude outward by the impulsion at the position where the second engaging part 51 passes the top part 412*f* of this claw body 412*e* and it allows the second engaging part 51 to enter the receiving recessed part 412*c* (FIG. 10->FIG. 11). When the arm 2 in the position at the end of forward movement is moved backward accompanying operation of the lid Ma to move backward, although the second engaging part 51 comes to be pushed against this claw body 412*e*, the wall part 412*g* of the claw body 412*e* inside the receiving recessed part 412*c* is formed so as to intersect the path of movement of the second engaging part 51 nearly orthogonally, and it is made such that the claw body 412*e* is not rotated to draw in by this pushing against. By this, when operating the arm 2 to move backward the second slider 41 is moved in linkage accompanying this whereby it is made possible to cause the second slider 41 to move away from the first slider 40 being locked against sliding while causing force to be accumulated in the impelling means 42 constituting the pair of sliders 4 (FIG. 11->FIG. 12).

The impelling means 42 constituting the pair of sliders 4, in the illustrated example, is made as a constant load spring 421 having a drum 422 built into a part of the slider main body 411 of the second slider 41 positioned beneath the sliding contact rail part 12 with the drum axis oriented in the left-right direction. This constant load spring 421 is constituted so as to wind up a band-shaped spring member on such drum 422, and the outside end 423 of this constant load spring 421 is fixed to the part of the slider main body 401 of the first slider 40 positioned beneath the sliding contact rail part 12.

The arm 2 which constitutes the movable body M together with the lid Ma, in the illustrated example, is constituted so as to have an angle bracket shape having the cross section following its width direction opened downward. The rotating bodies 402 and 412 of the first and second sliders 40 and 41 are made such that the sides of their upper parts are normally made to be received inside this arm 2. In the illustrated example, the first engaging part 50 and the second engaging part 51, which is provided with a space between it and this first engaging part 50 in the direction of sliding movement x of the pair of sliders 4, are constituted so as to have a shaft shape spanning between the pair of side plates 23 and 23 following the length direction of this arm 2.

The first slide lock part 60 and the second slide lock part 61, which is provided with a space between it and this first slide lock part 60 in the direction of sliding movement x of the pair of sliders 4, are formed on the case 1 constituting the fixed body P together with the main body Pa. In the illustrated example, the first slide lock part 60 is formed to the side of the rail front end 12*a* of the sliding contact rail part 12 positioned on the side ahead of forward movement xf of the movable body M, and the second slide lock part 61 is formed to the side of the rail rear end 12*b* of this sliding contact rail part 12 positioned on the side ahead of backward movement xr of the movable body M. Concretely, beneath the rail front end 12*a* of the sliding contact rail part 12, there is formed a front side lead-in recess part 60*a* for the sliding contact part 402*b* of the rotating body 402, which forms a chin part 60*b* beneath this rail front end 12*a*, and beneath the rail rear end 12*b* of the sliding contact rail part 12, there is formed a rear side lead-in recess part 61*a* for the sliding contact part 412*b* of the rotating body 412, which forms a chin part 61*b* beneath this rail rear end 12*b*.

Figure 13:
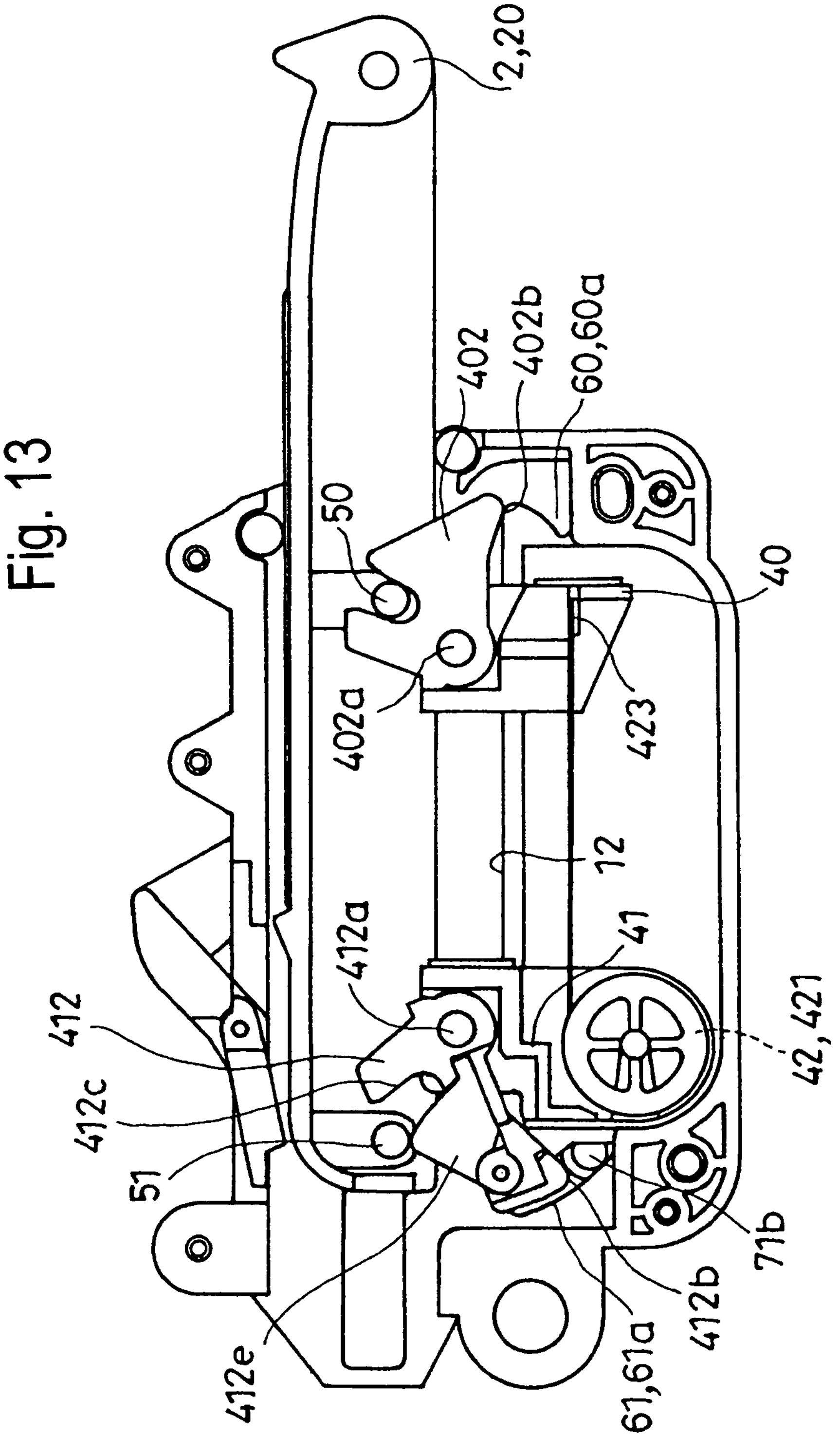
FIG. 13 is a partially cut structural view of essential parts of the moving apparatus of the first embodiment (immediately after release of the slide lock of the first slider and immediately after the slide lock of the second slider).

Also, it is made such that when the sliding contact parts 402*b* and 412*b* of the rotating bodies 402 and 412 enter the slide lock parts 60 and 61 thus constituted, the rotating bodies 402 and 412 are tilted and it becomes possible for the engaging parts 50 and 51 to come out from those receiving recess parts 402*c* and 412*c*. Concretely, in both the first and second sliders 40 and 41, the rotating bodies 402 and 412, in the state when their sliding contact parts 402*b* and 412*b* are being made to slide in contact on the upper face of the sliding contact rail part 12, are positioned so as to orient the entrances 402*d* and 412*d* of the receiving recessed parts 402*c* and 412*c* upward, and to straddle the tracks of movement of the engaging parts 50 and 51 with both wall parts of the receiving recessed parts 402*c* and 412*c*. Meanwhile, when the sliding contact part 402*b* and 412*b* of the rotating bodies 402 and 412 come out from the rail front end 12*a* or the rail rear end 12*b* of the sliding contact rail part 12 and enter the slide lock parts 60 and 61, the rotating bodies 402 and 412 are tilted rotating centered on the rotating shafts 402 and 412 with the slider main bodies 401 and 411. In the illustrated example, the first slider 40, in the state when having inserted the sliding contact part 402*b* of its rotating body 402 in the first slide lock part 60, tilts forward centered on the rotating shaft 402*a* and causes the wall part of the receiving recessed part 402*c* positioned on the side ahead of forward movement xf to come out from said track of movement (FIG. 8). Also, the second slider 41, in the state when having inserted the sliding contact part 412*b* of its rotating body 412 in the second slide lock part 61, tilts backward centered on the rotating shaft 412*a* and causes the wall part of the receiving recessed part 412*c* on the side ahead of backward movement xr to come out from said track of movement (FIG. 13).

Also, it is made such that the slide lock of the second slider 41 by the second slide lock part 61 can be released by the releasing means 7. By the fact that the second slider 41, having received and caught the second engaging part 51 in the receiving recessed part 412*c* in the course of forward movement of the arm 2, is made so as to catch the second engaging part 51 upward from the rotating shaft 412*a* of the rotating body 412 when the arm 2 in the position at the end of forward movement is operated to move backward up to the prescribed position, it inserts its sliding contact part 412*b* in the second slide lock part 61 and tilts and releases the second engaging part 51 and is locked against sliding (continues hooking the sliding contact part 412*b* to the second slide lock part 61) (FIG. 13). By the fact that the second slider 41 and the first slider 40 thus locked against sliding are made to move closer by the impelling means 42, the moving away of the first slider 40 having become free to slide from the second slider 41 as described later can be blocked while catching the first engaging part 50 at this time, and forward movement of the arm 2 is not performed. Such releasing means 7 in this state returns the sliding contact part 412*b* of the rotating body 412 of the second slider 41 from the second slide lock part 61 onto the sliding contact rail part 12.

Figure 6:
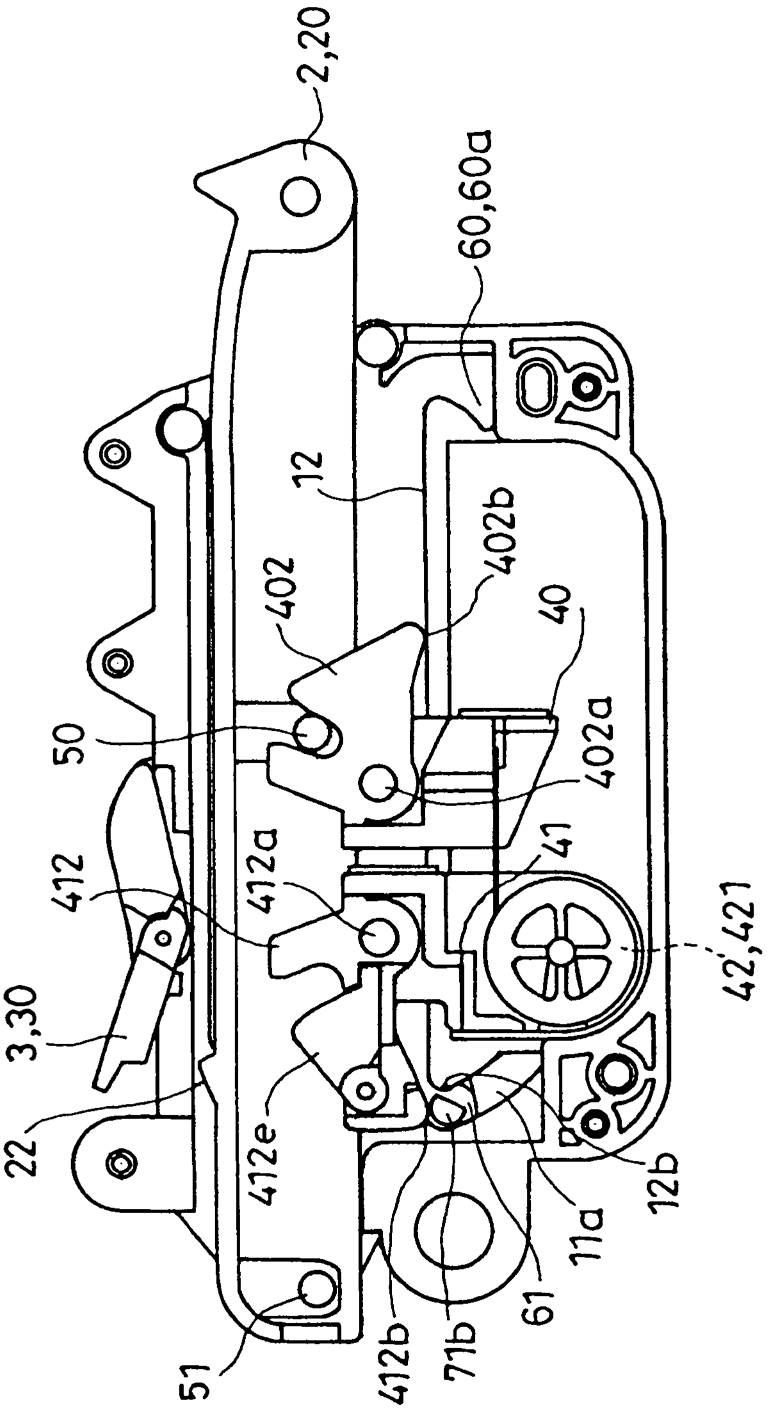
FIG. 6 is a partially cut structural view of essential parts of the moving apparatus of the first embodiment (immediately after release of slide lock of second slider).

In the illustrated example, such releasing means 7 is constituted by a link body comprising a first joint part 70 and a second joint part 71. The first joint part 70 has an upper part 70*a* which is positioned on the side end part of the upper side following the length direction of the case 1, and a lower part 70*d* which is integrally connected to the front end 70*c* of this upper part 70*a* and projects downward from one wide side of the case 1. The rear end of the upper part 70*a* of the first joint part 70 is rotationally assembled with said tongue piece part 30, and in this combining part 70*b*, the first joint part 70 is rotationally assembled with the case 1. The second joint part 71 has on the rear end side a push-up protruding part 71*b*, which is inserted into a long hole 11*a* which is provided in a state penetrating the case 1 and connects through to said second slide lock part 61, and on the front end side it has a long hole 71*c*, which receives a linking shaft 70*e* which is formed on the lower end of the first joint part 70. The second joint part 71 is assembled to be capable of rotation on the case 1 in its center, and it is impelled so as to position said push-up protruding part 71*b* at the lower end of the long hole 11*a* which connects through to said second slide lock part 61 by a torsion coil spring 71*a* which is provided in this place of assembly. Also, by this impelling force, it is made such that the first joint part 70 assumes a posture in which it is made to raise up the front end 70*c* of the upper part 70*a*. When said button body Pd is pushed in, the lower end Pg of the lever body Pf hits the front end 70*c* of the upper end 70*a* of the first joint part 70 and pushes this in downward. By this pushing in, it is made such that the first joint part 70 is rotated so as to move the lower end of the lower part 70*d* backward (FIG. 15->FIG. 16), and when the first joint part 70 is rotated thus, the second joint part 71 is rotated so as to raise up the rear end upward (FIG. 16). When the second joint part 71 is rotated thus, it is made such that the push-up protruding part 71*b* hits the sliding contact part 412*b* of the rotating body 412 of the second slider 41 which has entered the second slide lock part 61, and it causes this rotating body 412 to rotate up to the position before tilting (FIG. 5->FIG. 6). When the rotating body 412 of the second slider 41 thus is rotated up to the position before tilting, the sliding contact part 412*b* comes out from the second slide lock part 61 and forward movement of the arm 2 comes to be allowed.

In the illustrated example, it is made such that a space s is formed between the first slider 40 and the second slider 41 in the state when such arm 2 is in the position before forward movement (FIG. 5).

Figure 7:
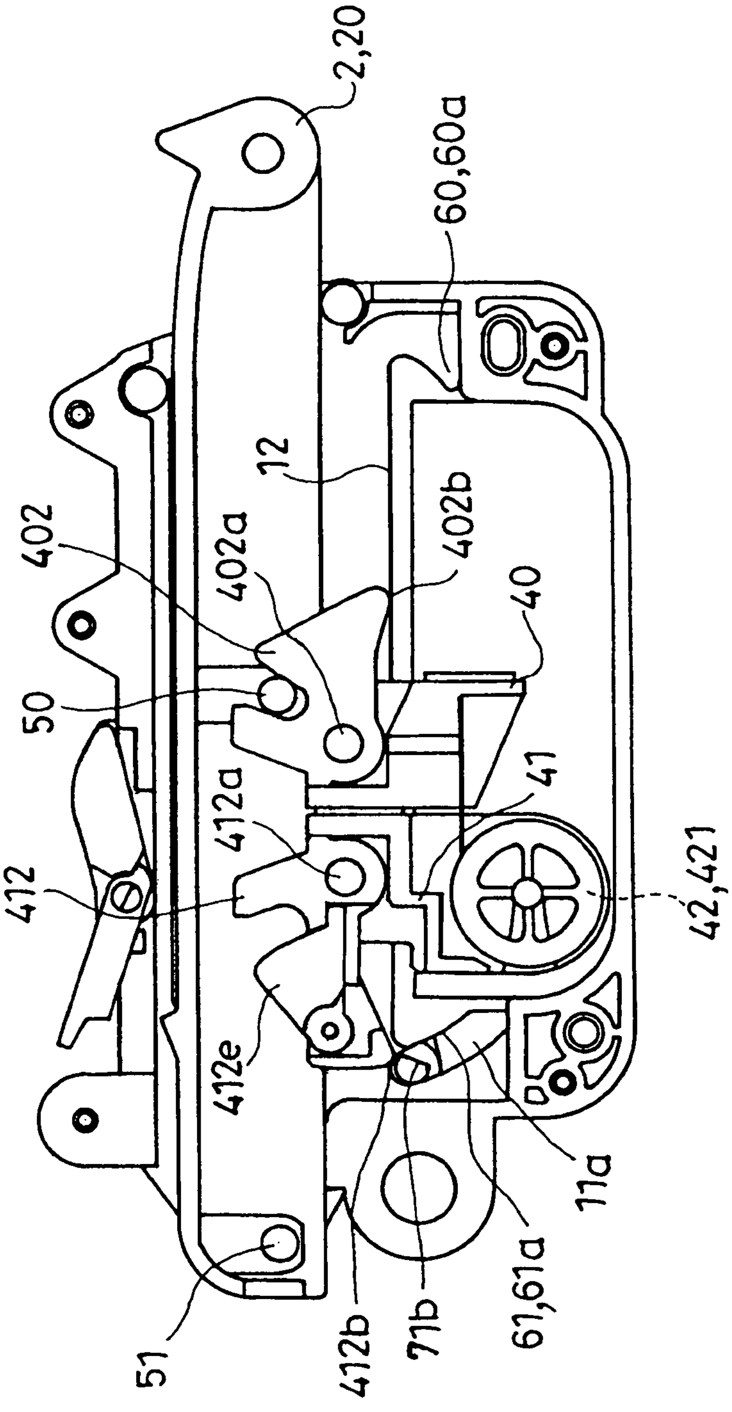
FIG. 7 is a partially cut structural view of essential parts of the moving apparatus of the first embodiment (state when there is no more space between first slider and second slider).

By this, it can be made such that the second slider 41 is drawn closer to the first slider 40 by the impelling means 42 constituting the pair of sliders 4 at the same time as the slide lock of the second slider 41 is released by said releasing means 7, and the sliding contact part 412*b* of the second slider 41 is does not unexpectedly enter the second slide lock part 61 regardless of having made said release (FIG. 6->FIG. 7). Also, in the case when it is done thus, it is possible to make the impelling force of the impelling means 42 which draws the first slider 40 and the second slider 41 closer to each other even when the arm 2 is in the position before forward movement, and the state of the arm 2 being in the position before forward movement can be assured stably.

In the position before forward movement of the arm 2 which constitutes a part of the movable body M being combined with the lid Ma, it is made such that the second slider 41 is locked against sliding, and the first slider 40 catches the first engaging part 50 and is made free to slide (FIG. 5). The second engaging part 51 is positioned behind the second slider 41 which is locked against sliding having the sliding contact part 412*b* of the rotating body 412 inserted into the second slide lock part 61. When the slide lock of this second slider 41 is released by the releasing means 7 from this state, the forward movement of the movable body M is allowed and when the movable body M is moved forward, the second slider 41 also is moved forward together with the first slider 40 which has caught the first engaging part 50 provided on the side of this movable body M (FIG. 5->FIG. 6, FIG. 6->FIG. 7, and furthermore FIG. 8).

In the position at the end of forward movement of the arm 2, it is made such that the first slider 40 is locked against sliding by the first slide lock part 60 in the state having released the first engaging part 50, and the second slider 41 is made free to slide in the state having caught the second engaging part 51 (FIG. 11). In the illustrated example, when the arm 2 reaches the position where the sliding contact part 402*b* of the rotating body 402 of the first slider 40 enters the first slide lock part 60 in the course of forward movement, by the fact that the first engaging part 50 has entered the receiving recessed part 402*c* in a position further away from the sliding contact rail part 12 than the rotating shaft 402*a* of this rotating body 402, the rotating body 402 rotates and tilts toward the direction of causing the sliding contact part 402*b* which was removed from the sliding contact rail part 12 to enter the first slide lock part 60, and the first engaging part 50 comes out forward from the receiving recessed part 402*c* of this rotating body 402 (FIG. 8). At this time the second slider 41 is stopped in the state being free to slide behind the first slider 40. After this when the arm 2 is moved further forward, the second engaging part 51 pushes from the rear against the claw body 412*e*, which is provided on the rotating body 412 of the second slider 41 thus being stopped, and rides over this while elastically pushing it in and the second engaging part 51 is caught in the receiving recess part 412*c* of the second slider 41 (FIG. 10->FIG. 11).

When the movable body M in the position at the end of forward movement is operated to move backward up to the prescribed position, in the illustrated example, when the lid Ma, which was turned down such as by laying a hand on the upper end of the lid Ma, is moved toward the direction of causing it to stand up centered on its rotating shaft Mb, the arm 2 also is moved backward. In this position at the end of forward movement, because the first slider 40 is locked against sliding while the second slider 41 is made free to slide having caught the second engaging part 51, when the arm 2 is moved backward thus the second slider 41 is moved away from the first slider 40, and force is accumulated in the impelling means 42 by this moving away. In the illustrated example, the constant load spring 421 is fed out from the drum 422 and impelling force in the direction of winding up the part fed out by this spring 421 is accumulated (FIG. 12).

When the arm 2 which was in the position at the end of forward movement thus is moved backward up to the prescribed position, it is made such that the second slider 41 releases the second engaging part 51 and is locked against sliding, and the first slider 40 catches the first engaging part 50 and is made free to slide (FIG. 13). In the illustrated example, when the arm 2 is operated to move backward up to the position where the sliding contact part 412*b* of the rotating body 412 of the second slider 41 again enters the second slide lock part 61, by the fact that the second engaging part 51 has entered the receiving recessed part 412*c* at a position further away from the sliding contact rail part 12 than the rotating shaft 412*a* of this rotating body 412, the rotating body 412 rotates and tilts toward the direction of causing the sliding contact part 412*b* which was removed from the sliding contact rail part 12 to enter the second slide lock part 61. Also, the second engaging part 51 is released from the second slider 41 by this tilting. Meanwhile, the wall part, which is positioned on the side ahead of backward movement xr of the receiving recessed part 402*c* of the first slider 40 which is locked against sliding and has caused the rotating body 402 to tilt, is positioned on the track of movement of the engaging parts 50 and 51, and it is made such that the first engaging part 50 is struck from the front against this wall part when the arm 2 was moved backward up to the prescribed position (FIG. 12). When the first engaging part 50 thus is struck at a position further away from the sliding contact rail part 12 than the rotating shaft 402*a* of the rotating body 402, the rotating body 402 is rotated to be pulled back to the position before tilting and it becomes free to slide and catches the first engaging part 50 (FIG. 13). When it becomes thus, the first slider 40 is forcefully moved backward by the impelling means 42 in which force was accumulated as previously noted, whereby the movable body M, that is, the arm 2 is forcefully moved up to the position at the end of backward movement (FIG. 13->FIG. 5), whereby the lid Ma also is forcefully moved up to the position at the end of backward movement where it is in the upright position having closed the opening Pb of the main body Pa.

The damping means 8, in this embodiment, applies damping to the movement of the movable body M at least at the end of forward movement and the end of backward movement of this movable body M. It also may be made different from this embodiment, making it such that damping is applied to the movement of the movable body M by the damping means 8 at the end of forward movement or the end of backward movement of this movable body M.

In the illustrated example, such damping means 8 is constituted by a damper body comprising a piston not illustrated and a cylinder 80 and an impelling means not illustrated, which normally impels this piston toward the direction of pushing out from inside the cylinder 80, and being constituted so as to apply damping to the advancement of the piston into the cylinder 80. A spring, and the like, can be used as such impelling means. Also, such damping can be realized by causing resistance of a fluid sealed inside the cylinder 80 to act on the piston. By making it such that the fluid escapes backward from an orifice, or the like, provided on the piston when the piston advances, while the fluid having moved backward thus returns forward with little resistance, it can be made such that damping is applied mainly only during advancement of the piston. A viscous fluid such as silicon oil can be used as such fluid.

In the example shown in FIG. 1 to FIG. 21, a female adapter 90 having an angular cylindrical shape with the rear end open to receive the cylinder 80 of this damper body is combined on the first slider 40, and it is made such that the damper body moves forward and backward together with this slider 40 in the state making the direction of movement of the piston follow the direction of sliding movement x of the first slider 40. More concretely, on the wide face part of the case 1 opposite the side where the second joint part 71 of said releasing means 7 is disposed, a slot-shaped pass-through part 11*b*, which passes through a combining arm 401*b* which extends integrally to the side from the slider main body 401 of the first slider 40, is formed spanning in the front-back direction. Also, the combining arm 401*b*, which is projected outward from this slot-shaped pass-through hole 11*b*, is fixed to said female adapter 90. A rod 81 is combined on the piston of the damper body, and this rod 81 is fixed to a male adapter 91, which is inserted and combined from the open rear end of said female adapter 90 so as to be capable of going in and out.

Meanwhile, in this example, on the side of the rear end 21 of the arm 2 constituting the movable body M, there is provided a bracket 24, which is assembled integrally on this arm 2, and is positioned on the outside through a slot-shaped pass-through hole 11*c* formed in a state penetrating the case 1 and spanning in the front-back direction. Also, on the rear end of this bracket 24, there is provided a pusher body 24*a*, which pushes from the rear against the side of said piston, that is, the male adapter 91 where said rod 81 is fixed, in the course of forward movement of the arm 2.

Also, in this example, on the case 1 serving as the side of the fixed body P, there is provided a wall body 11*d*, which is pushed against the side of said piston in the course of backward movement of this arm 2.

In this example, it is made such that when the movable body M is in the position before forward movement, the wall body lid contacts the rear end of the male adapter 91 and pushes the male adapter 91 into the female adapter 90, and the piston is pushed more into the cylinder 80 constituting the damper body (FIG. 1), and when the movable body M is in the position at the end of forward movement, the pusher body 24*a* contacts the rear end of the male adapter 91 and pushes the male adapter 91 into the female adapter 90, and the piston is pushed more into the cylinder 80 constituting the damper body (FIG. 3), and in mid-course of forward movement and backward movement, the piston is returned by an impelling means not illustrated to the position before being pushed in, and the male adapter 91 is pushed out more from the female adapter 90 (FIG. 2).

By this, in this example, it is possible to decelerate the speed and suppress the generation of impact noise, and the like, at least at the end of forward movement and the end of backward movement of the movable body M, as well as to give a sense of high quality, and the like, to its movement. Also, when forward movement of the movable body M is allowed by operation of the releasing means 7 from the state when this movable body M is in the position before forward movement, it is possible to utilize the impelling force of the impelling means of the damper body acting on the piston as a part of the force for forward movement of this movable body M, and when backward movement of the movable body M is performed from the state when this movable body M is in the position at the end of forward movement, it is possible likewise to utilize the impelling force of the impelling means of the damper body acting on the piston as a part of the force for backward movement of this movable body M.

Also, in this example, a rotary damper 24*b*, comprising a pinion 24*c* and a main body 24*d* which holds this to be capable of rotation and normally applies damping to this rotation, is provided on the bracket 24 of the arm 2, and a rack part lie, with which the pinion 24*c* of this rotary damper 24*b* normally engages, is provided on the case 1 continuing along its length direction, and it is made such that a constant damping is always applied to the movable body M throughout the course of its forward movement and backward movement. It is made such that the return time of the piston constituting said damping means 8 (damper body) can be assured in the course of forward movement and backward movement of the movable body M by the action of this rotary damper 24*b*.

FIG. 22 to FIG. 26 show an example having changed the placement of such damping means 8. In this example, the damper body is housed inside the case 1 so as to be positioned in front of the arm 2. Compared with the case when the damper body is positioned to the side of the arm 2, it becomes possible to minimize the dimension in the left-right direction of the moving apparatus G. In mid-course of forward movement and backward movement of the movable body M, piston not illustrated of the damper body is most pushed out from the cylinder 80 by a damping means not illustrated, and the female adapter 90 contacts a front side inner wall 15*a* of a receiving space 15 of the damper body in the case 1, and the male adapter 91 contacts a rear side inner wall 15*b* of this receiving space 15 (FIG. 23). Also, it is made such that when the movable body M in the position at the end of forward movement is moved backward, the male adapter 91 for a time is pushed out from inside the female adapter 90, but after a prescribed position of backward movement, a step face 25, which is formed on the upper part of the arm 2 and faces backward, pushes from the front against the rear end of the female adapter 90, which is projecting out somewhat downward from the receiving space 15, and it pushes the male adapter 91 relatively into the female adapter 90 and the piston is piston is pushed in (FIG. 22). Also, it is made such that when the movable body M in the position before forward movement is moved forward, the male adapter 91 likewise for a time is pushed out from inside the female adapter 90, but after a prescribed position of forward movement, a striking part 26, which is formed on the side part of the arm 2, strikes from the front the front end 16*a* of an interlocking body 16, which is combined on the outside of the arm 2 to be capable of sliding movement toward the same direction as the direction of sliding of the arm 2 in the case 1, and it moves this interlocking body 16 along with it. When the interlocking body 16 is moved forward, the rear end 16*b* of this interlocking body 16 pushes against the rear end of the male adapter 91, and it pushes the male adapter 91 into the female adapter 90 and the piston is pushed in (FIG. 24).

FIG. 28 to FIG. 36 show an example using the moving apparatus shown in FIG. 22 to FIG. 26, in which the lid Ma serving as the movable body M, which is attached on the side of the outer face of one side plate Pc of said main body Pa serving as the fixed body P and is combined to be capable of rotation at the lower end on this main body Pa, is made to move as previously noted by this moving apparatus.

In this example, on such main body Pa, there is provided a claw body Pja as an engaging part, which engages with a part engaged with Mc, which is formed on the upper end of the lid Ma, in the position before forward movement of this lid Ma, and there is provided a disengaging means F for this engagement. By this, in this example, it is made possible to maintain stably the state of the lid Ma being in the position before forward movement.

Also, the lid Ma has said part engaged with Mc respectively in two places with a space in between, more specifically, in both the left and right corner parts of the top part of the lid Ma, in the direction intersecting the direction of rotation of this lid Ma, that is, in the left-right direction of the lid Ma. Also, on the left and right top part surrounding the opening Pb of the main body Pa, there is provided respectively a claw body Pja which serves as the engaging part corresponding to the part engaged with Mc of the lid Ma. By this, in this example, it is possible to hold the lid Ma in the position before forward movement on the main body Pa in two places making different the positions in the direction intersecting with the direction of its movement so that looseness and gaps, and the like, do not arise.

In the illustrated example, the part engaged with Mc of the lid Ma has a protruding part Mca, which protrudes inward from the upper end of the lid Ma in the position before forward movement, and a hook part Mcb, which protrudes downward from the end part of this protruding part Mca. Meanwhile, the claw body Pja of the main body Pa is assembled to be capable of rotation by a horizontal shaft Pje on a platform member Pm, which is fixed on the outer face of the upper part of the main body Pa on the inside end Pjd, having this claw body Pja which projects upward on the outside end Pjc, and furthermore, there is provided a protruding part Pjf, which constitutes the disengaging means F, between this outside end Pjc the inside end Pjd, and it is provided on a lock part Pj, which is impelled by an impelling means Pjg such as a torsion coil spring to cause the claw body Pja to engage from beneath with the hook part Mcb of the lid Ma in the position before forward movement.

The disengaging means F is constituted by a button body Pd, a linking body Pk, and the protruding part Pjf of said lock part Pj. The button body Pd is provided only on the side of one side plate Pc of the main body Pa. Also, in the illustrated example, the disengaging means F is linked on the left and right of the main body Pa. The linking body Pk is combined to be capable of moving forward and backward on the platform member Pm. The button body Pd is combined integrally with this linking body Pk on the front end part of this linking body Pk. The linking body Pk has a leg part Pka, which projects downward to strike from the front the protruding part Pjf of the lock part Pj when the button body Pd is push-in operated. It is made such that the linking body Pk is positioned in the forward position by an impelling means which is acted on a lever body Pf to be described later, and the button body Pd also is positioned in the forward position. It is made such that when the button body Pd is pushed in from this state, the linking body Pk is moved to slide backward, it pushes the protruding part Pjf of the lock part Pj and causes the lock part Pj to rotate in opposition to said impulsion so as to cause the claw body Pja to move downward to become in the disengaged position (this position is indicated by the imaginary line in FIG. 30 and FIG. 30). By this the engagement between the part engaged with Mc of the lid Ma and the claw body Pja is released on the side where the button body Pd is provided. Also, in this example, a linkage rod Pn is supported on the platform member Pm to as to be capable of sliding movement in the left-right direction of the main body Pa. One end of the linkage rod Pn is made so as to be normally pushed by a spring Pna, which provided in the place of combination of the platform member Pm and the linkage rod Pn, against a cam face Pkb is formed on the linking body Pk constituting the disengaging means F on the side where the button body Pd is provided, and the other end of the linkage rod Pn is made so as to contact a cam face Pkb formed on the linking body Pk constituting the disengaging means F on the side opposite this. When the button body Pd is pushed in, the engagement between the part engaged with Mc of the lid Ma and the claw body Pja is released as previously noted on the side where this button body Pd is provided, and the linkage rod Pn is moved in the direction to push its other end against the cam face Pkb formed on the linking body Pk constituting the disengaging means F on the side opposite the side where the button body Pd is provided. By this it is made such that the engagement between the part engaged with Mc of the lid Ma and the claw body Pja is released simultaneously also on the side opposite the side where the button body Pd is provided. By the releasing of these engagements, it is made such that when the lid Ma which was moved forward up to the position at the end of forward movement is moved backward, immediately before reaching the position at the end of backward movement, a sloping face Mcc, which is formed on the outside of the hook part Mcb of the part engaged with Mc, contacts a sloping face Pjb, which is formed on the outside of the claw body Pja of the lock part Pj, where this claw body Pja again is positioned in the engaged position, and the lock part Pj is rotated up to the position to put the claw body Pja in the disengaged position, and return of the lid Ma to the position at the end of backward movement is allowed, and when the lid Ma reaches this position at the end of backward movement, the lock part Pj again positions the claw body Pja in the engaged position by the impulsion and causes the claw body Pja to engage with the part engaged with Mc of the lid Ma to stably maintain again the state of the lid Ma being in the position before forward movement.

Also, in the example shown in FIG. 28 to FIG. 36, said decoupling means F and the releasing means 7 of the slide lock of the second slider 41 are linked, and it is made such that the slide lock of the second slider 41 is released at the same time as the engagement of the engaging part (claw body Pja) of the main body Pa with the part engaged with Mc of the lid Ma is released.

Concretely, in the illustrated example, a lever, which is made such that the front end is normally pushed against the rear end part of the linking body Pk by the impulsion of an impelling means such as a torsion coil spring not illustrated, and the rear end is positioned in front of the first joint part 70 constituting the releasing means 7, is combined to be capable of rotation on the platform member Pm. Also, it is made such that when the button body Pd is pushed in, the upper part of the lever body Pf is moved via the linking body Pk and the upper part 70*a* of this first joint part 70 is pushed in downward by the movement of the upper part of this lever body Pf and the slide lock of the second slider 41 is released.

Second Embodiment

Next, the lid apparatus of the second embodiment of the present invention is explained based on FIG. 37 to FIG. 51. Also, the explanation is omitted for contents that are roughly the same as in the first embodiment.

Figure 37:
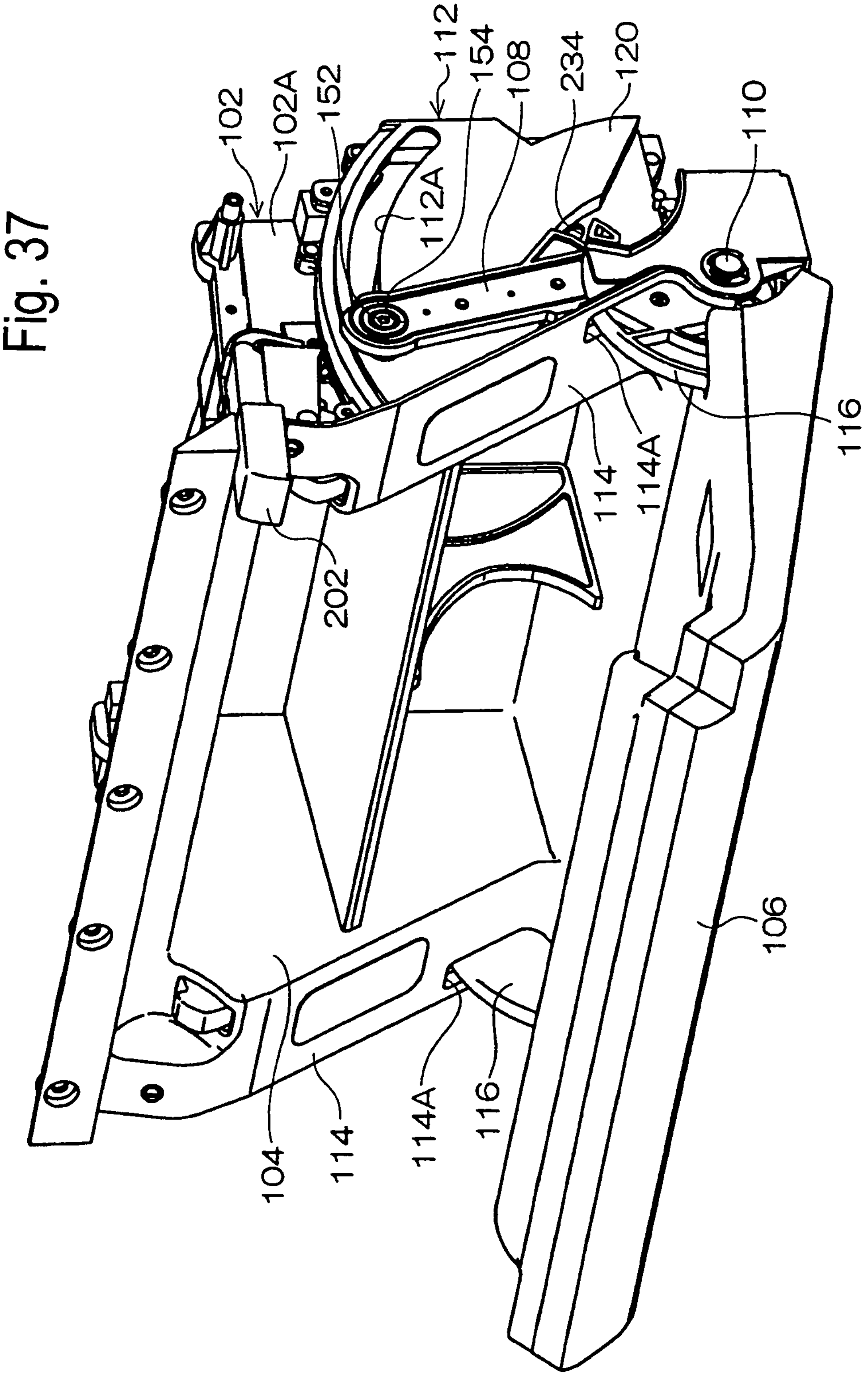
FIG. 37 is a perspective view showing the lid apparatus of the second embodiment.
Figure 38:
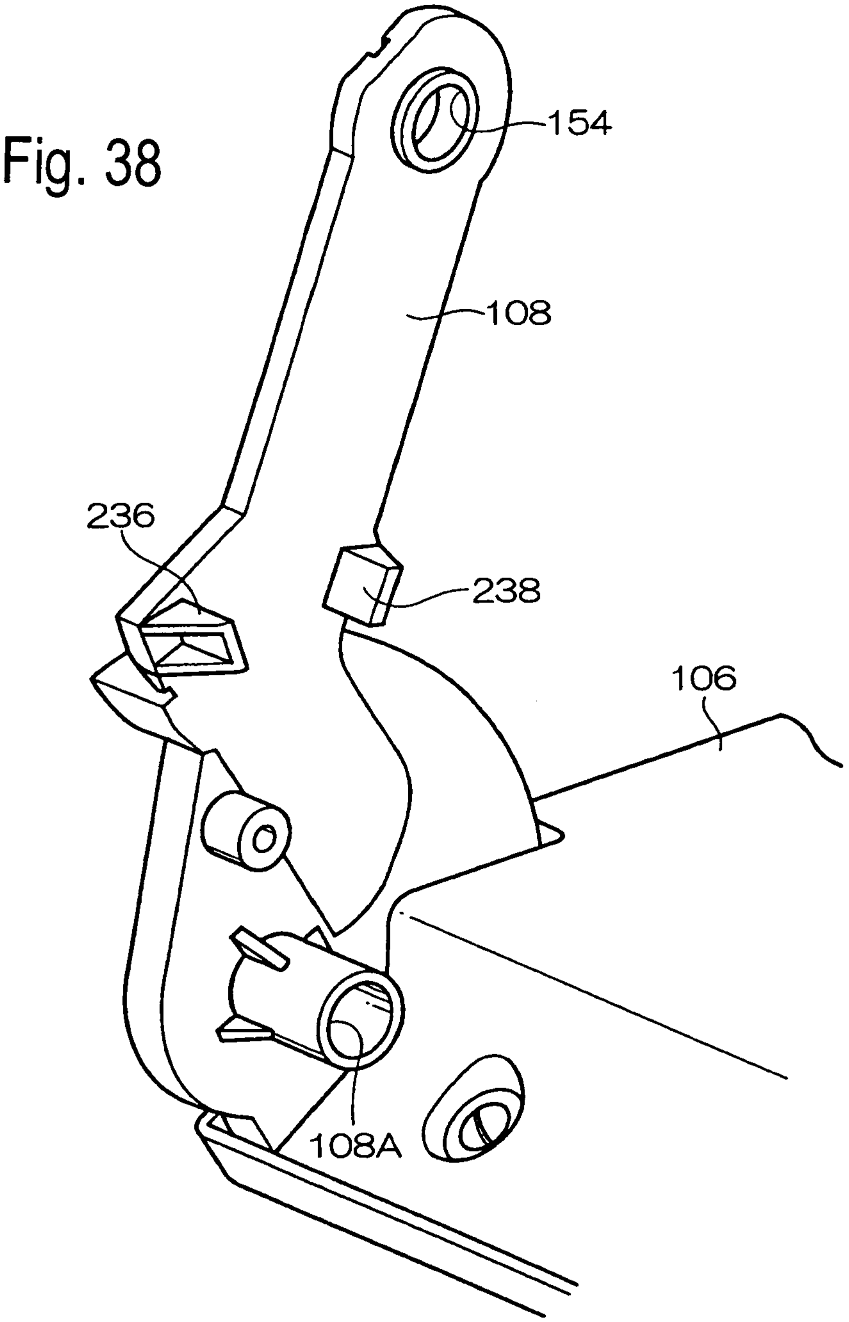
FIG. 38 is a perspective view showing the arm of the lid apparatus of the second embodiment.

As shown in FIG. 37, in the present embodiment, it is made possible to open and close an opening 104 of a roughly long box-shaped main body 102 with a roughly long plate-shaped lid 106. On the inner faces of the lid 106 (see FIG. 38), there are respectively provided arms 108 which are capable of facing opposite the outer faces of the side walls 102A of the main body 102. On the base of this arm 108, there is formed a shaft hole 108A, and it is capable of being inserted into by a shaft 110 which is provided on the lower part of the side wall 102A of the main body 102. By this, the arm 108 rotates centered on this shaft 110, and the lid 106 becomes capable of opening and closing via said arm 108.

Here, on the outer face of the side wall 102A of the main body 102, there is attached a damper unit (moving apparatus) 112 to be described later, and the arm 108 is connected to that damper unit 112, and the attenuating effect of the damper unit 112 is made capable of being transmitted to the lid 106 via this arm 108.

Also, from the edge of the opening of the main body 102, there is formed a flange part 114 which is bent at a right angle going toward the outside with respect to the side wall 102A. On this flange part 114 there is formed a run-through hole 114A, and a shaft plate 116 which connects the base of the arm 108 and the inner face of the lid 106 is made capable of being run through inside said run-through hole 114A. That is, during opening and closing of the lid 106, this shaft plate 116 comes to move back and forth inside the run-through hole 114A. Therefore, the run-through hole 114A should have the necessary size for said shaft plate 116 to run through.

(Damper Unit)

Figure 39:
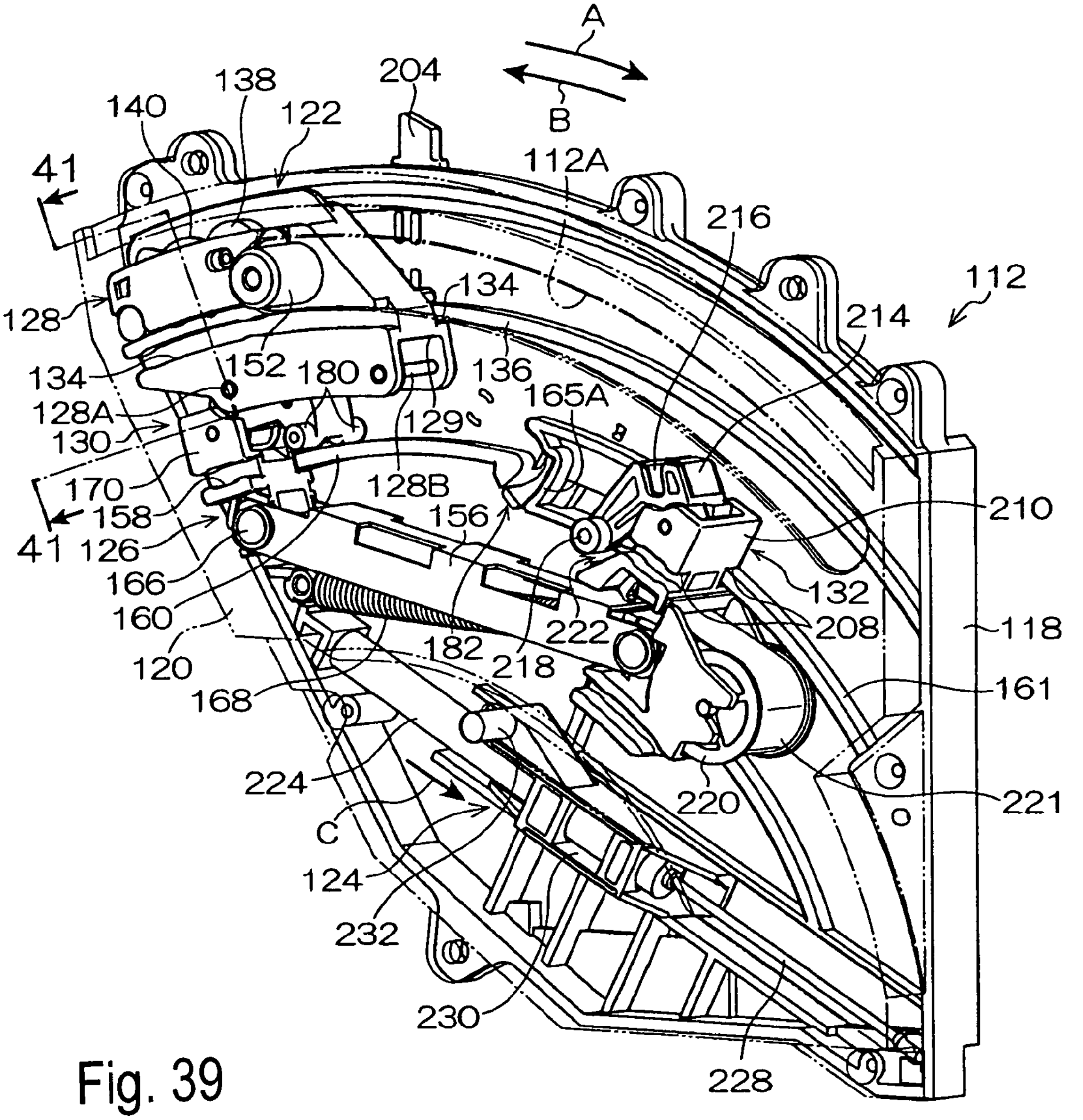
FIG. 39 is a perspective view showing the moving apparatus of the second embodiment.

Next, the damper unit 112 is explained. As shown in FIG. 39, the damper unit 112 is made capable of being received inside a thin-type receiving part 118 which is formed in a roughly door shape, it is covered by a lid part 120, and it is made capable of being installed on the side wall 102A of the main body 102 (see FIG. 37A) in a state having been made as a unit.

Also, the damper unit 112 comprises a rotary damper unit 122, a piston damper unit 124, and a power transmission unit 126, and the rotary damper unit 122 is provided on a power transmission slider (slider) 128 which is one member constituting the power transmission unit 126.

(Rotary Damper Unit)

Here, the rotary damper unit 122 is explained. As shown in FIG. 39 and FIG. 40, the power transmission unit on which the rotary damper unit 122 is provided is roughly quadrangular shaped, and on the front/outer face (the side facing opposite the lid part 120) and the back/inner face (the side facing opposite the receiving part 118) of the power transmission slider 128, there is formed an arc slot 134 following the direction of movement of the power transmission slider 128.

Figure 45:
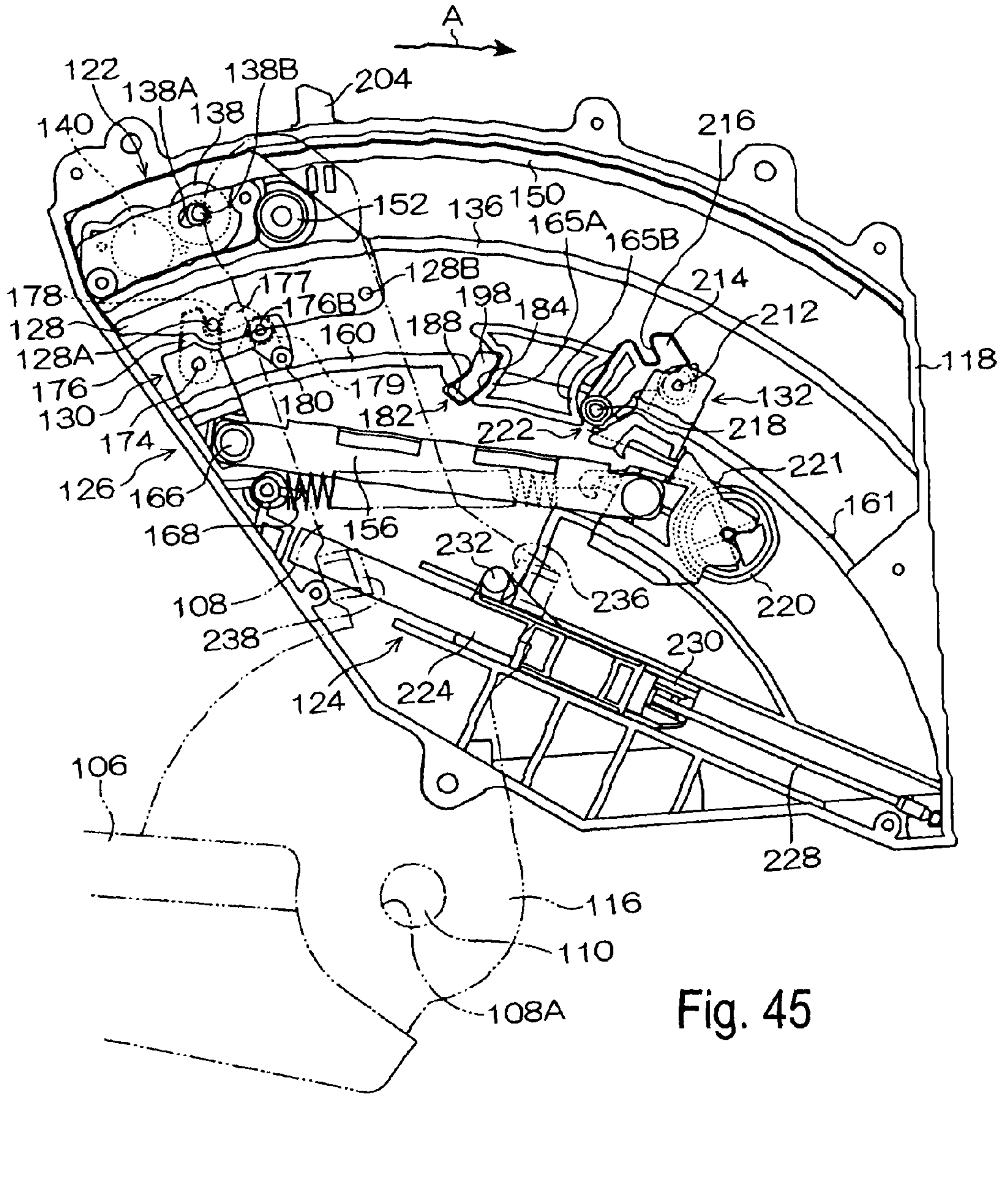
FIG. 45 is a side view showing the state when the lid of the second embodiment is opened.

This arc slot 134, as shown in FIG. 41 (being a sectional view on 41-41 in FIG. 39) and FIG. 45, is made capable of coupling with a guide rib 136 which is formed on a concentric circle with the shaft hole 108A crossing from one end to the other end of the receiving part 118 and the lid part 120, and the power transmission slider 128 is guided following this guide rib 136.

Also, as shown in FIG. 40 and FIG. 41, on the side of the front/outer face of the power transmission slider 128, there is installed a one-way gear 138, and a rotary damper 140 is provided adjacent to this one-way gear 138. Inside the housing 140B of the rotary damper 140, there is filled a viscous fluid such as silicon oil, and it becomes that the attenuating effect of the viscosity resistance of said viscous fluid is obtained on the one-way gear 138 in the state when the one-way gear 138 is engaged with the gear 140A constituting the rotary damper 140.

Meanwhile, on the lid part 120 there is formed a rack 144 which is capable of engaging with the one-way gear 138, and it becomes that the attenuating effect is obtained on the power transmission slider 128 via the rack 144 and the one-way gear 138.

The shaft bearing hole 138A of the one-way gear 138 is formed in a long hole shape following the direction of movement of the power transmission slider 128, and there is some play between it and the shaft part 138B of the one-way gear 138. Therefore, it is made such that when the power transmission slider 128 moves toward the direction of arrow B (when it opens the lid 106), the one-way gear 138 is pushed by the rack 144 toward the direction of moving away from the rotary damper 140, and the state of engagement with the gear 140A is released. In this case, it becomes that the attenuating affect of the rotary damper 140 does not act on the one-way gear 138 (power transmission slider 128).

Also, on the side of the back/inner face of the power transmission slider 128, there is provided a gear 146A which constitutes a rotary damper 146. This gear 146A engages with a rack 150 which is formed on the receiving part 118, and the attenuating affect is obtained on the gear 146A by the viscosity resistance of the viscous fluid filled inside the housing 146B, regardless of the direction of movement of the power transmission slider 128.

Here, on the side of the front/outer face of the power transmission slider 128, there is provided a boss 152, and on the lid part 120 of the damper unit 112, there is formed an opening 112A (see FIG. 37) conforming to the track of movement of the boss 152. Although it becomes that the boss 152 is exposed to the outside through this opening 112A, a connecting hole 154 (see FIG. 38) formed on the front end part of the arm 108 is made capable of engaging with this boss 152. Therefore, it becomes that the boss 152 (power transmission slider 128) moves conforming to the movement of the arm 108 (lid 106).

Accordingly, it becomes that the attenuating effects of the rotary dampers 140 and 146 act on the lid 106 via the power transmission slider 128, boss 152, arm 108, and shaft plate 116; the attenuating effect of the rotary damper 146 acts when opening (moving forward) the lid 106, and the attenuating effects of the rotary dampers 140 and 146 act when closing (moving backward) the lid 106.

(Power Transmission Unit)

Next, the power transmission unit 126 is explained. As shown in FIG. 39, the power transmission unit 126 is constituted including a power transmission slider 128, an energy accumulation side slider (first member) 130, a drawing-in side slider (second member) 132, and a link member 156.

On the bottom face of the power transmission slider 128, there is placed a slot part 129 following the direction of movement of the power transmission slider 128, and on one end side and the other end side of the slot part 129, there are respectively provided connecting pins 128A and 128B in a manner so as to bridge said slot part 129. The energy accumulation side slider 130 and the drawing-in side slider 132 are made capable of connecting respectively with these connecting pins 128A and 128B.

Figure 42:
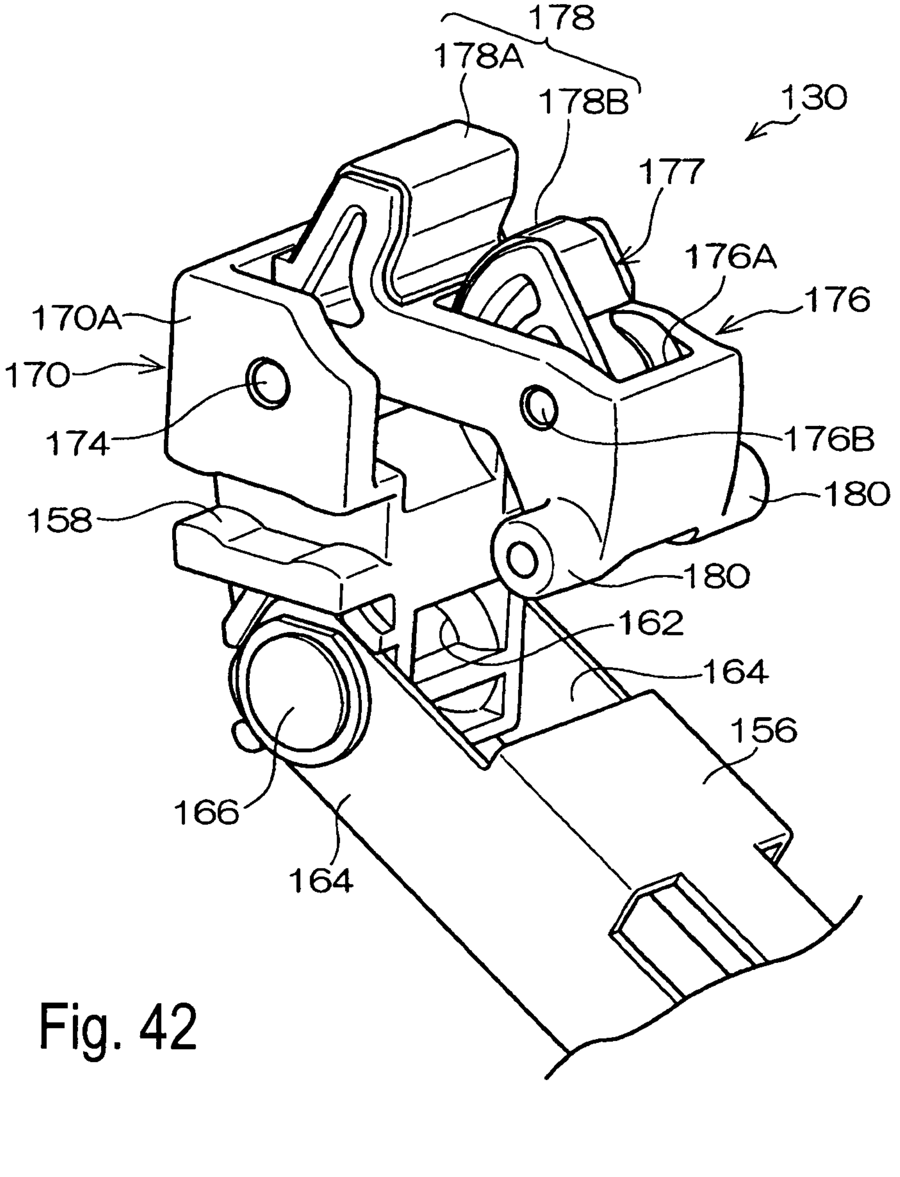
FIG. 42 is a perspective view showing the slider on side of energy accumulation of the moving apparatus of the second embodiment.

As shown in FIG. 42, the energy accumulation side slider 130 is roughly angular columnar shaped, and on the front/outer face (the side facing opposite the lid part 120) and the back/inner face (the side facing opposite the receiving part 118) of the energy accumulation side slider 130, there is formed a guide trough 158 following the direction of movement of the energy accumulation side slider 130.

This guide trough 158 is made capable of coupling with a guide rib 160 which is formed on a concentric circle with the shaft hole 108A respectively on the receiving part 118 and the lid part 120 crossing from one end part to the middle part, and the energy accumulation side slider 130 is guided following said guide rib 160.

A shaft hole 162 runs through one end part (lower end part) of the energy accumulation side slider 130. The lower end part of the energy accumulation side slider 130 is inserted between a pair of shaft plates 164, of which their front/outer face and back/inner face are formed on one end part of an angular tubular link member 156, and the energy accumulation side slider 130 is axially supported to be capable of rotation relative to the link member 156 by a pin 166 which runs through a hole part (not illustrated) and a shaft hole 162 which are formed on the shaft plate 164. That is, it becomes that the link member 156 and the energy accumulation side slider 130 move in a state as one body.

Here, as shown in FIG. 45, on the other end side of the link member 156, one end part of a coil spring 168 is installed. The other end part of this coil spring 168 is installed on one end part of the receiving part 118, which becomes the side of the opening 104 of the main body 102, and it is enabled to expand and contract by the movement of the link member 156.

Meanwhile, on the other end part (upper end part) of the energy accumulation side slider 130, there is formed an angle bracket-shaped shaft bearing part 170 shown in FIG. 39, having the side of the drawing-in side slider 132 opened. On mutually facing shaft plates 170A of this shaft bearing part 170, there is provided a shaft 174, and a connecting part 176 is supported to be capable of rotation.

On the upper face on the side of the center of rotation of this connecting part 176, there is provided a protruding part 178A, which constitutes a recessed part for holding (connecting) the connecting pin 128A. Here, on the side of the free end of the connecting part 176 there is provided a hollow part 176A, and a shaft 176B is bridged across the hollow part 176A. A roughly door-shaped plate 177 is axially supported on this shaft 176B, and it is made capable of swaying inside the hollow part 176A.

A recessed part 178 is formed by the arc-shaped free end part 178B of this plate 177 and the protruding part 178A of the connecting part 176, and the connecting pin 128A becomes capable of connection. Also, the plate 177 is impelled toward the direction going upward by a torsion spring 179 (see FIG. 45).

Also, on the lower face of the free end part of the connecting part 176, there is provided sliding part 180, which is capable of sliding on the upper face of the guide rib 160, and it moves on the guide rib 160 following the shape of the guide rib 160.

Here, as shown in FIG. 45, the end part of the guide rib 160 bends toward the side of the link member 156 (lower side) as it goes to the center part of the receiving part 118, and a lock part (first lock part) 182 is formed between it and a stopper 165A formed roughly in parallel with a space between it and its end part.

By this lock part 182, the connecting part 176 is received in a state having rotated the free end side downward centered on the shaft 174 following the shape of the guide rib 160 via the sliding part 180 provided on the connecting part 176 of the energy accumulation side slider 130 (see FIG. 46), and the movement of the energy accumulation side slider 130 is restricted (locked state).

Figure 46:
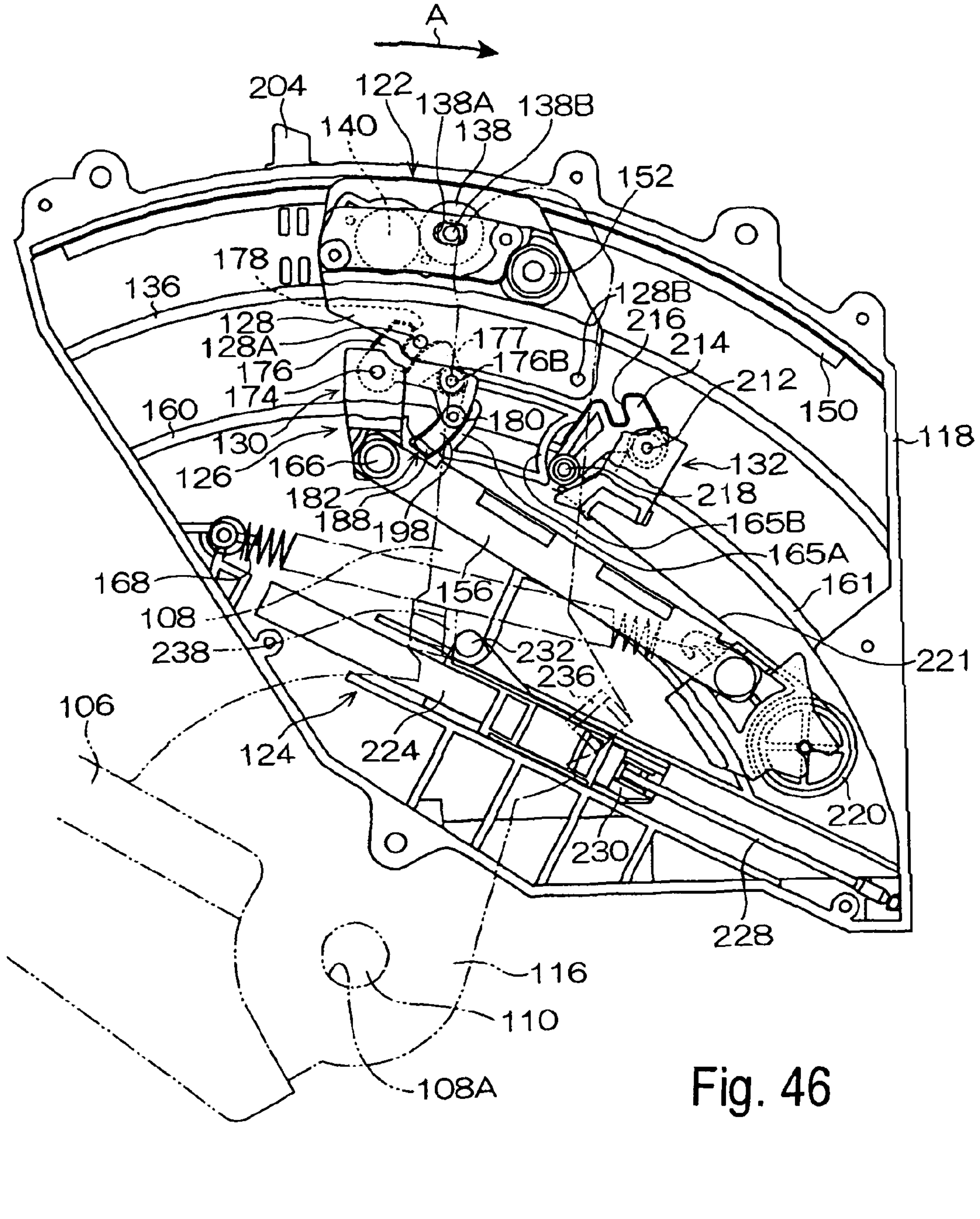
FIG. 46 is a side view showing the mid-course of closing the lid of the second embodiment.
Figure 47:
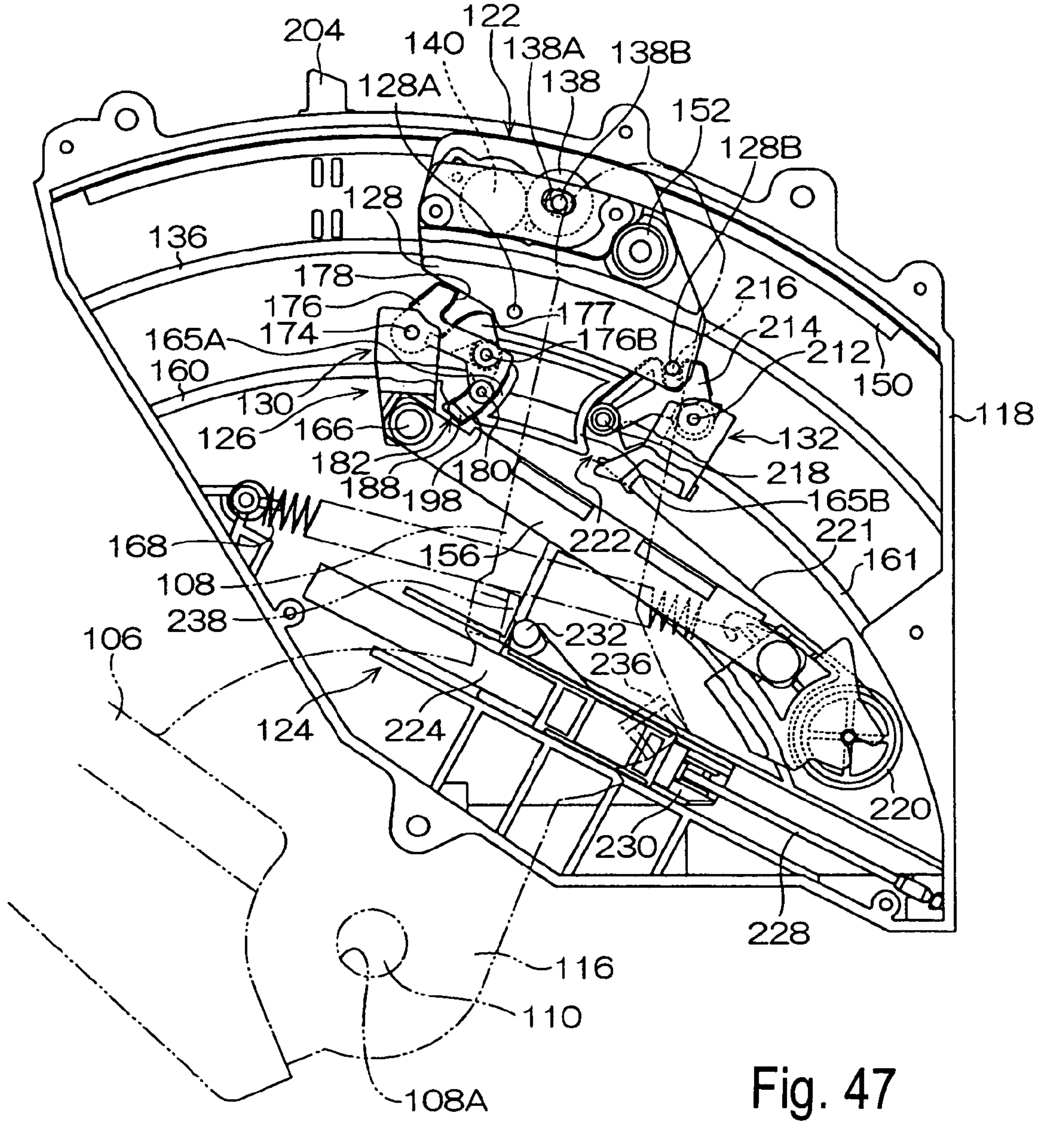
FIG. 47 is a side view showing the mid-course of closing the lid of the second embodiment.

Doing thus, in the state when movement of the energy accumulation side slider 130 is restricted by the lock part 182, as shown in FIG. 46, the opening of the recessed part 178 of the connecting part 176 is facing the direction of movement of the power transmission slider 128. Therefore, by the movement of the power transmission slider 128, as shown in FIG. 47, the connecting pin 128A inside the recessed part 178 comes out from said recessed part 178, and the state of connection of the power transmission slider 128 and the energy accumulation side slider 130 is released.

Figure 43A:
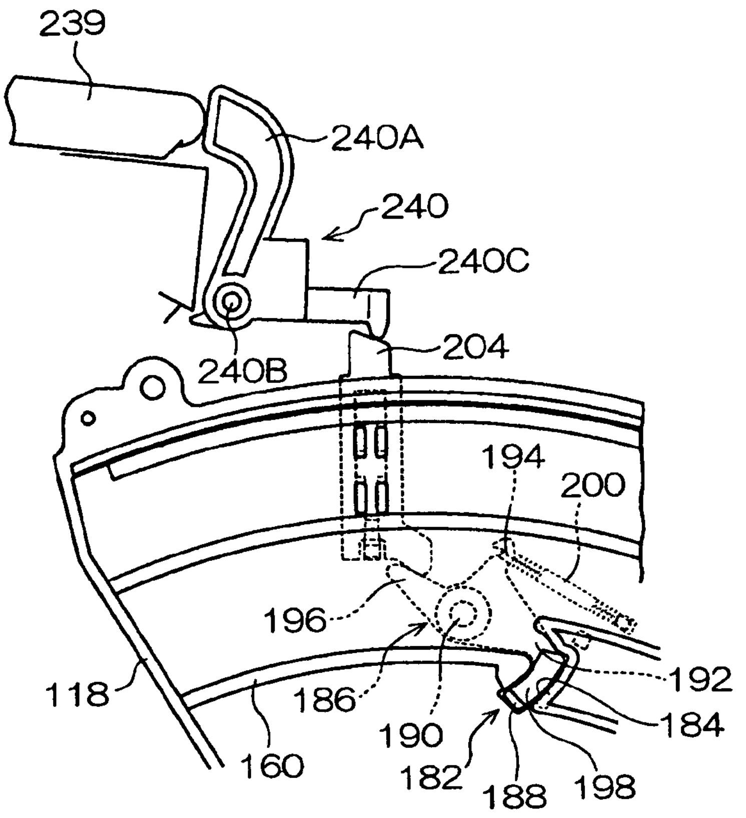
FIGS. 43(A) and 43(B) are operating drawings showing the method of unlocking of the slider on the energy accumulation side of the moving apparatus of the second embodiment.

Here, as shown in FIGS. 43(A) and (B), in the lock part 182, there is formed a hole part 184 conforming to the shape of the lock part 182, and a lock releasing bump 188 of a lock member 186 (described later), which is provided on the back/inner side of the receiving part 118, is exposed from this hole part 184.

The lock member 186 is attached to be capable of swaying centered on a shaft part 190 on the side of the back/inner face of the receiving part 118, and contact parts 192, 194 and 196 are provided following the circumferential direction of the shaft part 190. These contact parts 192, 194 and 196 have a roughly triangular shape, a tongue part 198 extends from the top part of the contact part 192 so as to become a shape conforming to the hole part 184, and on the front end part of said tongue part 198, there is placed the aforementioned lock releasing bump 188.

Also, one end part of a spring 200 is installed on the contact part 194. The other end of this spring 200 is installed on the receiving part 118, and it impels the lock member 186 toward the direction where the lock releasing bump 188 is placed at the lower end part of the hole part 184.

The contact part 196 is provided on the side about opposite the contact part 194 with the contact 192 in between, but it is made such that this contact part is contacted by a lock releasing member 204, which moves downward in linkage with a button body 202 (see FIG. 37, also, this button body 202 is roughly the same as the button body Pd of the first embodiment), which is pressed when opening the lid 106.

As shown in FIG. 32 and FIG. 34, in the state when the lid Ma (equivalent to the lid 106 of the second embodiment) was closed, it is made such that the part engaged with Mc and the claw body Pja are engaged when the button body Pd is pushed, but when the lid Ma is opened, by pushing the button body Pd, the claw body Pja rotates, and the state of engagement with the part engaged with Mc is released, whereby the lid Ma becomes capable of opening.

In the present embodiment, on the far side of this button body 202, there is provided a pressing part 239, which moves in linkage with said button body 202 (this pressing part 239 may be provided integrally with the button body 202), and there is provided a roughly L-shaped link member 240, which changes the linear movement of said pressing part 239 to rotational movement.

Also, one end part 240A of the link member 240 is placed on an extension line of the track of movement of the pressing part 239, and rotation center part 240B is provided beneath the extension line of the track of movement of the pressing part 239, whereby it is made such that the other end part 240C of the link member 240 is moved downward.

Also, on the track of movement of the other end part 240C of the link member, there is provided a roughly rectangular shaped lock releasing member 204, and it is made such that when the other end part of the link member 240 moves downward, one end part of the lock releasing member 204 is pressed. By this, when the other end part of the lock releasing member 204 contacts the contact part 196 of the lock member 186, the lock member 186 sways centered on the shaft part 190 toward the direction opposing the impelling force of the spring 206.

Figure 43B:
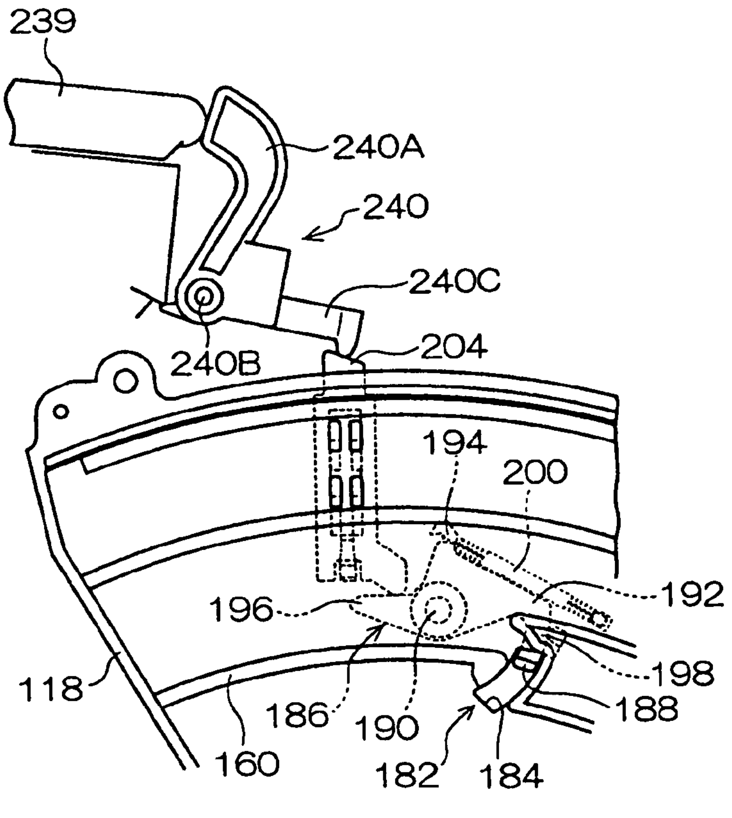
Figure 49:
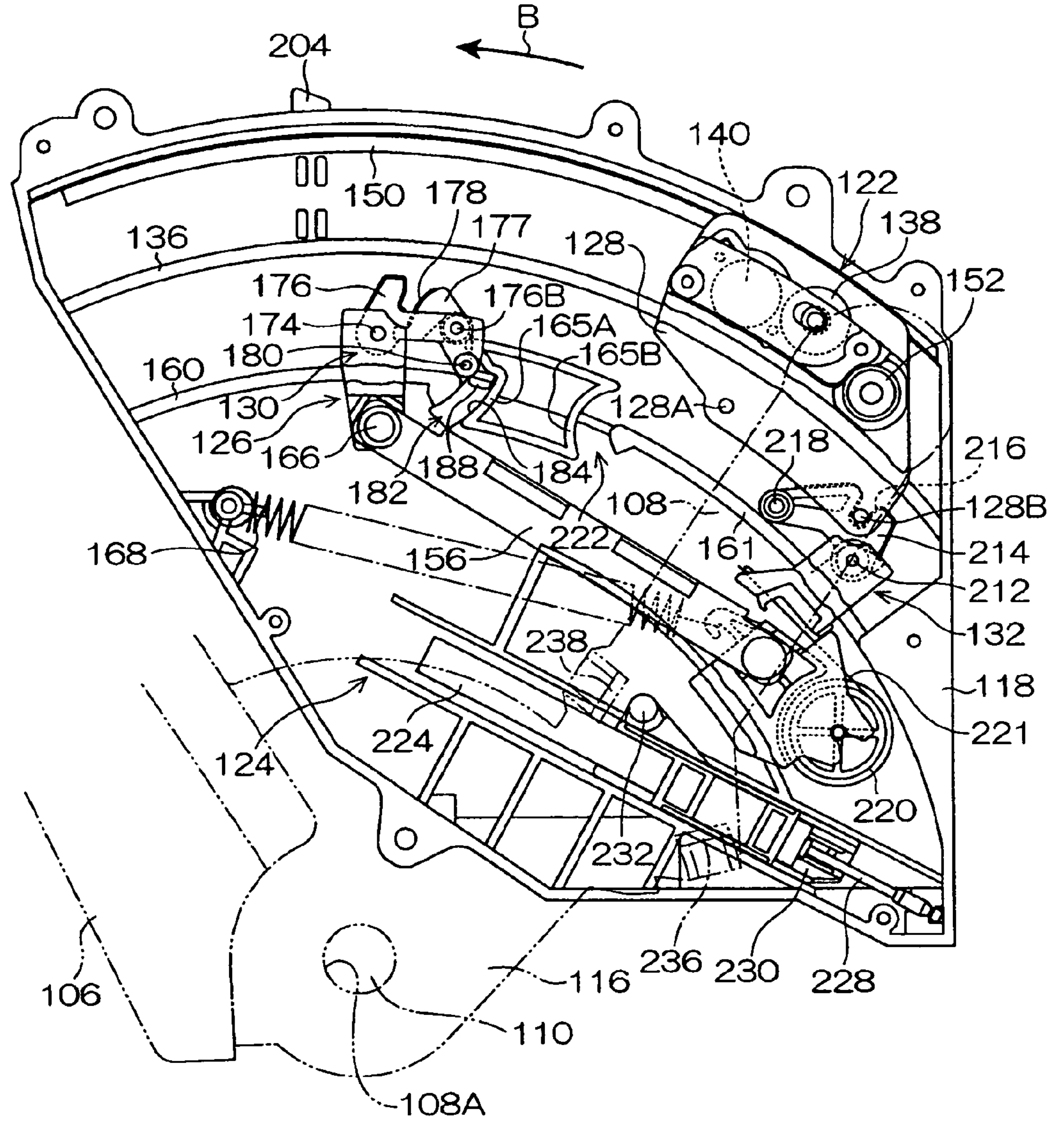
FIG. 49 is a side view showing the state when opening the lid of the second embodiment.

By this, the lock releasing bump 188 of the contact part 192 comes to move from the position in FIG. 43(A) to the position in FIG. 43(B), and by said lock releasing bump 188, the free end side of the connecting part 176 is raised up, and the locked state of the energy accumulation side slider 130 is released, and the energy accumulation side slider 130 becomes in the state capable of movement (see FIG. 49).

Figure 44:
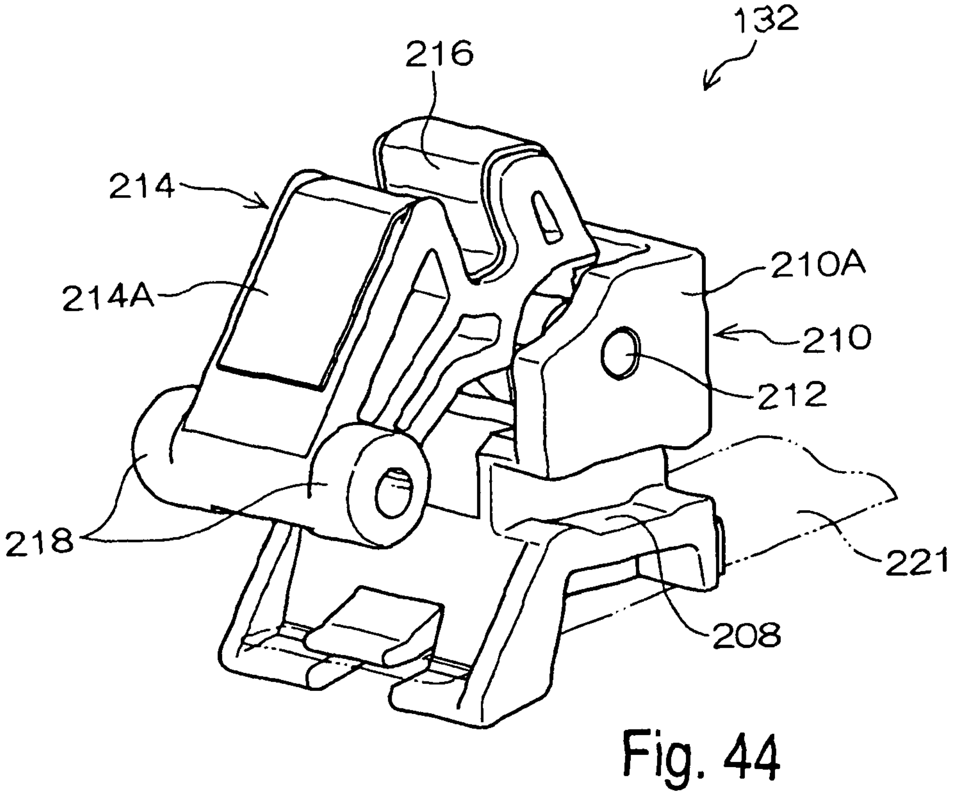
FIG. 44 is a perspective view of the slider on the drawing side of the moving apparatus of the second embodiment.

Meanwhile, as shown in FIG. 44, the drawing-in side slider 132 has a roughly angular columnar shape, and on the front/outer face (the side facing opposite the lid part 120) and the back/inner face (the side facing opposite the receiving part 118) of the drawing-in side slider, there is provided a guide trough 208 following the direction of movement of the drawing-in side slider 132.

This guide trough 208 is made capable of coupling with a guide rib 161, which is formed on the same circumference of the guide rib 160 from the respective center parts of the receiving part 118 and the lid part 120 crossing to the other side parts, and the drawing-in side slider 132 is guided following said guide rib 161.

On one end part (upper end part) of the drawing-in side slider 132, there is formed a shaft bearing part 210, having the side of the energy accumulation side slider opened, shown in FIG. 39. On mutually facing shaft plates 210A of this shaft bearing part 210, there is provided a shaft 212, and a connecting part 214 is supported to be capable of rotation. On the upper face on the side of the center of rotation of this connecting part 214, there is provided a recessed part 216, and a connecting pin 128B is made capable of connection.

Also, the upper face of the connecting part 214 has formed a sloping part 214A, which goes downward as it goes from the recessed part 216 to the free end side, and on the free end side of the connecting part 214, there is provided a sliding part 218, which is capable of sliding on the upper face of the guide rib 161, and it is made capable of moving on the guide rib 161 following the shape of the guide rib 161.

Here, on the other end part of the link member 156, there is attached a drum 220, on which a constant load spring 221 as a spring member is wound, and the front end part of the constant load spring 221 is attached to the drawing-in side slider 132. Therefore, as shown in FIG. 46, when the drawing-in side slider 132 approaches the energy accumulation side slider 130, the constant load spring 221 is wound out from the drum 220, and impelling force comes to be accumulated in the constant load spring 221.

The returning force of this constant load spring 221 is constant and does not change according to stroke, therefore during the return of the constant load spring 221, it is possible to move the drawing-in side slider 132 at the same speed, and it is possible to move the lid 106 in a stable state via said drawing-in side slider 132, the power transmission slider 128, and the arm 108. Also, it is long-lived, having less loss of springiness than a coil spring.

Meanwhile, the end part of the guide rib 161 bends toward the side of the link member 156 (lower side) as it goes to the center part of the receiving part 118 (see FIG. 48), and a lock part (second lock part) 222 is formed between it and a stopper 165B formed roughly in parallel with a space between it and its end part.

By this lock part 222, the connecting part 214 is received in a state having rotated the free end side downward centered on the shaft 212 following the shape of the guide rib 161 via the sliding part 218 provided on the connecting part 214 of the drawing-in side slider 132 (see FIG. 50), and the movement of the drawing-in side slider 132 is restricted (locked state).

Figure 50:
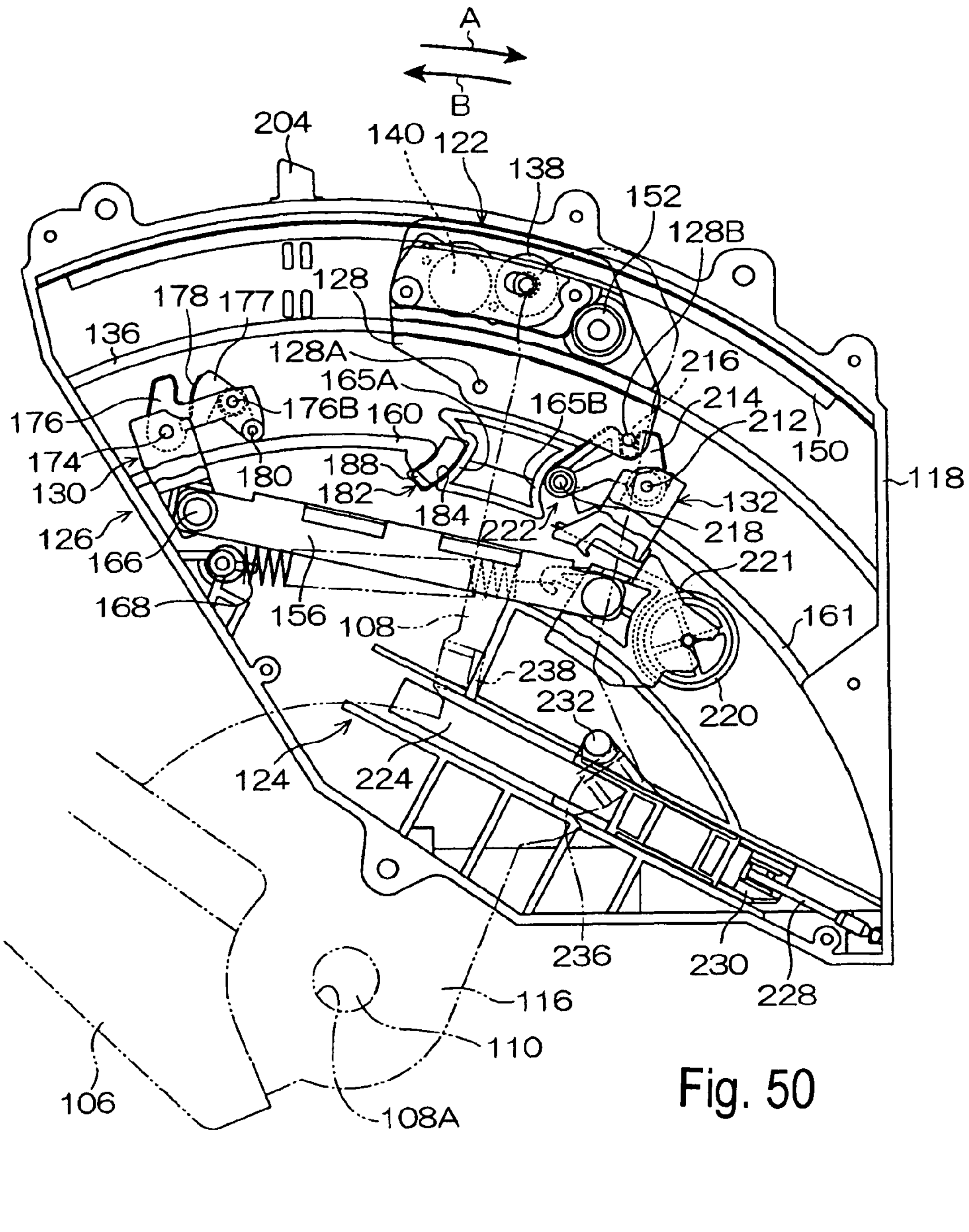
FIG. 50 is a side view showing the mid-course of the lid of the second embodiment being opened.
Figure 51:
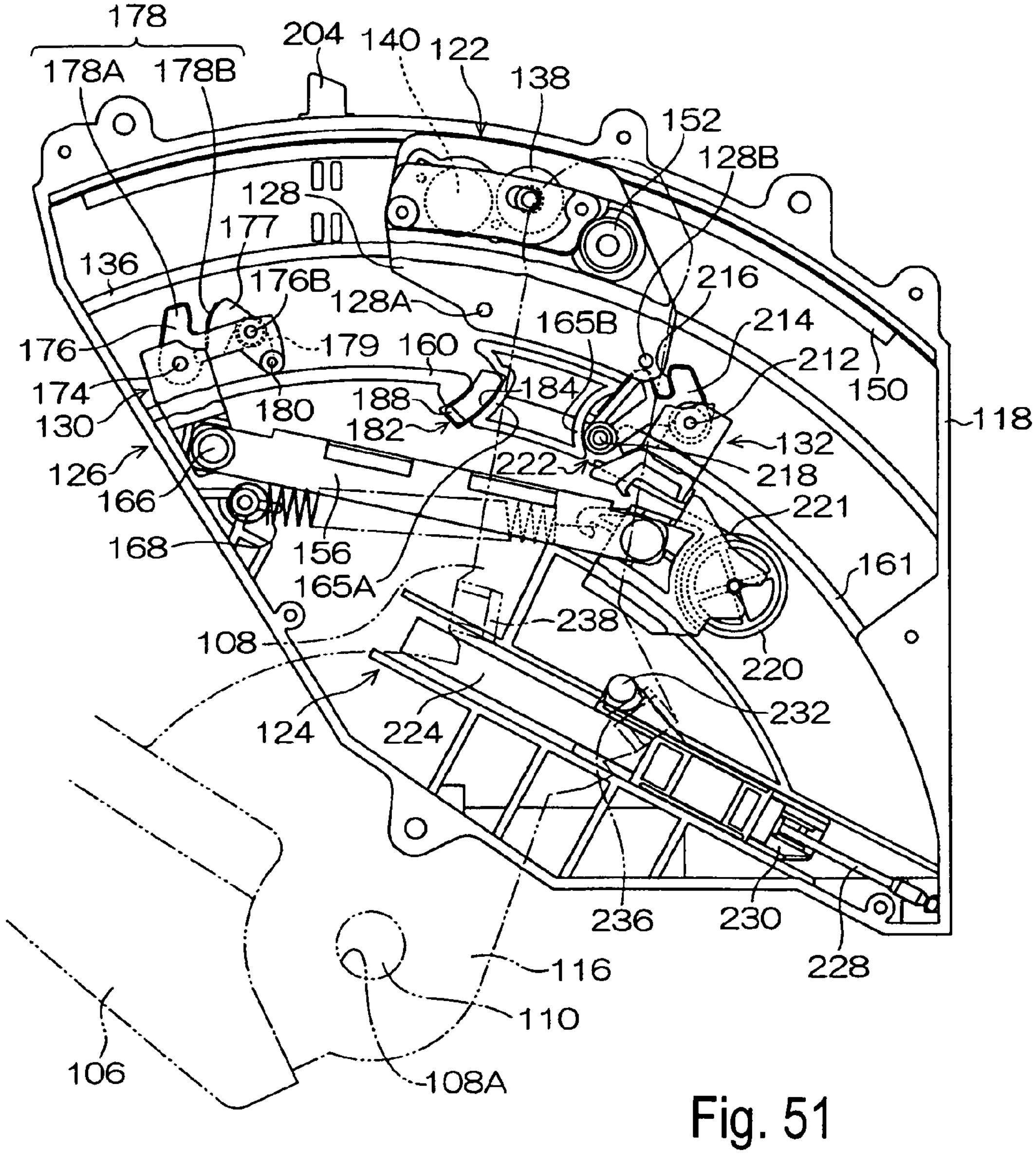
FIG. 51 is a side view showing the mid-course of the lid of the second embodiment being opened.

Doing thus, in the state when movement of the drawing-in side slider 132 is restricted by the lock part 222, as shown in FIG. 50, the opening of the recessed part 216 of the connecting part 214 is facing the direction of movement of the power transmission slider 128. Therefore, by the movement of the power transmission slider 128, as shown in FIG. 51, the connecting pin 128B inside the recessed part 216 comes out from said recessed part 216, and the state of connection of the power transmission slider 128 and the drawing-in side slider 132 is released.

As above, the movements of the energy accumulation side slider 130 and the drawing-in side slider 132 are respectively restricted at the center part of the receiving part 118 by the lock parts 182 and 222. That is, it becomes that the energy accumulation side slider 130 is made capable of moving following the guide rib 160 from one end part of the receiving part 118 to the lock part 182, and the drawing-in side slider 132 is made capable of following the guide rib 161 from the lock part 222 to the other end part of the receiving part 118.

Because the power transmission slider 128 is made capable of moving from one end part to the other end part of the receiving part 118 following the guide rib 136, the connecting parts 176 and 214 of the energy accumulation side slider 130 and the drawing-in side slider 132 respectively are connected with the connecting pins 128A and 128B within prescribed intervals, and their states of connection are released when exceeding the prescribed intervals.

(Piston Damper Unit)

Next, the piston damper unit 124 is explained. As shown in FIG. 39, the piston damper unit 124 is constituted including a cylinder 224, a piston (not illustrated), which is inserted inside this cylinder 224, and a piston rod 228, which is connected to said piston, and the cylinder 224 is attached to an angular holder 230, and the piston damper unit 124 is installed on the receiving part 118 via said holder 230.

A boss 232 is provided on the holder 230, and an opening 234 (see FIG. 37) is formed on the lid 120 of the damper unit 112 conforming to the track of movement of the boss 232. Although it becomes that the boss 232 is exposed to the outside through this opening 234, it is made such that a position returning bump 236 and a compression bump 238 shown in FIG. 38, which are formed in the center part of the arm 208, are made capable of coming in contact with this boss 232.

Also, the front end part of the exposed side of the piston rod 228 is attached to the receiving part 118, and the cylinder 224 moves following the axial direction of the piston rod 228 via the boss 232 and the holder 230. By the fact that the cylinder 224 moves toward the direction of arrow C, it is made such that the air inside the cylinder 224 is compressed, whereby the attenuating effect is obtained on the boss 232.

The compression bump 238 contacts the boss 232 when closing the lid 106, but by the fact that the cylinder 224 is moved toward the direction of arrow C via this boss 232 and the holder 230, and the piston is moved toward the far side of said cylinder 224, it becomes that the air inside the cylinder 224 is compressed, and the attenuating effect of the piston damper unit 124 is obtained when closing the lid 106 via the compression bump 238 and the arm 108.

Also, when opening the lid 106, although the position returning bump 236 contacts the boss 232, the cylinder 224 is returned to the original position via the boss 232 and the holder 230. Therefore, when opening the lid 106, the attenuating effect of the piston damper unit 124 is not obtained.

(Operation and Effect)

Next, the operation and effects of the second embodiment of the present invention are explained based on FIG. 45 to FIG. 53(E). In FIG. 45 to FIG. 53(E), the process from closing the opened lid 106 to again opening it is shown in sequence. Also, FIG. 53 is a type drawing of the movement of the power transmission unit 126 shown in FIG. 45 to FIG. 50; FIG. 53(A) corresponds to FIG. 45, FIG. 53(B) corresponds to FIG. 46, FIG. 53(C) corresponds to FIG. 47, FIG. 53(D) corresponds to FIG. 48, and FIG. 53(E) corresponds to FIG. 50.

Figure 53A:
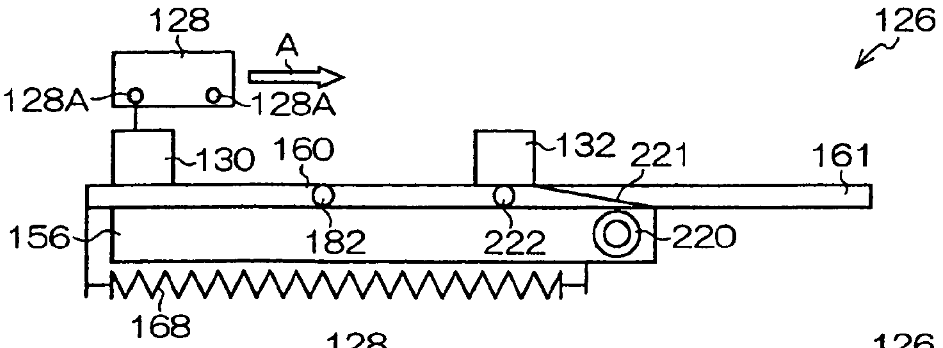
FIGS. 53(A)-53(E) are pattern diagrams showing the power transmission unit of the moving apparatus of the second embodiment, wherein FIG. 53(A) corresponds to FIG. 45, FIG. 53(B) corresponds to FIG. 46, FIG. 53(C) corresponds to FIG. 47, FIG. 53(D) corresponds to FIG. 48, and FIG. 53(E) corresponds to FIG. 50.

First, as shown in FIG. 45 and FIG. 53(A), in the state when the lid 106 is open, the power transmission slider 128 is positioned on one end part of the receiving part 118. In this state, the connecting pin 128A of the power transmission slider 128 is connected to the connecting part 176 of the energy accumulation side slider 130, and the drawing-in side slider 132 is restricted against movement by the lock part 222. Also, the boss 232 of the holder 230 constituting the piston damper unit 124 is in contact with the position returning bump 236 of the arm 108.

From this state, as shown in FIG. 46, when the lid 106 is closed at a prescribed angle, by the movement of the arm 108, the boss 232 contacts the compression bump 238. Also, by the movement of the arm 108, the power transmission slider 128 moves toward the direction of arrow A via the boss 152.

By the movement of the power transmission slider 128, the viscosity resistance of the rotary damper 146 acts on the power transmission slider 128 via the rack 150 formed on the receiving part 118 and the gear 146A installed on the power transmission slider 128 shown in FIG. 41. Also, the rack 144 formed on the lid body 120 and the shaft part 138B of the one-way gear 138 installed on the power transmission slider 128 move the shaft bearing hole 138A toward the direction of arrow B, and it engages with the gear 140A, and the viscosity resistance of the rotary damper 140 acts on the power transmission slider 128 via said gear 140A.

That is, it becomes that in the direction of closing the lid 106, in addition to the dead weight of the lid 106, the attenuating effect of the rotary dampers 140 and 146 constituting the rotary damper unit 122 acts on the lid 106 via the power transmission slider 128, the boss 152, the arm 108, and the shaft plate 116.

Figure 53B:
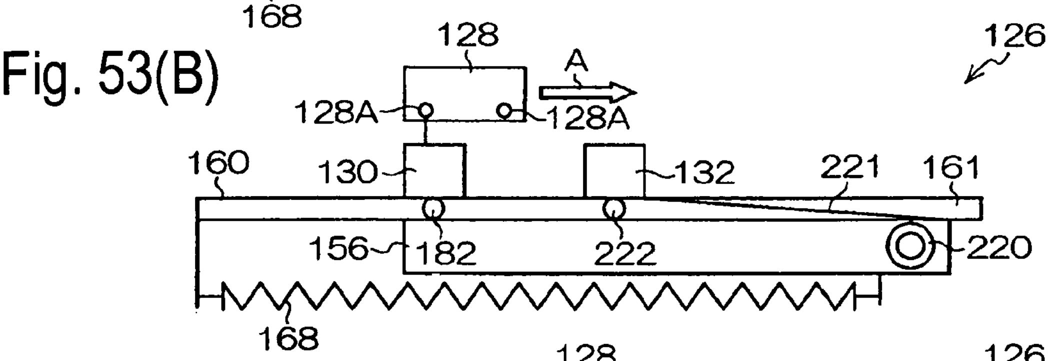

Also, as shown in FIG. 53(B), by the movement of the power transmission slider 128 toward the direction of arrow A, the energy accumulation side slider 130 moves together with the power transmission slider 128 via the connecting pin 128A, and the link member 156 moves toward the direction of arrow A via the energy accumulation side slider 130.

At this time, because the drawing-in side slider 132 is in the state when the movement is restricted by the lock part 222, although the energy accumulation side slider 130 approaches the drawing-in side slider 132 by the movement of the energy accumulation side slider 130, the distance between the drum 220 attached to the other end side of the link member 156 and the drawing-in side slider 132 moves apart by the movement of the link member 156.

By this, the constant load spring 221 is wound out from said drum 220, and impelling force is accumulated in the constant load spring. Also, the coil spring 168 expands by the movement of the link member 156, and impelling force is accumulated also in the coil spring 168.

That is, it becomes that in the direction of closing the lid 106, the impelling force (resistance force) of the constant load spring 221 and the coil spring 168 also act on the lid 106, in addition to the dead weight of the lid 106.

Also, as shown in FIG. 47, when the lid 106 is further closed, the connecting part 176 of the energy accumulation side slider 130 reaches the lock part 182, and the free end side of the connecting part 176 rotates downward via the sliding part 180 following the shape of the lock part 182, and in that state the movement of the energy accumulation side slider 130 is restricted.

During this period, the compression bump 238 of the arm 108 is left in contact with the boss 232, and by the movement of the lid 106, the cylinder 224 moves toward the direction of arrow C via the arm 108, the boss 232, and the holder 230, the air inside the cylinder 224 is compressed, and it becomes that the attenuating effect of the piston damper unit 124 also acts on the lid 106 via the compression bump 238 and the arm 108, in addition to the impelling force (resistance force) of the constant load spring 221 and the coil spring 168.

Figure 53C:
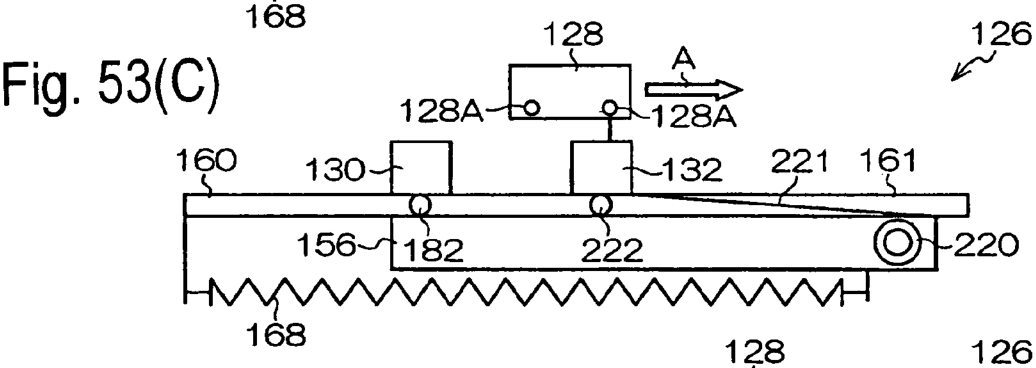

Also, by the movement of the power transmission slider 128 in the state when the movement of the energy accumulation side slider 130 is restricted, as shown in FIG. 53(C), the connecting pin 128A comes out from the recessed part 178 of the connecting part 176, and the connecting pin 128B enters the recessed part 216 of the connecting part 214 of the drawing-in side slider 132, which is in the state being restricted against movement by the lock part 222 of the connecting pin 128B, and the drawing-in side slider 132 is connected to the power transmission slider 128.

That is, it becomes that the power transmission path is switched between the power transmission slider 128 and the energy accumulation side slider 130 and the drawing-in side slider 132.

Figure 48:
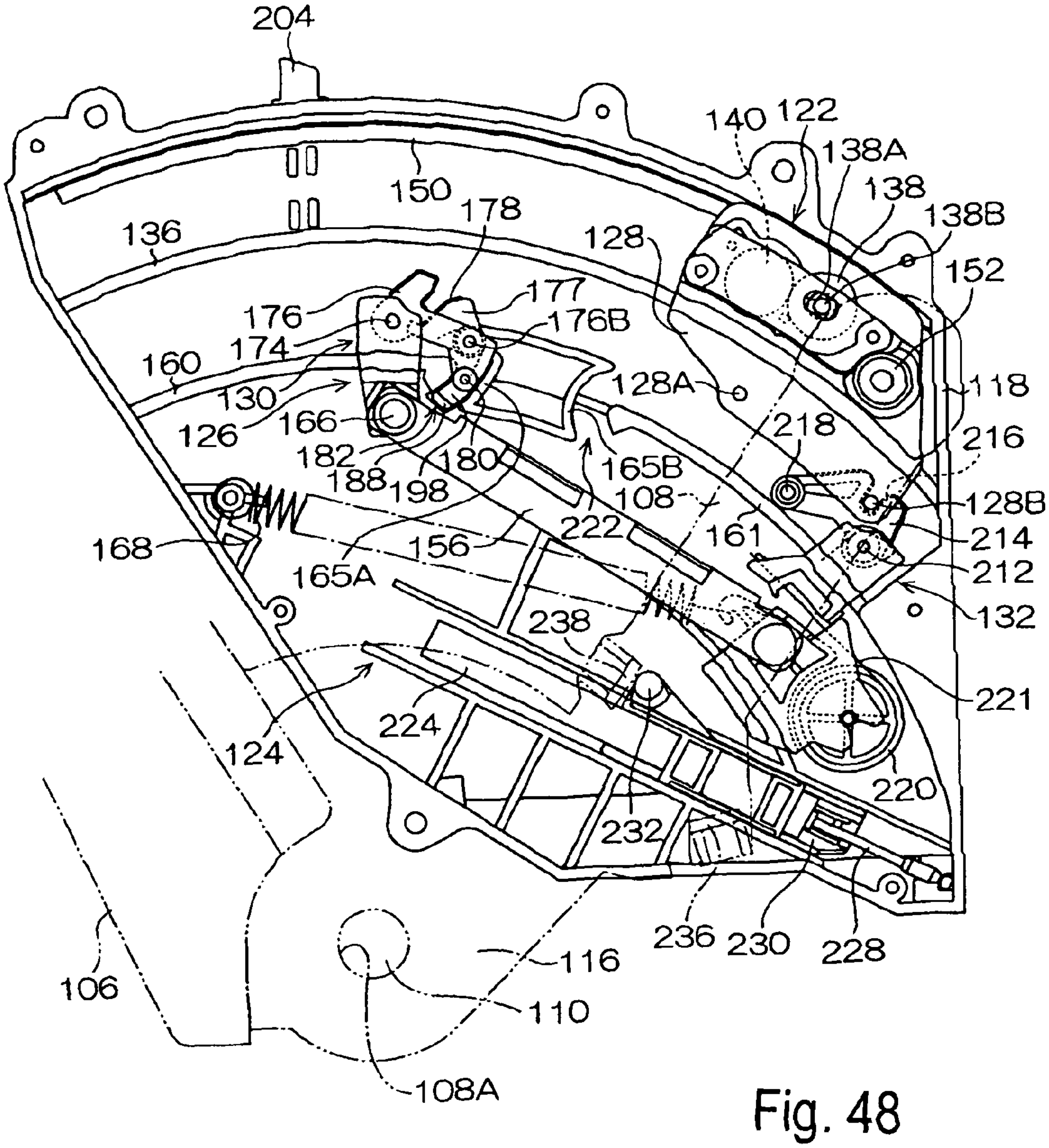
FIG. 48 is a side view showing the state when the lid of the second embodiment is closed.
Figure 53D:
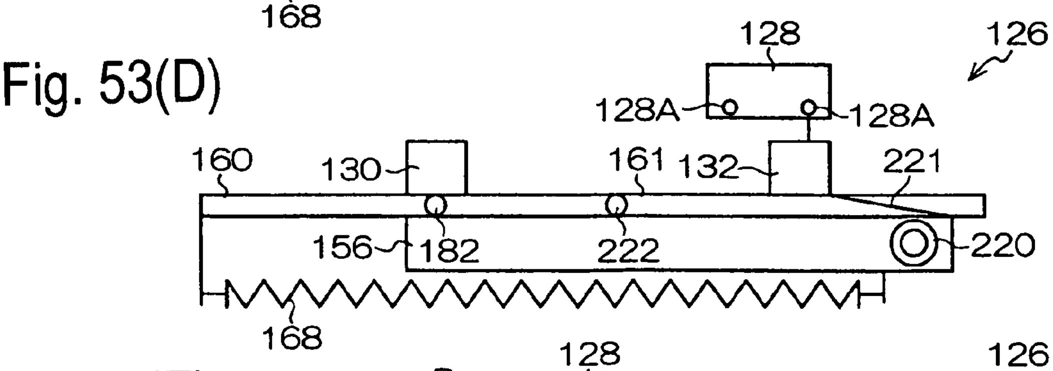

Thus, by the fact that the drawing-in side slider 132 is connected to the power transmission slider 128, it becomes that said drawing-in side slider 132 becomes capable of movement, but because impelling force is accumulated in the constant load spring 221, as shown in FIG. 48 and FIG. 53(D), it becomes that the drawing-in side slider 132 moves by the returning force of the constant load spring 221. By the movement of this drawing-in side slider 132, the power transmission slider 128 moves, and the lid 106 moves toward the direction of being closed via said power transmission slider 128.

That is, when moving the opened lid 106 toward the closing direction, from the position at the start of closing movement to mid-course of closing movement of the lid 106, because impelling force is accumulated in the constant load spring 221, a force toward the direction opposing the impelling force of the constant load spring 221 becomes separately necessary in addition to the dead weight, and the like, of the lid 106, but when near the position at the end of closing movement, the load of manual operation of the lid 106 is decreased (low-load interval) by the drawing-in force due to the returning force of the constant load spring 221, or the load of manual operation is made unnecessary (zero-load interval) by the returning force of the constant load spring 221 exceeding the load of operation of the lid 106, and it becomes possible to draw in the lid 106 automatically.

Meanwhile, as shown in FIG. 47 and FIG. 48, because the attenuating effects of the rotary dampers 140 and 146, the piston damper unit 124, and the coil spring 168 act on the lid 106 in the direction of closing, when drawing in the lid 106, the speed of movement of the lid 106 is decelerated by these, and the generation of noise, and the like, is suppressed, and it is possible to give a sense of high quality to the movement of the lid 106.

Also, here, although it becomes that the energy accumulation side slider 130 moves and impelling force is accumulated in the constant load spring 221 in the state when the power transmission slider 128 is connected with the energy accumulation side slider 130, and it is switched from the interval of manual operation of the lid 106 to the low-load interval or the zero-load interval by connection of the power transmission slider 128 and the drawing-in side slider 132, a prescribed distance is provided from when the state of connection of the power transmission slider 128 and the energy accumulation side slider 130 is released to when the power transmission slider 128 and the drawing-in side slider 132 are connected. By this, the sensation of the operating stress on the lid 106 suddenly being decreased and the lid suddenly moving is decreased. That is, natural movement of the lid 106 is realized.

Also, in the state when the lid 106 was closed, the coil spring 168 becomes in a state in which impelling force was accumulated.

Next, the closed lid 106 is opened, but the lid 106 (equivalent to the lid Ma in FIG. 32) becomes capable of being opened by pushing in the button body 202 shown in FIG. 37, causing the claw body Pja shown in FIG. 32 to rotate, and releasing the state of engagement with the part engaged with Mc.

At this time, by the movement of the button body 202, as shown in FIGS. 43(A) and (B), the pressing part 239 moves, and the lock releasing member 204 moves downward via the lock member 240, and by the swaying of the lock member 186, as shown in FIG. 49, the lock releasing bump 188 moves following the hole part 184 of the lock part 182, raises up the connecting part 176 of the energy accumulation side slider 130, and releases the locked state with the lock part 222, and the energy accumulation side slider 130 becomes capable of movement.

Here, in the state when the lid 106 was closed, because impelling force was accumulated in the coil spring 168, the lid 106 becomes capable of being opened, and the energy accumulation side slider 130 becomes capable of movement, therefore by the returning force of the coil spring 168, the link member 156 and the energy accumulation side slider 130 move to the one end side of the receiving part 118 following the guide rib 160 via said coil spring 168. That is, it becomes that force in the direction of opening acts on the lid 106.

The moment due to the power transmission slider 128, the drawing-in side slider 132, and the piston damper unit 124 is acting toward the direction of closing the lid 106, therefore by the fact that the moment toward the direction of opening the lid 106 is caused to act by the returning force of the coil spring 168, these moments are mutually cancelled, and it becomes possible to cause the lid 106 to open by its own weight.

Here, when the lid 106 moves toward the direction of opening by the returning force of the coil spring 168, the power transmission slider 128 moves via the boss 152 provided on the arm 108. By this, the viscosity resistance of the rotary damper 146 acts on the power transmission slider 128 via the rack 150 and the gear 146A installed on the power transmission slider 128 shown in FIG. 41, and the lid 106 is opened gently.

As opposed to this, because the one-way gear 138 is pushed by the rack 144 toward the direction of moving away from the rotary damper 140 when the lid 106 moves toward the direction of opening, the state of engagement with the gear 140A is released. Therefore, the attenuating effect of the rotary damper 140 does not act during opening of the lid 106.

Figure 53E:
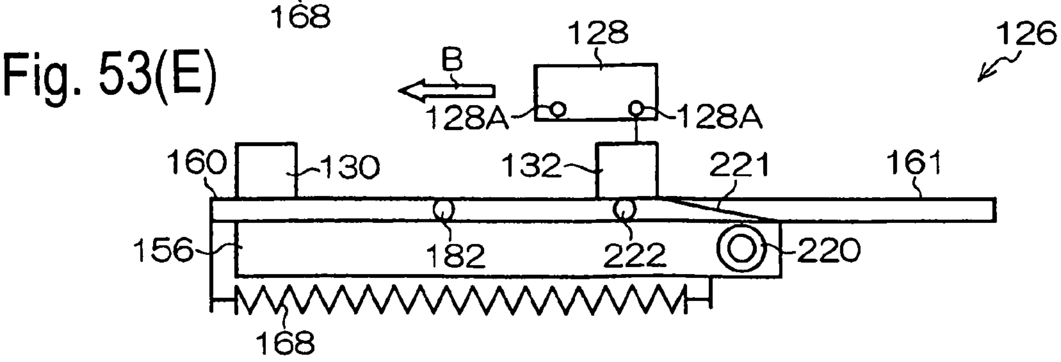

Meanwhile, as shown in FIG. 49 and FIG. 53(D), it is the state in which the connecting pin 128B of the power transmission slider 128 and the connecting part 214 of the drawing-in slider 132 are connected, and as shown in FIG. 50 and FIG. 53(E), during the period up to when the drawing-in side slider 132 is restricted against movement by the lock part 222, it becomes that the distance between the energy accumulation side slider 130 and the drawing-in side slider 132 is kept constant.

In the state when the drawing-in side slider 132 is restricted against movement by the lock part 222, when the power transmission slider 128 is further moved toward the direction of arrow B, as shown in FIG. 51, the connecting pin 128B of the power transmission slider 128 is removed from the connecting part 214 of the drawing-in side slider 132, and it becomes that the power transmission slider 128 moves alone.

Also, by the position returning bump 236 on the arm 108, the cylinder 224 moves so as to return to the original position via the boss 232 and the holder 230.

Figure 52:
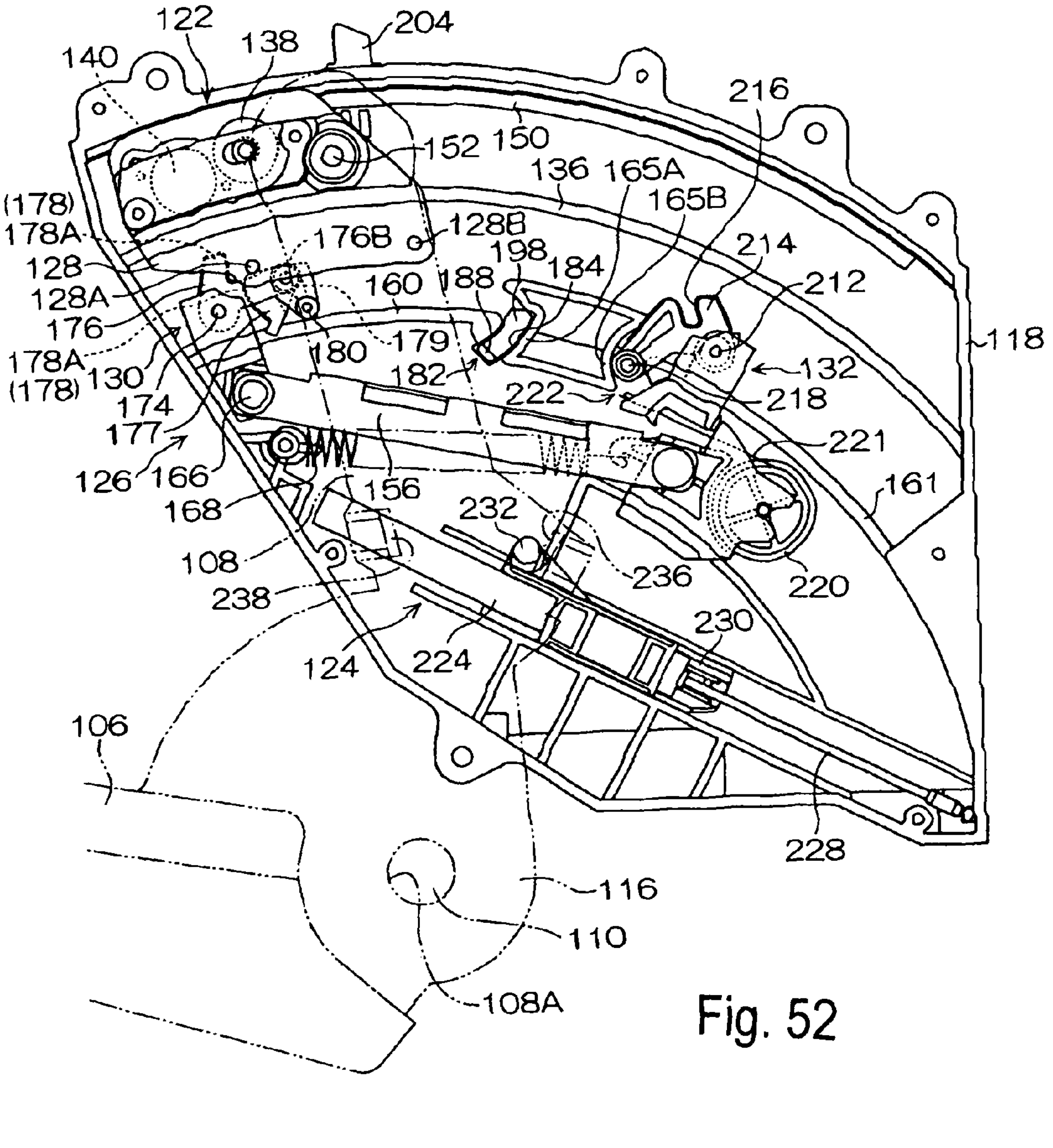
FIG. 52 is a side view showing the mid-course of the lid of the second embodiment being opened.

Also, when the front end part of the power transmission slider 128 contacts the bowstring part of the plate 177 provided on the connecting part 176 of the energy accumulation side slider 130, said plate sways downward centered on the shaft 176B in opposition to the impelling force of the torsion spring 179 (see FIG. 52). When the connecting pin 128A moves on said bowstring part and passes the free end part 178B of the plate 177, said plate 177 sways upward by the returning force of the torsion spring 179, and as shown in FIG. 45, the connecting pin 128A enters the recessed part 178, which is formed between the free end part 178B of the plate 177 and the protruding part 178A of the connecting part 176, and the power transmission slider 128 is connected to the energy accumulation side slider 130.

Incidentally, in the present embodiment, there is provided a shaft plate 116, which connects the base part of the arm 108 and the inner face of the lid 106, and a run-through hole 114A is formed on a flange part 114 formed on the main body 102, and it is made such that the shaft plate 116 runs through inside said run-through hole 114A during opening and closing of the lid 106. For example, in the case when this lid apparatus 100 is used as a glove compartment, it becomes that the main body 102 is attached to the instrument panel (not illustrated), and the lid opens and closes on the inside of the vehicle compartment, but because only the shaft part 116 is exposed inside the vehicle compartment during opening and closing of the lid 106, the appearance is better than when the arm 108 is exposed, and a sense of high quality is obtained.

Also, in the present embodiment, the damper unit 112 is received inside a space constituted by a receiving part 118 and a lid part 120, and it is made capable of being installed on the side wall 102A of the main body 102 (see FIG. 37A) in a state having been made as a unit, but attachment of the damper unit 112 to the main body 102 is made very easy by this.

Also, in the present embodiment, the damper unit 112 was provided on the main body 102 (fixed side), but said damper unit 112 may be provided on the lid 106 (movable side). Also, the power transmission slider 128, the energy accumulation side slider 130, and the drawing-in side slider 132 all were provided on the side of the main body 102, but the power transmission slider 128, the energy accumulation side slider 130, and the drawing-in side slider 132 may be provided separately on the side of the main body 102 and the side of the lid 106.

Furthermore, in the present embodiment, it was made such that impelling force is accumulated in the constant load spring 221 by the energy accumulation side slider 130 and the drawing-in side slider 132 coming closer, but it also may be constituted such that the impelling force is accumulated by the energy accumulation side slider 130 and the drawing-in side slider 132 moving apart.

What is claimed is:

1. A movable body moving apparatus, comprising:

a pair of sliders slidably provided on one of a movable body and a fixed body, said pair of sliders comprising a first slider and a second slider and having an impelling device which pulls the two sliders toward one another;

a first engaging part which is provided on the other of the movable body and the fixed body, and a second engaging part which is spaced relative to the first engaging part in a sliding direction of the pair of sliders;

a first slide lock which is provided on the one of the movable body and the fixed body, and a second slide lock which is spaced relative to the first slide lock in the sliding direction of the pair of sliders; and means for releasing the second slider from the second slide lock when the second slider is locked in the second slide lock;

said movable body moving apparatus being arranged such that: before a forward movement of the movable body relative to said fixed body, the second slider is locked in the second slide lock and prevented from sliding in the sliding direction by the second slide lock, and the first slider is slidable in the sliding direction while catching the first engaging part therein;

in an end position of the forward movement of the movable body relative to said fixed body, the first slider is locked in the first slide lock and prevented from sliding in the sliding direction by the first slide lock while releasing the first engaging part therefrom, and the second slider is slidable in the sliding direction while catching the second engaging part therein;

when moving the movable body from the end position of the forward movement backward to a prescribed position, the second slider is moved away from the first slider and a force is accumulated in the impelling device; and when the movable body reaches the prescribed position, the second slider releases the second engaging part therefrom and is locked in the second slide lock and prevented from sliding in the sliding direction by the second slide lock, and the first slider catches the first engaging part therein.

2. The movable body moving apparatus according to claim 1, wherein the forward movement of the movable body is accomplished by a force applied on the movable body.

3. The movable body moving apparatus according to claim 1, wherein the first slider and the second slider each have a slider main body and a rotating body which is rotationally mounted on the slider main body;

the rotating body of the first slider has a sliding contact part and a receiving recessed part for receiving the first engaging part;

the rotating body of the second slider has a sliding contact part and a receiving recessed part for receiving the second engaging part;

a sliding contact rail for the sliding contact parts is formed on the one of the movable body and the fixed body;

said first slide lock is formed on one end of the sliding contact rail and said second slide lock is formed on the opposite end of the sliding contact rail; and the rotating bodies are tilted relative to said slider main bodies by entry of a respective one of the sliding contact parts into a respective one of the slide locks.

4. The movable body moving apparatus according to claim 3, wherein the rotating body of the second slider has a claw body rotatably mounted thereto, said claw body includes a wall part and a top part, wherein said wall part forms a portion of the receiving recessed part of said rotating body of said second slider; and a device which urges the claw body toward a protruding position.

5. The movable body moving apparatus according to claim 3, wherein a space is formed between the first slider and the second slider before the forward movement of the movable body.

6. The movable body moving apparatus according to claim 1, further comprising a damping device which applies a damping force to the movement of the movable body.

7. The movable body moving apparatus according to claim 6, wherein the damping device includes a damper body having a piston and a cylinder therein; and the piston is advanced into the cylinder at least at the end position of the forward movement of the movable body and an end of the backward movement of the movable body.

8. The movable body moving apparatus according to claim 7, wherein the piston and the cylinder are supported on a side of the pair of sliders; and a pusher body which is engageable with one of the piston and the cylinder is provided on a side of the movable body.

9. The movable body moving apparatus according to claim 7, wherein the piston and the cylinder are supported on one of the pair of sliders; and a wall body engageable with one of the piston and the cylinder is provided on the moveable body.

10. An apparatus comprising the movable body moving apparatus according to claim 1, wherein said movable body comprises a lid and said fixed body comprises a main body wherein said lid closes an opening of the main body before the forward movement.

* * * * *